US011159687B2

(12) United States Patent
Tokuchi

(10) Patent No.: US 11,159,687 B2
(45) Date of Patent: Oct. 26, 2021

(54) INFORMATION PROCESSING APPARATUS AND NON-TRANSITORY COMPUTER READABLE MEDIUM

(71) Applicant: FUJIFILM Business Innovation Corp., Tokyo (JP)

(72) Inventor: Kengo Tokuchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/987,058

(22) Filed: Aug. 6, 2020

(65) Prior Publication Data

US 2020/0366802 A1    Nov. 19, 2020

Related U.S. Application Data

(63) Continuation of application No. 16/665,507, filed on Oct. 28, 2019, now Pat. No. 10,764,452, which is a
(Continued)

(30) Foreign Application Priority Data

May 6, 2016 (JP) .................... 2016-093290
May 6, 2016 (JP) .................... 2016-093291
(Continued)

(51) Int. Cl.
*H04N 1/00* (2006.01)

(52) U.S. Cl.
CPC ....... *H04N 1/00474* (2013.01); *H04N 1/0049* (2013.01); *H04N 1/00251* (2013.01);
(Continued)

(58) Field of Classification Search
CPC .......... H04N 1/00474; H04N 1/00251; H04N 1/00403; H04N 1/00413; H04N 1/0049;
(Continued)

(56) References Cited

U.S. PATENT DOCUMENTS 9,103,691 B2    8/2015  Waller et al.
2002/0021310 A1  2/2002  Nakai
(Continued)

FOREIGN PATENT DOCUMENTS

CN    101123659 A    2/2008
CN    101860638 A    10/2010
(Continued)

OTHER PUBLICATIONS

Communication dated Feb. 28, 2017 from the Japanese Patent Office in counterpart Application No. 2016-227482.
(Continued)

*Primary Examiner* — Neil R McLean
(74) *Attorney, Agent, or Firm* — Sughrue Mion, PLLC

(57) ABSTRACT

An information processing apparatus and non-transitory computer readable medium and for processing information are provided. The information processing apparatus includes a processor configured to: receive image data; cause a display to display the received image data; and move, in response to a user instruction, a portion of the image data from a first place to a second place on the display. The portion of the image data is a partial region of an entire region of the image data. While the portion of the image data is being moved from the first place to the second place, the portion of the image data is displayed at the first place.

20 Claims, 30 Drawing Sheets

Related U.S. Application Data continuation of application No. 15/966,586, filed on Apr. 30, 2018, now Pat. No. 10,469,682, which is a continuation of application No. 15/349,134, filed on Nov. 11, 2016, now Pat. No. 9,986,113.

(30) Foreign Application Priority Data

May 6, 2016 (JP) ................................. 2016-093292
Jun. 29, 2016 (JP) ................................. 2016-128350

(52) U.S. Cl.
CPC ..... *H04N 1/00403* (2013.01); *H04N 1/00413* (2013.01); *H04N 1/00503* (2013.01); *H04N 2201/0094* (2013.01)

(58) Field of Classification Search
CPC ........ H04N 1/00503; H04N 2201/0094; G06F 3/126; G06F 3/1285
USPC ....................................................... 358/1.13
See application file for complete search history.

(56) References Cited

U.S. PATENT DOCUMENTS

| | | | |
|---|---|---|---|
| 2004/0153530 A1* | 8/2004 | Machida | H04L 69/329 709/220 |
| 2005/0055641 A1 | 3/2005 | Machida | |
| 2005/0128527 A1 | 6/2005 | Brawn et al. | |
| 2007/0157084 A1 | 7/2007 | Yano et al. | |
| 2012/0140284 A1 | 6/2012 | Tashiro et al. | |
| 2012/0242660 A1* | 9/2012 | Kim | G06T 19/20 345/419 |
| 2012/0307277 A1 | 12/2012 | Kishida | |
| 2013/0141747 A1 | 6/2013 | Oba et al. | |
| 2013/0154978 A1 | 6/2013 | Kim et al. | |
| 2014/0007199 A1 | 1/2014 | Ishino | |
| 2014/0063542 A1 | 3/2014 | Aoki | |
| 2014/0365655 A1 | 12/2014 | Takahashi et al. | |
| 2015/0124106 A1 | 5/2015 | Tomita | |
| 2016/0171357 A1* | 6/2016 | Kwon | H04N 1/00856 358/1.15 |
| 2016/0316080 A1* | 10/2016 | Shimamoto | H04N 1/00477 |
| 2016/0316090 A1 | 10/2016 | Imoto | |

FOREIGN PATENT DOCUMENTS

| | | |
|---|---|---|
| CN | 102547017 A | 7/2012 |
| CN | 102595017 A | 7/2012 |
| CN | 102694937 A | 9/2012 |
| CN | 105474253 A | 4/2016 |
| JP | 6-348243 A | 12/1994 |
| JP | 2000-315182 A | 11/2000 |
| JP | 2004-110375 A | 4/2004 |
| JP | 2007-19750 A | 1/2007 |
| JP | 2007-133696 A | 5/2007 |
| JP | 2010-193311 A | 9/2010 |
| JP | 2010-231673 A | 10/2010 |
| JP | 2012-141998 A | 7/2012 |
| JP | 2013-80377 A | 5/2013 |
| JP | 2013-125328 A | 6/2013 |
| JP | 2013-127794 A | 6/2013 |
| JP | 2013-172432 A | 9/2013 |
| JP | 2014-10769 A | 1/2014 |
| JP | 2014-48672 A | 3/2014 |
| JP | 2014-238786 A | 12/2014 |
| JP | 2015-90553 A | 5/2015 |
| JP | 5737906 B2 | 6/2015 |
| JP | 2016-51358 A | 4/2016 |
| JP | 2016-111417 A | 6/2016 |
| JP | 2016-207045 A | 12/2016 |
| JP | 2018-5361 A | 1/2018 |

OTHER PUBLICATIONS

Communication dated Aug. 14, 2018, from the Japanese Patent Office in counterpart application No. 2017-112972.
Notification of Reason for Refusal for JP 2016-128350 dated Aug. 23, 2016.
Notification of Reason for Refusal dated Jan. 7, 2020 issue by the Japanese Patent Office in Application No. 2018-222752.
Decision of Refusal dated Sep. 29, 2020 from the Japanese Patent Office in Application No. 2018-222752.
Communication dated Aug. 26, 2021 from the China National Intellectual Property Administration in CN Application No. 201710010041.2.

\* cited by examiner

FIG. 6

| DEVICE ID | NAME (TYPE) OF DEVICE | FUNCTION | IMAGE ID |
|---|---|---|---|
| A | PC | DISPLAY FUNCTION, STORAGE FUNCTION, ... | ... |
| B | MFP | PRINT FUNCTION, SCAN FUNCTION, COPY FUNCTION, FACSIMILE FUNCTION, POST-PROCESSING FUNCTION, ... | ... |
| ... | ... | ... | ... |

FIG. 7

| COMBINATION OF DEVICE IDS | NAME (TYPE) OF DEVICE | COOPERATIVE FUNCTION | LINKAGE ORDER | PRIORITY ORDER |
|---|---|---|---|---|
| A, B | PC (A), MFP (B) | SCAN AND TRANSFER FUNCTION | B→A | 1 |
| | | | A→B | 2 |
| | | PRINT FUNCTION | A→B | 1 |
| | | | B→A | 2 |
| A, C | PC (A), PROJECTOR (C) | PROJECTION FUNCTION | A→C | 1 |
| | | | C→A | 2 |
| | | ... | C→A | 1 |
| | | | A→C | 2 |
| ... | ... | ... | ... | ... |

FIG. 12

| DEVICE ID | NAME (TYPE) OF DEVICE | POSITION IN IMAGE | FUNCTION | IMAGE ID |
|---|---|---|---|---|
| A | PC | ... | SCREEN DISPLAY FUNCTION | ... |
| | | ... | DATA STORAGE FUNCTION | |
| | | ... | ... | |
| B | MFP | ... | PRINT FUNCTION | ... |
| | | ... | SCAN FUNCTION | |
| | | ... | STAPLING FUNCTION | |
| | | ... | ... | |
| ... | ... | ... | ... | ... |

| COMBINATION OF DEVICE IDS | NAME (TYPE) OF DEVICE | COOPERATIVE FUNCTION |
|---|---|---|
| A, B | PC (A), MFP (B) | SCAN AND TRANSFER FUNCTION |
| | | PRINT FUNCTION |
| A, C | PC (A), PROJECTOR (C) | PROJECTION FUNCTION |
| | | ... |
| ... | ... | ... |

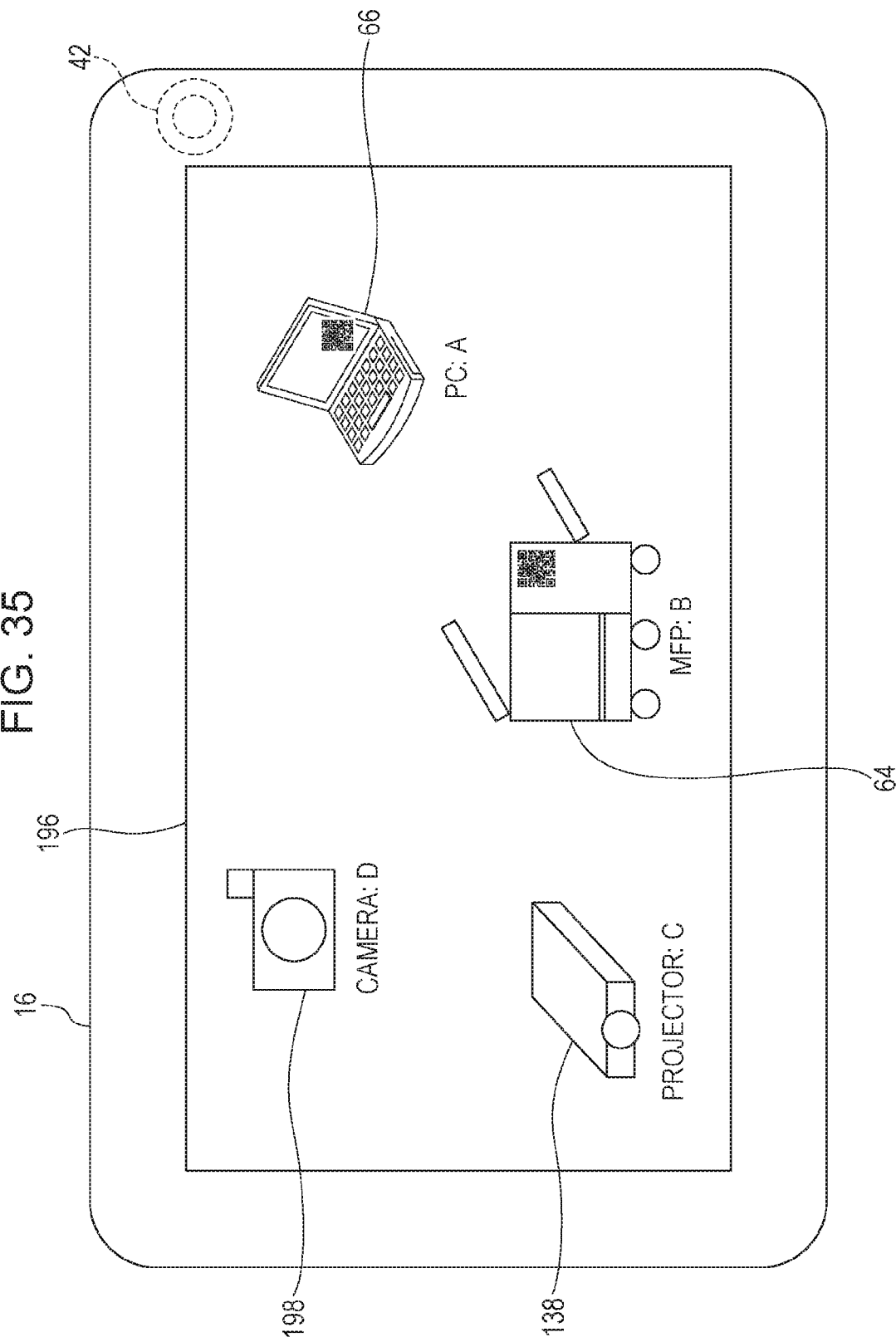

INFORMATION PROCESSING APPARATUS AND NON-TRANSITORY COMPUTER READABLE MEDIUM

CROSS-REFERENCE TO RELATED APPLICATIONS

This application is a continuation of U.S. application Ser. No. 16/665,507 filed Oct. 28, 2019, which is a continuation of U.S. application Ser. No. 15/966,586, filed Apr. 30, 2018, which is based on and claims priority from U.S. patent application Ser. No. 15/349,134, filed Nov. 11, 2016, and under 35 USC 119 from Japanese Patent Applications No. 2016-093290, No. 2016-093291, and No. 2016-093292 filed May 6, 2016, and Japanese Patent Application No. 2016-128350 filed Jun. 29, 2016, all of which are incorporated herein by reference.

BACKGROUND

Technical Field

The present invention relates to an information processing apparatus and a non-transitory computer readable medium.

SUMMARY

Aspects of non-limiting embodiments of the present disclosure relate to moving images on a display.

Aspects of certain non-limiting embodiments of the present disclosure overcome the above disadvantages and other disadvantages not described above. However, aspects of the non-limiting embodiments are not required to overcome the disadvantages described above, and aspects of the non-limiting embodiments of the present disclosure may not overcome any of the problems described above.

According to an aspect of the invention, there is provided an information processing apparatus comprising a processor configured to: receive image data; cause a display to display the received image data; and move, in response to a user instruction, a portion of the image data from a first place to a second place on the display. The portion of the image data is a partial region of an entire region of the image data. While the portion of the image data is being moved from the first place to the second place, the portion of the image data is displayed at the first place.

BRIEF DESCRIPTION OF THE DRAWINGS

Exemplary embodiments of the present invention will be described in detail based on the following figures, wherein:

FIG. 6 is a diagram illustrating an example of a device function management table;

FIG. 7 is a diagram illustrating an example of a cooperative function management table;

FIG. 12 is a diagram illustrating an example of a device function management table according to a first modification example;

FIG. 35 is a diagram illustrating an example of a screen displayed on the terminal apparatus.

DETAILED DESCRIPTION

First Exemplary Embodiment

Figure 1:
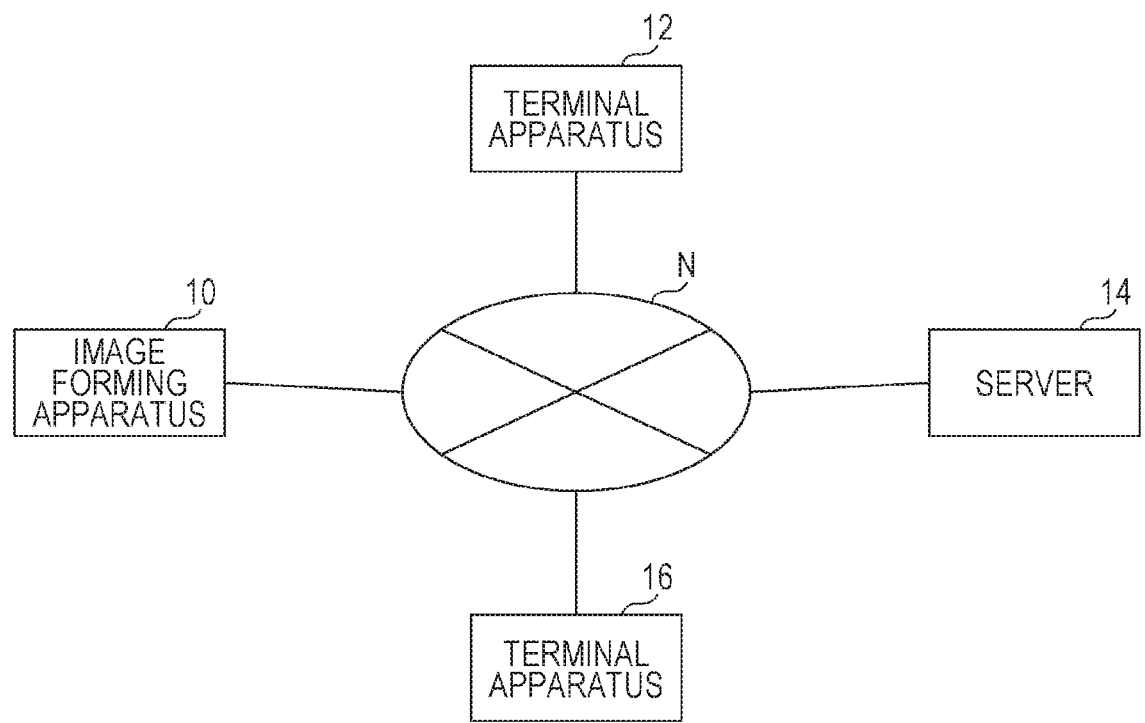
FIG. 1 is a block diagram illustrating an image forming system according to a first exemplary embodiment of the present invention.

An image forming system serving as an information processing system according to a first exemplary embodiment of the present invention will be described with reference to FIG. 1. FIG. 1 illustrates an example of the image forming system according to the first exemplary embodiment.

The image forming system according to the first exemplary embodiment includes an image forming apparatus 10, which is an example of a device; a terminal apparatus 12, which is an example of a device; a server 14; and a terminal apparatus 16, which is an example of an information processing apparatus. The image forming apparatus 10, the terminal apparatuses 12 and 16, and the server 14 are connected to each other through a communication path N such as a network. Of course, the image forming apparatus 10, the terminal apparatuses 12 and 16, and the server 14 may be connected to other apparatuses through different communication paths. In the example illustrated in FIG. 1, two devices (the image forming apparatus 10 and the terminal apparatus 12) are included in the image forming system. The image forming system may include one or more devices. Also, the image forming system may include plural servers 14 and plural terminal apparatuses 16.

The image forming apparatus 10 is an apparatus that has an image forming function. Specifically, the image forming apparatus 10 is an apparatus that has at least one of a scan function, a print function, a copy function, and a facsimile function. The image forming apparatus 10 also has a function of transmitting data to and receiving data from another apparatus.

Each of the terminal apparatuses 12 and 16 is an apparatus such as a personal computer (PC), a tablet PC, a smartphone, or a mobile phone, and has a function of transmitting data to and receiving data from another apparatus. The terminal apparatus 16 functions as, for example, a user interface unit (UI unit) when a device such as the image forming apparatus 10 is used.

The server 14 is an apparatus that manages the functions of individual devices. For example, the server 14 manages cooperative functions executed through cooperation between plural functions. The server 14 also has a function of transmitting data to and receiving data from another apparatus.

In the example illustrated in FIG. 1, the image forming apparatus 10 and the terminal apparatus 12 are included, as an example of devices, in the image forming system, but this is merely an example. Other apparatuses, for example, a display apparatus such as a projector, a telephone, a watch, and a monitoring camera may be included as devices in the image forming system. Of course, the image forming apparatus 10 and the terminal apparatus 12 are not necessarily included in the image forming system.

The server 14 may manage, for each user, functions available to the user. For example, a function purchased by a user is a function available to the user, and the server 14 may manage a function purchase history for each user. Of course, the server 14 may manage not only functions that are purchased or not purchased but also functions that are available free of charge, additional updater functions, and special functions managed by a manager. A function purchase process is performed by, for example, the server 14. Of course, the function purchase process may be performed by another apparatus.

In the image forming system according to the first exemplary embodiment, plural cooperative functions to be executed through cooperation between plural functions are specified, and information about the plural cooperative functions is displayed in accordance with an order of priority.

Hereinafter, the individual apparatuses included in the image forming system according to the first exemplary embodiment will be described in detail.

Figure 2:
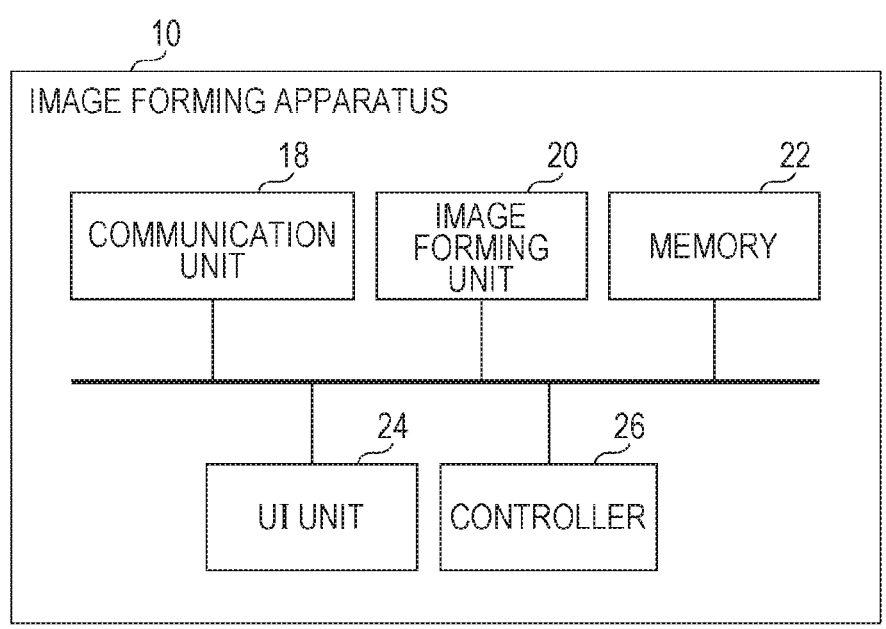
FIG. 2 is a block diagram illustrating an image forming apparatus according to the first exemplary embodiment.

First, the configuration of the image forming apparatus 10 will be described in detail with reference to FIG. 2. FIG. 2 illustrates the configuration of the image forming apparatus 10.

A communication unit 18 is a communication interface and has a function of transmitting data to another apparatus and a function of receiving data from another apparatus. The communication unit 18 may be a communication interface having a wireless communication function or may be a communication interface having a wired communication function.

An image forming unit 20 executes a function regarding image formation. Specifically, the image forming unit 20 executes at least one of a scan function, a print function, a copy function, and a facsimile function. When the scan function is executed, a document is read and scan data (image data) is generated. When the print function is executed, an image is printed on a recording medium such as paper. When the copy function is executed, a document is read and printed on a recording medium. When the facsimile function is executed, image data is transmitted or received by facsimile. Furthermore, a cooperative function including plural functions may be executed. For example, a scan and transfer function, which is a combination of a scan function and a transmission (transfer) function, may be executed. When the scan and transfer function is executed, a document is read, scan data (image data) is generated, and the scan data is transmitted to a destination (for example, an external apparatus such as the terminal apparatus 16). Of course, this cooperative function is merely an example and another cooperative function may be executed.

A memory 22 is a storage apparatus such as a hard disk or a solid state drive (SSD). The memory 22 stores, for example, information representing an image formation instruction (for example, job information), image data to be printed, scan data generated by executing a scan function, device address information representing the address of another device, server address information representing the address of the server 14, various pieces of control data, and various programs. Of course, these pieces of information and data may be stored in different storage apparatuses or in one storage apparatus.

A UI unit 24 is a user interface unit and includes a display and an operation unit. The display is a display apparatus such as a liquid crystal display. The operation unit is an input apparatus such as a touch screen or a keyboard. The image forming apparatus 10 does not necessarily include the UI unit 24, and may include a hardware user interface unit (hardware UI unit) serving as hardware instead of the display. The hardware UI unit is, for example, a hardware keypad dedicated to input numbers (for example, a numeric keypad) or a hardware keypad dedicated to indicate directions (for example, a direction indication keypad).

A controller 26 controls the operations of the individual units of the image forming apparatus 10.

Figure 3:
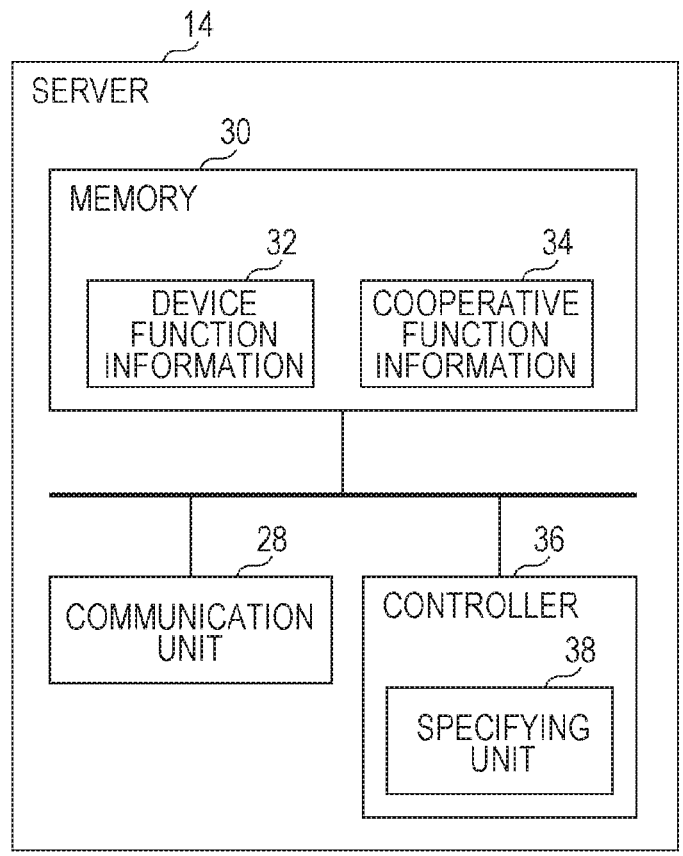
FIG. 3 is a block diagram illustrating a server according to the first exemplary embodiment.

Next, the configuration of the server 14 will be described in detail with reference to FIG. 3. FIG. 3 illustrates the configuration of the server 14.

A communication unit 28 is a communication interface and has a function of transmitting data to another apparatus and a function of receiving data from another apparatus. The communication unit 28 may be a communication interface having a wireless communication function or may be a communication interface having a wired communication function.

A memory 30 is a storage apparatus such as a hard disk or an SSD. The memory 30 stores, for example, device function information 32, cooperative function information 34, various pieces of data, various programs, device address information representing the addresses of individual devices, and server address information representing the address of the server 14. Of course, these pieces of information and data may be stored in different storage apparatuses or in one storage apparatus. The device function information 32 and the cooperative function information 34 stored in the memory 30 may be provided to the terminal apparatus 16 periodically or at designated timing, and accordingly the information stored in the terminal apparatus 16 may be updated. Hereinafter, the device function information 32 and the cooperative function information 34 will be described.

The device function information 32 is information representing the functions of the individual devices (for example, the image forming apparatus 10 and the terminal apparatus 12) included in the image forming system. For example, the device function information 32 is information representing the correspondence between device identification information for identifying a device and one or plural pieces of function identification information for identifying one or plural functions of the device. The device identification information includes, for example, a device ID, the name of a device, information representing the type of a device, a model number, and position information. The function identification information includes, for example, a function ID and the name of a function. For example, if a certain image forming apparatus 10 has a scan function, a print function, a copy function, and a scan and transfer function, the device identification information of the image forming apparatus 10 is associated with function identification information representing the scan function, function identification information representing the print function, function identification information representing the copy function, and function identification information representing the scan and transfer function. The functions of the individual devices are specified (identified) by referring to the device function information 32.

The cooperative function information 34 is information representing cooperative functions, each being executed through cooperation between plural functions. One or plural cooperative functions are executed through cooperation between plural functions. Each cooperative function may be executed through cooperation between plural functions of one device (for example, the image forming apparatus 10 or the terminal apparatus 12) or may be executed through cooperation between plural functions of plural devices (for example, the image forming apparatus 10 and the terminal apparatus 12). A terminal apparatus that provides an operation instruction (in this exemplary embodiment, the terminal apparatus 16) may be included in the devices to be identified, and a function of the terminal apparatus may be used as part of a cooperative function.

The cooperative function information 34 is, for example, information representing the correspondence among information representing a combination of pieces of function identification information for identifying individual functions that cooperate with each other to execute one or plural cooperative functions, cooperative function identification information for identifying the one or plural cooperative functions, information representing an order in which the individual functions used for the one or plural cooperative functions are linked, and information representing an order of priority of display of the one or plural cooperative functions. The cooperative function identification information includes, for example, a cooperative function ID and the name of a cooperative function. The order of priority of display is an order in which information about the one or plural cooperative functions (for example, cooperative function identification information) is displayed on the terminal apparatus 16.

In the case of causing plural devices to cooperate with each other, the cooperative function information 34 is information representing one or plural cooperative functions to be executed through cooperation between plural functions of the plural devices, and is information representing the correspondence among information representing a combination of pieces of device identification information for identifying the individual devices that cooperate with each other to execute the one or plural cooperative functions, cooperative function identification information, information representing an order in which the individual devices used for the one or plural cooperative functions are linked, and information representing an order of priority of display of the one or plural cooperative functions.

A cooperative function may be a function executed through cooperation between plural different functions or may be a function executed through cooperation between the same functions. A cooperative function may be a function that is not available without cooperation. The function that is not available without cooperation may be a function that becomes available by combining the same functions or different functions among the functions of target devices that cooperate with each other. For example, the cooperation between a device having a print function (printer) and a device having a scan function (scanner) implements a copy function as a cooperative function. That is, the cooperation between the print function and the scan function implements the copy function. In this case, the copy function is associated with the combination of the print function and the scan function. In the cooperative function information 34, for example, the cooperative function identification information for identifying the copy function as a cooperative function is associated with the combination of the device identification information for identifying the device having the print function and the device identification information for identifying the device having the scan function.

The memory 30 may store function purchase history information. The function purchase history information is information representing the function purchase histories of individual users, that is, information representing the functions purchased by the individual users. For example, the function purchase history information is information representing the correspondence between user identification information for identifying a user and function identification information representing a function purchased by the user. The user identification information is, for example, user account information such as a user ID and a user name. A function purchased by a user is a function available to the user. Functions purchased by individual users, that is, functions available to the individual users, are specified by referring to the function purchase history information. The function purchase history information is updated every time a user purchases a function, for example.

A controller 36 controls the operations of the individual units of the server 14. The controller 36 includes a specifying unit 38.

The specifying unit 38 receives device identification information for identifying a device and specifies one or plural pieces of function identification information of one or plural functions associated with the device identification information in the device function information 32 stored in the memory 30. Accordingly, the one or plural functions of the device are specified. For example, device identification information is transmitted from the terminal apparatus 16 to the server 14, and then the specifying unit 38 specifies one or plural pieces of function identification information of one or plural functions associated with the device identification information. Information about the one or plural functions (for example, function identification information and function explanation information) is transmitted from the server 14 to the terminal apparatus 16 and is displayed on the terminal apparatus 16, for example. Accordingly, the information about the one or plural functions of the device specified by the device identification information is displayed on the terminal apparatus 16.

Also, the specifying unit 38 receives pieces of device identification information for identifying target devices that cooperate with each other and specifies one or plural pieces of cooperative function identification information of one or plural cooperative functions associated with the combination of the pieces of device identification information in the cooperative function information 34 stored in the memory 30. Accordingly, the one or plural cooperative functions to be executed through cooperation between the functions of the target devices that cooperate with each other are specified. For example, plural pieces of device identification information are transmitted from the terminal apparatus 16 to the server 14, and then the specifying unit 38 specifies one or plural pieces of cooperative function identification information of one or plural cooperative functions associated with the plural pieces of device identification information. Information about the one or plural cooperative functions (for example, cooperative function identification information and cooperative function explanation information) is transmitted from the server 14 to the terminal apparatus 16 and is displayed on the terminal apparatus 16, for example. Accordingly, the information about the one or plural cooperative functions to be executed by the plural devices identified by the plural pieces of device identification information is displayed on the terminal apparatus 16.

Also, the specifying unit 38 refers to the cooperative function information 34 and determines, on the basis of an order in which the individual functions used for cooperative functions are linked, an order of priority in which information about the cooperative functions is displayed. For example, plural cooperative functions may be implemented by causing plural functions to cooperate with each other. In this case, an order of priority in which information about the individual cooperative functions is displayed is determined on the basis of an order in which the individual functions are linked. The information about the cooperative functions is displayed on the terminal apparatus 16 in accordance with the order of priority. For example, images related to devices are displayed on the terminal apparatus 16, and the images are linked to each other by a user. In the case of causing plural functions of plural devices to cooperate with each other, plural images related to the plural devices are linked to each other by the user. The order in which the images are linked corresponds to the linkage order of the functions. The specifying unit 38 specifies, on the basis of the order in which the images are linked, an order of priority in which information about the cooperative functions is displayed.

In a case where a function purchase history is managed, the specifying unit 38 may receive user identification information for identifying a user and may specify the pieces of function identification information of individual functions associated with the user identification information in the function purchase history information stored in the memory 30. Accordingly, a group of functions purchased by the user, that is, a group of functions available to the user, is specified (identified). For example, user identification information is transmitted from the terminal apparatus 16 to the server 14, and the pieces of function identification information of individual functions associated with the user identification information are specified by the specifying unit 38. The pieces of function identification information of the individual functions (for example, pieces of information representing the names of the functions) are transmitted from the server 14 to the terminal apparatus 16 and are displayed on the terminal apparatus 16, for example. Accordingly, the pieces of information for identifying the functions available to the user specified by the user identification information (function identification information) are displayed on the terminal apparatus 16. For example, the specifying unit 38 receives device identification information and user identification information, specifies one or plural pieces of function identification information of one or plural functions associated with the device identification information in the device function information 32, and also specifies one or plural pieces of function identification information of one or plural functions associated with the user identification information in the function purchase history information. Accordingly, the one or plural functions that the device specified by the device identification information has and that are available to the user specified by the user identification information are specified. The one or plural pieces of function identification information representing the one or plural functions are transmitted from the server 14 to the terminal apparatus 16 and are displayed on the terminal apparatus 16, for example.

The controller 36 may execute a function purchase process and may manage the history of the purchase. For example, if a pay function is purchased by a user, the controller 36 applies a charging process to the user and creates function purchase history information representing the history of the purchase.

Figure 4:
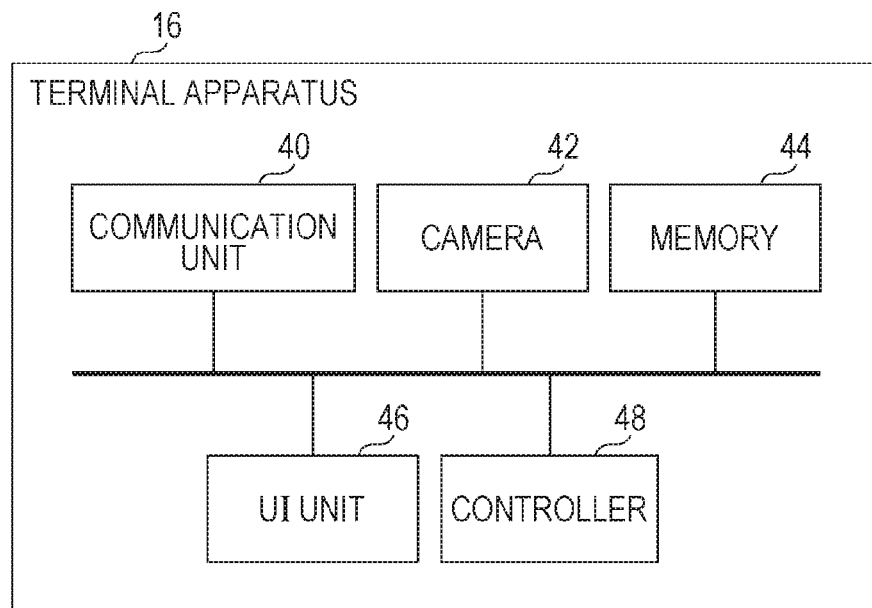
FIG. 4 is a block diagram illustrating a terminal apparatus according to the first exemplary embodiment.

Next, the configuration of the terminal apparatus 16 will be described in detail with reference to FIG. 4. FIG. 4 illustrates the configuration of the terminal apparatus 16.

A communication unit 40 is a communication interface and has a function of transmitting data to another apparatus and a function of receiving data from another apparatus. The communication unit 40 may be a communication interface having a wireless communication function or may be a communication interface having a wired communication function.

A camera 42, which serves as an image capturing unit, captures an image of a subject and thereby generates image data (for example, still image data or moving image data). Alternatively, instead of using the camera 42 of the terminal apparatus 16, image data captured by an external camera connected to a communication path such as a network may be received by the communication unit 40 and may be displayed on a UI unit 46 so that the image data may be operated.

A memory 44 is a storage apparatus such as a hard disk or an SSD. The memory 44 stores various programs, various pieces of data, the address information of the server 14, the pieces of address information of individual devices (for example, the pieces of address information of the image forming apparatus 10 and the terminal apparatus 12), information about identified target devices that cooperate with each other, and information about cooperative functions.

The UI unit 46 is a user interface unit and includes a display and an operation unit. The display is a display apparatus such as a liquid crystal display. The operation unit is an input apparatus such as a touch screen, a keyboard, or a mouse. Of course, a user interface that serves as both a display and an operation unit may be used (for example, a touch display or a display on which an electronic keyboard or the like is displayed).

A controller 48 controls the operations of the individual units of the terminal apparatus 16. The controller 48 functions as, for example, a display controller (controller) and causes the display of the UI unit 46 to display various pieces of information.

The display of the UI unit 46 displays, for example, an image captured by the camera 42, an image related to a device identified as a target device to be used (for example, a target device that cooperates), and so forth. An image related to a device may be an image (still image or moving image) representing the device captured by the camera 42 or may be an image (for example, an icon) schematically representing the device. The data of the image schematically representing the device may be stored in the server 14 and provided from the server 14 to the terminal apparatus 16, or may be stored in the terminal apparatus 16 in advance. For example, in the case of executing a cooperative function through cooperation between plural devices, images of the plural devices are captured by the camera 42 and the images of the devices are displayed on the display of the UI unit 46. When the user links the images related to the target devices that cooperate with each other, one or plural cooperative functions to be executed by the target devices are specified, and information about the cooperative functions is displayed on the display of the UI unit 46 in accordance with an order of priority, which is based on the order of the linkage.

The terminal apparatus 12 serving as a device has, for example, a configuration similar to that of the terminal apparatus 16. The terminal apparatus 12 does not necessarily include the camera 42.

The above-described device function information 32 may be stored in the memory 44 of the terminal apparatus 16. In this case, the device function information 32 is not necessarily stored in the memory 30 of the server 14. Also, the above-described cooperative function information 34 may be stored in the memory 44 of the terminal apparatus 16. In this case, the cooperative function information 34 is not necessarily stored in the memory 30 of the server 14. The controller 48 of the terminal apparatus 16 may include the above-described specifying unit 38, which may specify a function of a device by identifying the device on the basis of device identification information and may specify a cooperative function to be executed through cooperation between plural functions. In this case, the server 14 does not necessarily include the specifying unit 38. In a case where function purchase history information is created, the function purchase history information may be stored in the memory 44 of the terminal apparatus 16. In this case, the function purchase history information is not necessarily stored in the memory 30 of the server 14. The controller 48 of the terminal apparatus 16 may manage a function purchase history of a user. In this case, the controller 36 of the server 14 does not necessarily have the management function therefor. The controller 48 of the terminal apparatus 16 may specify a function available to a user on the basis of user identification information. Alternatively, the device function information 32 and the cooperative function information 34 may be stored in the devices such as the image forming apparatus 10 and the terminal apparatus 12, and the devices such as the image forming apparatus 10 and the terminal apparatus 12 may include the specifying unit 38. That is, the process by the specifying unit 38 of the server 14 may be performed in the server 14, may be performed in the terminal apparatus 16, or may be performed in the devices such as the image forming apparatus 10 and the terminal apparatus 12.

In the first exemplary embodiment, for example, augmented reality (AR) technologies are applied to obtain device identification information and to identify a target device to be used. For example, AR technologies are applied to obtain pieces of device identification information of the target devices that cooperate with each other and to identify the target devices. The AR technologies according to the related art are used. For example, a marker-based AR technology in which a marker such as a two-dimensional barcode is used, a markerless AR technology in which an image recognition technique is used, a position information AR technology in which position information is used, and the like are used. Of course, device identification information may be obtained and a target device to be used may be identified without applying the AR technologies. For example, in the case of a device connected to a network, the device may be identified on the basis of the IP address thereof or by reading the device ID thereof.

Figure 5:
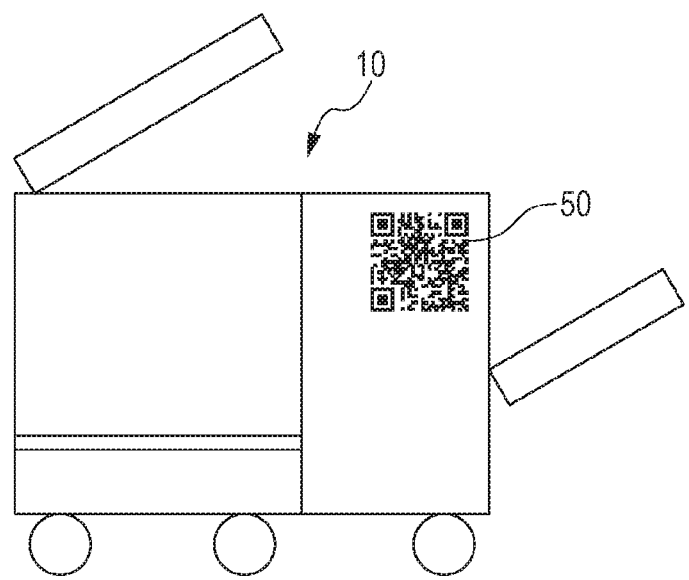
FIG. 5 is a schematic diagram illustrating an appearance of the image forming apparatus.

Hereinafter, a process of obtaining the device identification information of a device will be described in detail with reference to FIG. 5. As an example, a description will be given of the case of obtaining the device identification information of the image forming apparatus 10. FIG. 5 schematically illustrates an appearance of the image forming apparatus 10. Here, a description will be given of a process of obtaining the device identification information by applying the marker-based AR technology. The housing of the image forming apparatus 10 is attached with a marker 50, such as a two-dimensional barcode. The marker 50 is information obtained by coding the device identification information of the image forming apparatus 10. The user activates the camera 42 of the terminal apparatus 16 and captures, with the camera 42, an image of the marker 50 attached to the image forming apparatus 10, which is to be used. Accordingly, image data representing the marker 50 is generated. The image data is transmitted, for example, from the terminal apparatus 16 to the server 14. In the server 14, the controller 36 performs a decoding process on the marker image represented by the image data and thereby extracts device identification information. Accordingly, the image forming apparatus 10 to be used (the image forming apparatus 10 attached with the marker 50 whose image has been captured) is identified. The specifying unit 38 of the server 14 specifies the pieces of function identification information of functions associated with the extracted device identification information in the device function information 32. Accordingly, the functions of the image forming apparatus 10 to be used are specified.

Alternatively, the controller 48 of the terminal apparatus 16 may perform a decoding process on the image data representing the marker 50 to extract the device identification information. In this case, the extracted device identification information is transmitted from the terminal apparatus 16 to the server 14. The specifying unit 38 of the server 14 specifies the pieces of function identification information of functions associated with the device identification information transmitted from the terminal apparatus 16 in the device function information 32. In a case where the device function information 32 is stored in the memory 44 of the terminal apparatus 16, the controller 48 of the terminal apparatus 16 may specify the pieces of function identification information of functions associated with the extracted device identification information in the device function information 32.

The marker 50 may include coded function identification information of the functions of the image forming apparatus 10. In this case, the device identification information of the image forming apparatus 10 is extracted and also the pieces of function identification information of the functions of the image forming apparatus 10 are extracted by performing a decoding process on the image data representing the marker 50. Accordingly, the image forming apparatus 10 is specified and also the functions of the image forming apparatus 10 are specified. The decoding process may be performed by the server 14 or the terminal apparatus 16.

In the case of executing a cooperative function through cooperation between plural devices, images of the markers of the devices are captured to obtain the pieces of device identification information of the devices, and thereby the cooperative function is specified.

In the case of obtaining device identification information by applying the markerless AR technology, for example, the user captures an image of the whole appearance or part of the appearance of the device to be used (for example, the image forming apparatus 10) by using the camera 42 of the terminal apparatus 16. Of course, it is useful to obtain information for specifying the device to be used, such as the name (for example, the trade name) or model number of the device, by capturing an image of the appearance of the device. As a result of the capturing, appearance image data representing the whole appearance or part of the appearance of the device to be used is generated. The appearance image data is transmitted, for example, from the terminal apparatus 16 to the server 14. In the server 14, the controller 36 identifies the device to be used on the basis of the appearance image data. For example, the memory 30 of the server 14 stores, for each device, appearance image correspondence information representing the correspondence between appearance image data representing the whole appearance or part of the appearance of the device and device identification information of the device. The controller 36 compares, for example, the appearance image data received from the terminal apparatus 16 with each piece of appearance image data included in the appearance image correspondence information, and specifies the device identification information of the device to be used on the basis of the comparison result. For example, the controller 36 extracts, from the appearance image data received from the terminal apparatus 16, a feature of the appearance of the device to be used, specifies the appearance image data representing a feature that is the same as or similar to the feature of the appearance in the appearance image data group included in the appearance image correspondence information, and specifies the device identification information associated with the appearance image data. Accordingly, the device to be used (the device whose image has been captured by the camera 42) is recognized. Alternatively, in a case where an image showing the name (for example, the trade name) or model number of the device is captured and appearance image data representing the name or model number is generated, the device to be used may be identified on the basis of the name or model number represented by the appearance image data. The specifying unit 38 of the server 14 specifies the pieces of function identification information of the individual functions associated with the specified device identification information in the device function information 32. Accordingly, the functions of the device to be used (for example, the image forming apparatus 10) are specified.

Alternatively, the controller 48 of the terminal apparatus 16 may compare the appearance image data representing the whole appearance or part of the appearance of the device to be used (for example, the image forming apparatus 10) with each piece of appearance image data included in the appearance image correspondence information and may specify the device identification information of the device to be used on the basis of the comparison result. The appearance image correspondence information may be stored in the memory 44 of the terminal apparatus 16. In this case, the controller 48 of the terminal apparatus 16 refers to the appearance image correspondence information stored in the memory 44 of the terminal apparatus 16 and thereby specifies the device identification information of the device to be used. Alternatively, the controller 48 of the terminal apparatus 16 may obtain the appearance image correspondence information from the server 14 and may refer to the appearance image correspondence information, so as to specify the device identification information of the device to be used.

In the case of executing a cooperative function through cooperation between plural devices, the pieces of device identification information of the individual devices are obtained by capturing images of the whole appearance or part of the appearance of the individual devices that cooperate with each other, and thereby the cooperative function is specified.

In the case of obtaining device identification information by applying the position information AR technology, for example, position information representing the position of a device (for example, the image forming apparatus 10) is obtained by using a global positioning system (GPS) function. For example, each device has a GPS function and obtains device position information representing the position of the device. The terminal apparatus 16 outputs, to the device to be used, information representing a request for obtaining device position information, and receives, as a response to the request, the device position information of the device from the device. The device position information is, for example, transmitted from the terminal apparatus 16 to the server 14. In the server 14, the controller 36 identifies the device to be used on the basis of the device position information. For example, the memory 30 of the server 14 stores, for each device, position correspondence information representing the correspondence between the device position information representing the position of the device and the device identification information of the device. The controller 36 specifies, in the position correspondence information, the device identification information associated with the device position information received from the terminal apparatus 16. Accordingly, the device to be used is recognized. The specifying unit 38 of the server 14 specifies, in the device function information 32, the pieces of function identification information of the individual functions associated with the specified device identification information. Accordingly, the functions of the device to be used (for example, the image forming apparatus 10) are recognized.

The controller 48 of the terminal apparatus 16 may specify, in the position correspondence information, the device identification information associated with the position information of the device to be used. The position correspondence information may be stored in the memory 44 of the terminal apparatus 16. In this case, the controller 48 of the terminal apparatus 16 refers to the position correspondence information stored in the memory 44 of the terminal apparatus 16 and thereby specifies the device identification information of the device to be used.

Alternatively, the controller 48 of the terminal apparatus 16 may obtain the position correspondence information from the server 14 and refer to the position correspondence information, so as to specify the device identification information of the device to be used.

In the case of executing a cooperative function through cooperation between plural devices, the pieces of device position information of the devices are obtained and the pieces of device identification information of the devices are specified on the basis of the pieces of device position information. Accordingly, the cooperative function is specified.

Hereinafter, the image forming system according to the first exemplary embodiment will be described in detail.

First, the device function information 32 will be described in detail with reference to FIG. 6. FIG. 6 illustrates an example of a device function management table, which is the device function information 32. In the device function management table, for example, a device ID, information representing the name of a device (for example, the type of a device), information representing one or plural functions of the device (function identification information), and an image ID are associated with each other. The device ID and the name of a device correspond to an example of device identification information. The image ID is an example of image identification information for identifying an image schematically representing a device (for example, an icon). The device function management table does not necessarily include the image ID. For example, the device having a device ID "B" is a multifunction peripheral (MFP, an image forming apparatus having plural image forming functions) and has a print function, a scan function, and so forth. An image ID for identifying an image schematically representing the device is associated with the device. The data of the image schematically representing the device is stored in, for example, the memory 30 of the server 14.

For example, with use of the AR technologies, a device ID for identifying a device to be used is obtained. The specifying unit 38 of the server 14 specifies the name of the device, one or plural functions, and image ID associated with the device ID by referring to the device function management table. Accordingly, the device to be used is identified. For example, information representing the name of the device and the data of an image schematically representing the device are transmitted from the server 14 to the terminal apparatus 16 and then they are displayed on the UI unit 46 of the terminal apparatus 16. The image schematically representing the device is displayed as an image related to the device. Of course, instead of the image schematically representing the device, an image captured by the camera 42 may be displayed on the UI unit 46 of the terminal apparatus 16. If the image related to the device (for example, the image captured by the camera 42 or the image schematically representing the device) is designated by the user on the UI unit 46 of the terminal apparatus 16, information about the functions of the device (for example, function identification information or function explanation information) may be transmitted from the server 14 to the terminal apparatus 16 and may be displayed on the UI unit 46 of the terminal apparatus 16.

Next, the cooperative function information 34 will be described in detail with reference to FIG. 7. FIG. 7 illustrates an example of a cooperative function management table, which is the cooperative function information 34. In the cooperative function management table, for example, information representing a combination of device IDs, information representing the names (types) of target devices that cooperate with each other, information representing one or plural cooperative functions (cooperative function identification information), information representing a linkage order, and information representing an order of priority are associated with each other. The linkage order corresponds to an order in which images related to devices are linked. The order of priority is an order of priority in which information about cooperative functions is displayed. For example, the device having a device ID "A" is a personal computer (PC), and the device having a device ID "B" is an MFP. The cooperation between the PC (A) and the MFP (B) implements, for example, a scan and transfer function and a print function as cooperative functions. The scan and transfer function is a function of transferring image data generated through scanning by the MFP (B) to the PC (A). The print function is a function of transmitting data (for example, image data or document data) stored in the PC (A) to the MFP (B) and printing the data by the MFP (B). For example, if a link is made from the MFP (B) to the PC (A), that is, if a link is made from an image related to the MFP (B) to an image related to the PC (A), the order of priority of the scan and transfer function is "1" and the order of priority of the print function is "2". In this case, information about the scan and transfer function is displayed with priority over information about the print function. On the other hand, if a link is made from the PC (A) to the MFP (B), that is, if a link is made from an image related to the PC (A) to an image related to the MFP (B), the order of priority of the print function is "1" and the order of priority of the scan and transfer function is "2". In this case, information about the print function is displayed with priority over information about the scan and transfer function.

Figure 8:
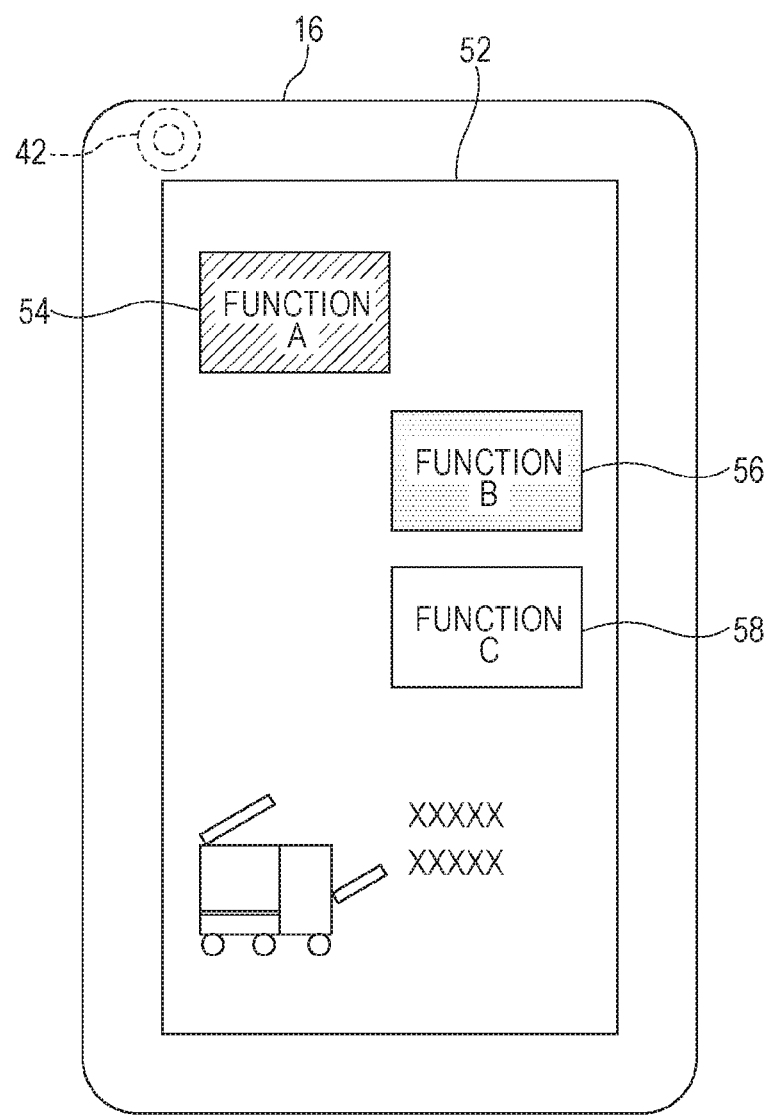
FIG. 8 is a diagram illustrating an example of a function display screen displayed on the terminal apparatus.

Next, a screen displayed on the UI unit 46 of the terminal apparatus 16 will be described in detail with reference to FIG. 8. FIG. 8 illustrates an example of a function display screen. The function display screen is a screen that is displayed on the UI unit 46 of the terminal apparatus 16 in the case of using a single device.

For example, with use of any of the above-described marker-based AR technology, markerless AR technology, and position information AR technology, the device identification information of the device to be used (for example, the image forming apparatus 10) is obtained and the device is identified, and the pieces of function identification information representing the individual functions associated with the device identification information, that is, the pieces of function identification information representing the individual functions of the device to be used (identified device) are specified. Alternatively, the pieces of function identification information representing the individual functions associated with the user identification information of the user who uses the target device, that is, the pieces of function identification information representing the individual functions available to the user, may be specified. These pieces of information are displayed, as a function display screen, on the UI unit 46 of the terminal apparatus 16. Alternatively, since the functions of the device to be used are specified, functions that the device to be used does not have among the functions in sale may be specified. The pieces of function identification information representing the individual functions that the device to be used does not have may be displayed on the function display screen.

On a function display screen 52 illustrated in FIG. 8, a button image 54 representing function A, a button image 56 representing function B, and a button image 58 representing function C are displayed as an example of pieces of function identification information. Function A is a function of the device to be used (the device identified by using the AR technologies or the like) and is a function available to the user, that is, a function purchased by the user. Function B is a function of the device to be used and is a function unavailable to the user, that is, a function not purchased by the user. The user becomes able to use function B by purchasing it. Function C is a function that the device to be used does not have, that is, a function incompatible with the device to be used. In accordance with whether or not the function represented by a button image is a function of the device to be used, the controller 48 of the terminal apparatus 16 may change the display form of the button image. Also, in accordance with whether or not the function represented by a button image is a function available to the user, the controller 48 may change the display form of the button image. For example, the controller 48 may change the color or shape of each button image. In the example illustrated in FIG. 8, the button images 54, 56, and 58 are displayed in different colors. For example, a button image representing a function that the device to be used has and that is available to the user (for example, the button image 54 representing function A) is displayed in blue. A button image representing a function that the device to be used has and that is unavailable to the user (for example, the button image 56 representing function B) is displayed in yellow. A button image representing a function that the device to be used does not have (for example, the button image 58 representing function C) is displayed in gray.

Alternatively, the controller 48 may change the shapes of the button images 54, 56, and 58, or may change the fonts of the function display names. Of course, the display form may be changed in another method. Accordingly, the user may be able to recognize the availability of each function with enhanced visibility.

For example, if the user designates the button image 54 representing function A by using the terminal apparatus 16 and provides an instruction to execute function A, execution instruction information representing an instruction to execute function A is transmitted from the terminal apparatus 16 to the target device. The execution instruction information includes control data for executing function A, image data to be subjected to the process by function A, and so forth. In response to receipt of the execution instruction information, the target device executes function A in accordance with the execution instruction information. For example, if the target device is the image forming apparatus 10 and if function A is a scan and transfer function, the image forming unit 20 of the image forming apparatus 10 executes a scan function to generate scan data (image data). The scan data is then transmitted from the image forming apparatus 10 to a destination that is set (for example, the terminal apparatus 16).

If the user designates the button image 56 representing function B by using the terminal apparatus 16 and provides an instruction to purchase function B, a purchase process is performed. If the purchase process is performed by the server 14, the terminal apparatus 16 accesses the server 14. Accordingly, a screen for purchasing function B (for example, a website), which is information enabling the user to use function B, is displayed on the UI unit 46 of the terminal apparatus 16. By taking a purchase procedure on the screen, the user is allowed to use function B. For example, the terminal apparatus 16 stores a program of a web browser. With use of the web browser, the user is able to access the server 14 from the terminal apparatus 16. When the user accesses the server 14 by using the web browser, a function purchase screen (for example, a website) is displayed on the UI unit 46 of the terminal apparatus 16, and the user is able to purchase the function through the website. Of course, the purchase process may be performed by a server different from the server 14. Alternatively, as the information enabling the user to use function B, a usage permission request screen (for example, a website) for requesting the use of function B to a manager or the like may be displayed on the UI unit 46 of the terminal apparatus 16. If the user requests permission to use function B to the manager or the like through the usage permission request screen and if the permission is obtained, the user is able to use function B.

Hereinafter, a detailed description will be given of a method for causing plural functions to cooperate with each other by applying the AR technologies.

Figure 9:
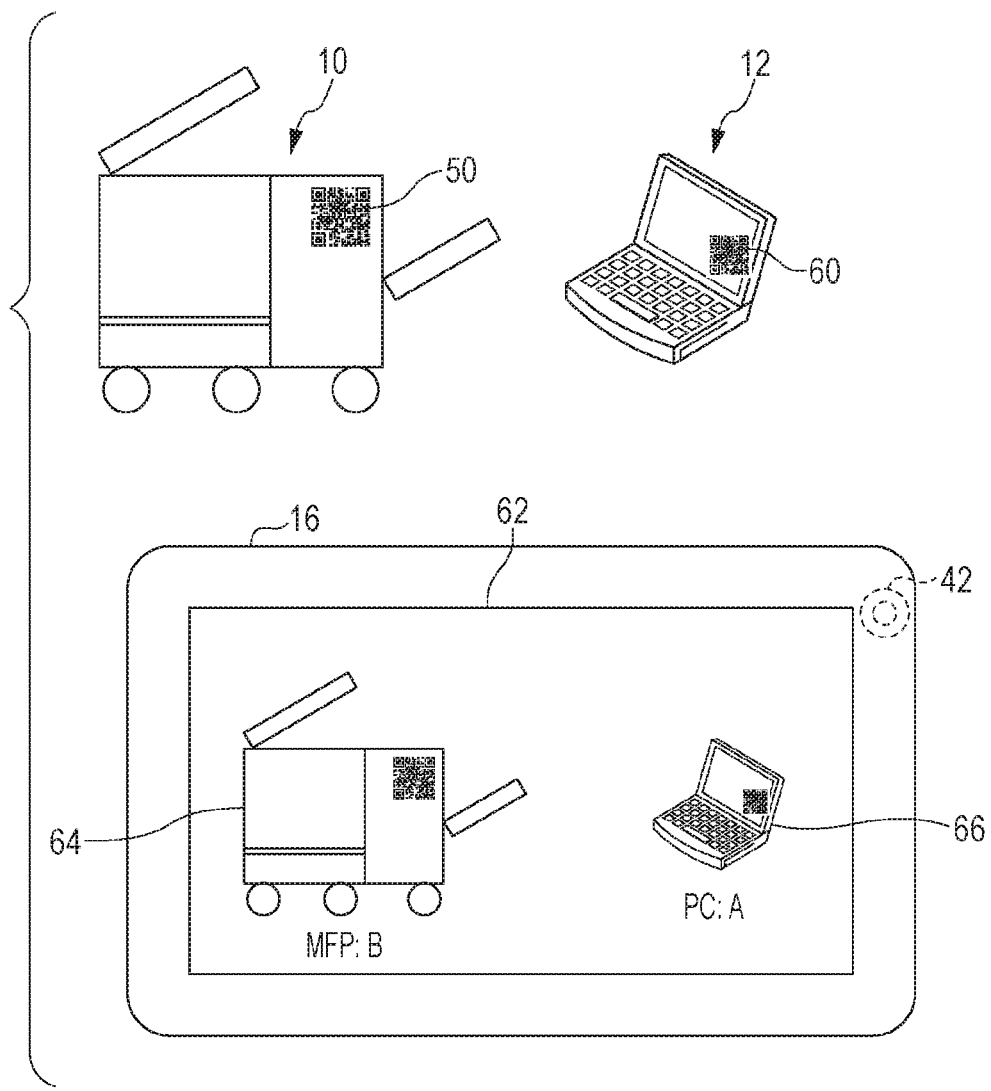
FIG. 9 is a diagram illustrating target devices that cooperate with each other.

With reference to FIG. 9, a description will be given of a method for identifying plural devices by applying the marker-based AR technology or the markerless AR technology and causing plural functions of the plural devices to cooperate with each other. FIG. 9 illustrates an example of target devices that cooperate with each other. For example, it is assumed that the image forming apparatus 10 and the terminal apparatus 12 are used as the target devices. The image forming apparatus 10 is a multifunction peripheral (MFP) and the terminal apparatus 12 is a personal computer (PC), for example. The image forming apparatus 10 and the terminal apparatus 12 are devices that exist in real space. The terminal apparatus 16 is an apparatus that exists in real space and that is used to cause plural functions to cooperate with each other. The terminal apparatus 16 is a mobile terminal apparatus such as a smartphone or a mobile phone, for example.

For example, the marker 50, such as a two-dimensional barcode, is attached to the housing of the image forming apparatus 10, and a marker 60, such as a two-dimensional barcode, is attached to the housing of the terminal apparatus 12 (PC). The marker 60 is information obtained by coding the device identification information of the terminal apparatus 12. In a case where the marker-based AR technology or the markerless AR technology is used, the user captures, by using the camera 42 of the terminal apparatus 16 (for example, a smartphone), an image of the image forming apparatus 10 and the terminal apparatus 12 as the target devices that cooperate with each other. In the example illustrated in FIG. 9, an image of both the image forming apparatus 10 and the terminal apparatus 12 is captured in a state where both the image forming apparatus 10 and the terminal apparatus 12 are within the field of view of the camera 42. Accordingly, image data representing the markers 50 and 60 is generated and the image data is transmitted from the terminal apparatus 16 to the server 14. In the server 14, the controller 36 performs a decoding process on the image data to extract the device identification information of the image forming apparatus 10 and the device identification information of the terminal apparatus 12, and thereby identifies the image forming apparatus 10 and the terminal apparatus 12. Alternatively, appearance image data representing the appearances of both the image forming apparatus 10 and the terminal apparatus 12 may be generated and the appearance image data may be transmitted from the terminal apparatus 16 to the server 14. In this case, in the server 14, the controller 36 specifies the device identification information of the image forming apparatus 10 and the device identification information of the terminal apparatus 12 by referring to the appearance image correspondence information. Accordingly, the image forming apparatus 10 and the terminal apparatus 12 are identified. Of course, the process for identifying the target devices that cooperate with each other may be performed by the terminal apparatus 16.

A device display screen 62 is displayed on the display of the UI unit 46 of the terminal apparatus 16, and a device image 64 related to the image forming apparatus 10 and a device image 66 related to the terminal apparatus 12 are displayed on the device display screen 62. The device images 64 and 66 may be images (having an original size at the capturing or an increased or decreased size) of the devices (the image forming apparatus 10 and the terminal apparatus 12) captured by the camera 42, or may be pieces of image data that are related to the identified devices and that are prepared in advance (not images obtained through capturing but schematic images (for example, icons)). As described above, images representing the devices captured by an external camera may be used.

For example, in the case of using image data obtained by capturing an image of a device, the appearance of the device in a current state (for example, an appearance including a scratch, note, sticker attached to the device, and so forth) is reflected in the image, and thus the user may be able to visually recognize the difference from another device of the same type more clearly.

In the case of using a schematic image, the data of the schematic image is transmitted, for example, from the server 14 to the terminal apparatus 16. For example, when the image forming apparatus 10 is identified, the specifying unit 38 of the server 14 specifies the schematic image related to the image forming apparatus 10 by referring to the device function management table (device function information 32) illustrated in FIG. 6. The data of the schematic image is transmitted from the server 14 to the terminal apparatus 16, and the schematic image is displayed as the device image 64 on the device display screen 62. The same applies to the device image 66 related to the terminal apparatus 12. The data of the device images 64 and 66 as schematic images may be stored in the terminal apparatus 16 in advance. In this case, when the image forming apparatus 10 is identified, the device image 64 stored in the terminal apparatus 16 is displayed on the device display screen 62. The same applies to the terminal apparatus 12. The data of schematic images may be stored in an apparatus other than the server 14 and the terminal apparatus 16.

When a device is identified, information representing the name of the device may be transmitted from the server 14 to the terminal apparatus 16, and the name of the device may be displayed on the device display screen 62 of the terminal apparatus 16. In the example illustrated in FIG. 9, the image forming apparatus 10 is an MFP, and the name thereof is "MFP (B)". The terminal apparatus 12 is a PC, and the name thereof is "PC (A)".

If a device as a target of image capturing is not identified even if the AR technologies or the like are applied, the device image representing the target device is not necessarily displayed on the device display screen 62. Accordingly, the visibility of an identified device may increase. For example, if there are an identified device and an unidentified device and if images of the individual devices are captured by the camera 42, the device image representing the unidentified device is not displayed. Accordingly, the device image representing the identified device is displayed while being distinguished from the device image representing the unidentified device, and thus the visibility of the identified device may increase. Alternatively, the device image representing the identified device (for example, the device images 64 and 66) may be displayed in a highlighted manner. For example, the device image representing the identified device may be displayed in a specific color, may be displayed by highlighting the edge of the device image, may be displayed by enlarging the device image, may be displayed three-dimensionally, or may be displayed by blinking the device image. Accordingly, the visibility of the identified device may increase.

With the user's operation of the device images 64 and 66 on the device display screen 62, the image forming apparatus 10 and the terminal apparatus 12 are designated as the target devices that cooperate with each other, and the cooperative functions to be executed through cooperation between the image forming apparatus 10 and the terminal apparatus 12 are specified. The information about the cooperative functions is displayed on the UI unit 46 of the terminal apparatus 16 in accordance with the order of priority corresponding to the order in which the device images are operated.

Hereinafter, an operation for specifying a cooperative function will be described in detail with reference to FIGS. 10A to 11B.

Figure 10A:
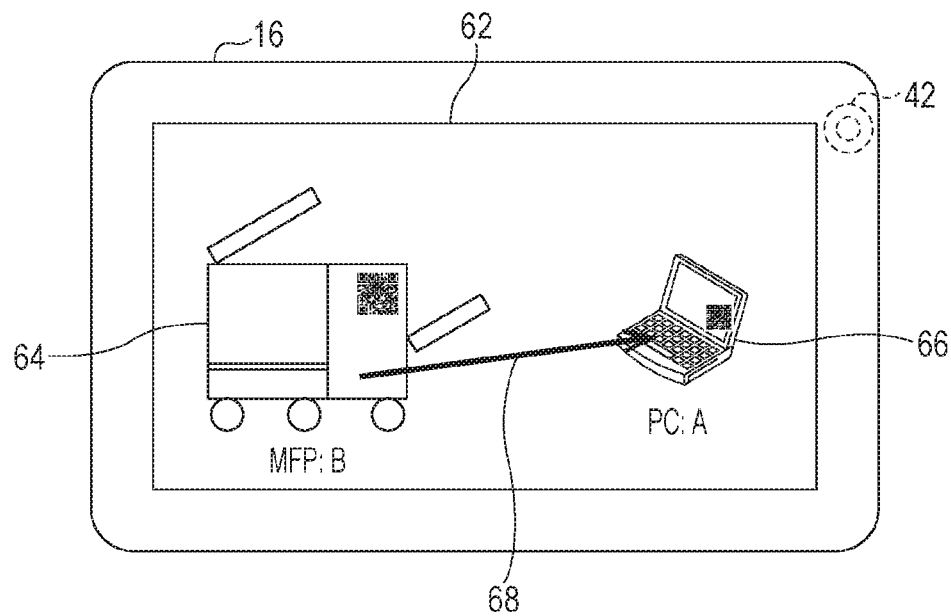
FIGS. 10A and 10B are diagrams illustrating an example of a screen displayed on the terminal apparatus according to the first exemplary embodiment.

FIGS. 10A to 11B illustrate an example of a screen displayed on the UI unit 46 of the terminal apparatus 16. For example, it is assumed that the image forming apparatus 10 and the terminal apparatus 12 are identified as the target devices that cooperate with each other. As illustrated in FIG. 10A, the device display screen 62 is displayed on the UI unit 46 of the terminal apparatus 16, and the device images 64 and 66 are displayed on the device display screen 62. In this state, the user links the device images representing the target devices to each other by using an indicator (for example, a user's finger, a pen, or a stylus). The controller 48 of the terminal apparatus 16 detects the touch of the indicator on the device display screen 62 and detects a movement of the indicator on the device display screen 62. For example, as indicated by an arrow 68, the user touches the device image 64 on the device display screen 62 by using an operator and moves the operator to the device image 66 on the device display screen 62, and thereby links the device image 64 to the device image 66. Accordingly, the image forming apparatus 10 (MFP (B)) related to the device image 64 and the terminal apparatus 12 (PC (A)) related to the device image 66 are designated as the target devices that cooperate with each other and a linkage order is designated. The order in which the device images are linked corresponds to the linkage order. In the example illustrated in FIG. 10A, a link is made from the device image 64 to the device image 66, that is, from the image forming apparatus 10 (MFP (B)) to the terminal apparatus 12 (PC (A)). The information representing the linkage order of the devices is transmitted from the terminal apparatus 16 to the server 14. The controller 48 of the terminal apparatus 16 may cause an image representing the trail of the movement of the operator performed by the user to be displayed on the device display screen 62. After the devices are linked to each other, the controller 48 of the terminal apparatus 16 may cause a preset straight line or the like representing the trail to be displayed on the device display screen 62.

When the target devices that cooperate with each other (for example, the image forming apparatus 10 and the terminal apparatus 12) are designated in the above-described manner, the specifying unit 38 of the server 14 specifies the cooperative functions associated with the combination of the PC (A) and the MFP (B) in the cooperative function management table (cooperative function information 34) illustrated in FIG. 7. Accordingly, the cooperative functions to be executed through cooperation between the PC (A) and the MFP (B) are specified. When the linkage order of the devices is designated by the user, the specifying unit 38 specifies the order of priority associated with the linkage order in the cooperative function management table. Specifically, with reference to FIG. 7, since the PC (A) and the MFP (B) are designated as the target devices that cooperate with each other, the cooperative functions to be executed by these devices are a scan and transfer function and a print function. Furthermore, since the link is made from the MFP (B) to the PC (A) (B→A), the order of priority of the scan and transfer function is "1" and the order of priority of the print function is "2".

The information about the specified cooperative functions and the information about the specified order of priority are transmitted from the server 14 to the terminal apparatus 16. The controller 48 of the terminal apparatus 16 causes the UI unit 46 to display the information about the cooperative functions as the information about candidate cooperative functions in accordance with the order of priority.

Figure 10B:
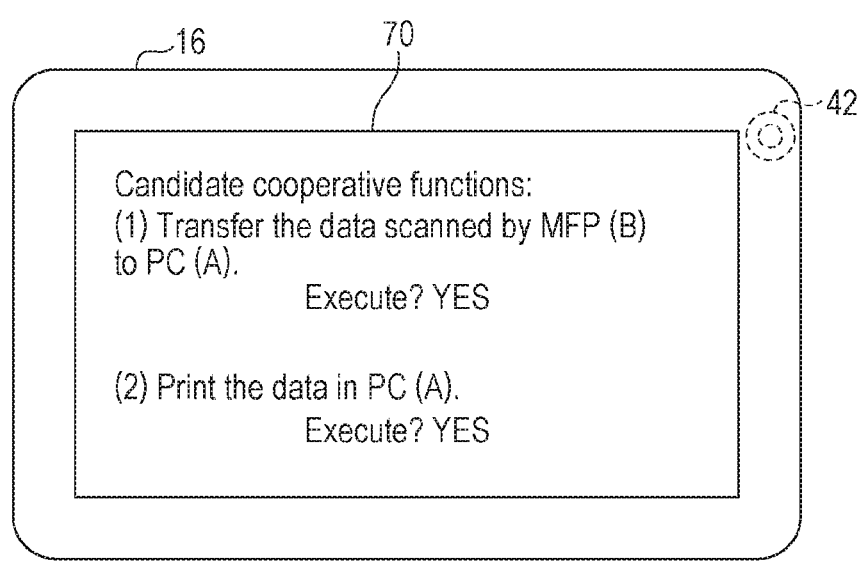

For example, as illustrated in FIG. 10B, the controller 48 of the terminal apparatus 16 causes the UI unit 46 to display a cooperative function display screen 70 and to display the information about the candidate cooperative functions on the cooperative function display screen 70. Since the order of priority of the scan and transfer function is "1" and the order of priority of the print function is "2", the information about the scan and transfer function is displayed with priority over (for example, above) the information about the print function. For example, as the information about the scan and transfer function, an explanation of the scan and transfer function "transfer the data scanned by MFP (B) to PC (A)" is displayed. Also, as the information about the print function, an explanation of the print function "print the data in PC (A)" is displayed.

If a cooperative function is designated by the user and an execution instruction is provided, the designated cooperative function is executed. For example, if a "YES" button is pressed by the user, the cooperative function related to the "YES" button is executed. Also, a "back" button is displayed on the cooperative function display screen 70. If the "back" button is pressed by the user, the process of connecting the devices is stopped.

The process of specifying cooperative functions and the process of specifying an order of priority may be performed by the terminal apparatus 16.

The target devices that cooperate with each other may be designated and the linkage order thereof may be designated by drawing circles around the device images, instead of moving the operator between device images. For example, the order of a drawing operation corresponds to the linkage order. Alternatively, the target devices that cooperate with each other and the linkage order thereof may be designated in accordance with a voice instruction provided by the user.

Figure 11A:
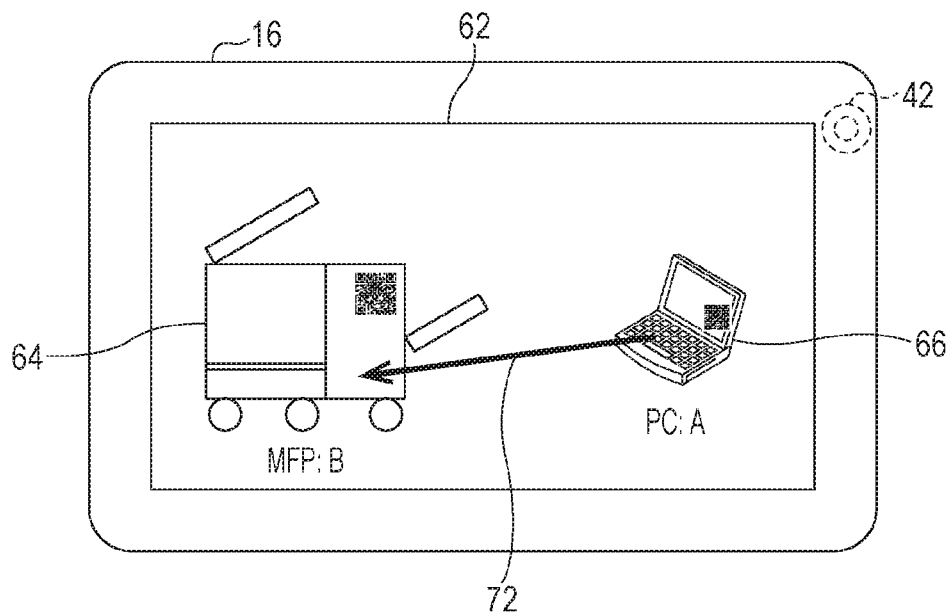
FIGS. 11A and 11B are diagrams illustrating an example of a screen displayed on the terminal apparatus according to the first exemplary embodiment.
Figure 11B:
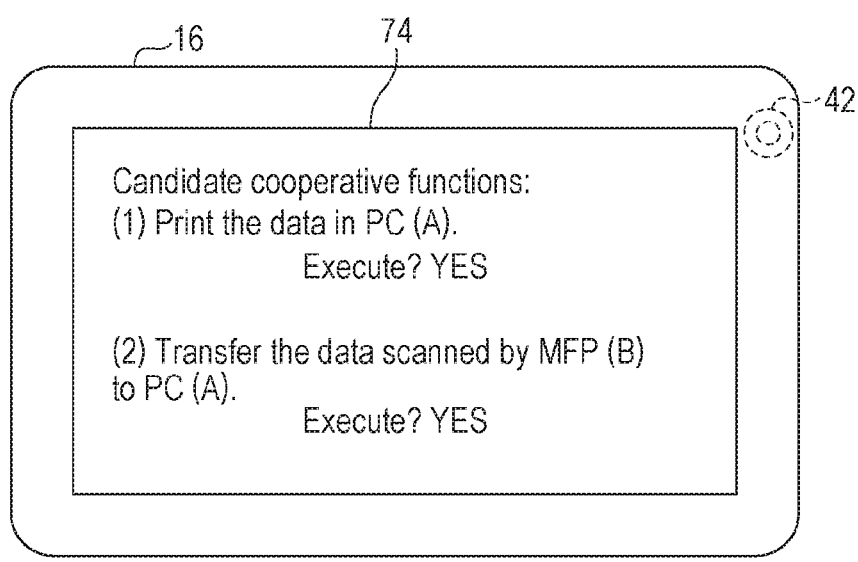

FIGS. 11A and 11B illustrate an example of another operation. For example, as illustrated in FIG. 11A, the user touches the device image 66 on the device display screen 62 by using an operator and moves the operator to the device image 64 in the direction indicated by an arrow 72, and thereby links the device image 66 to the device image 64. Accordingly, the terminal apparatus 12 (PC (A)) related to the device image 66 and the image forming apparatus 10 (MFP (B)) related to the device image 64 are designated as the target devices that cooperate with each other, and also the linkage order is designated. In this example, a link is made from the device image 66 to the device image 64, that is, from the terminal apparatus 12 (PC (A)) to the image forming apparatus 10 (MFP (B)). With reference to the cooperative function management table illustrated in FIG. 7, the order of priority of the print function is "1" and the order of priority of the scan and transfer function is "2". In this case, as illustrated in FIG. 11B, the information about the print function is displayed with priority over (for example, above) the information about the scan and transfer function on a cooperative function display screen 74.

As described above, according to the first exemplary embodiment, device images related to devices are linked to each other and thereby cooperative functions that use functions of the devices are specified. In accordance with the order in which the images are linked, that is, the order in which the devices are linked, the display order of information about the cooperative functions is changed. The linkage order of the devices is also regarded as the order of functions to be used in the individual devices or the order of movement of data between the devices that cooperate with each other. The operation of linking the devices (the operation of linking the images) is also regarded as the operation of designating the order of functions or the order of movement of data. Thus, as a result of changing the display order of the information about the cooperative functions in accordance with the linkage order, the information about the cooperative function that is expected to be used by the user is preferentially displayed. In other words, the information about the cooperative function that is more likely to be used by the user is preferentially displayed. For example, if a link is made from the MFP (B) to the PC (A), it is expected that the user will use the cooperative function of "using the function of the MFP (B) first and then transferring data from the MFP (B) to the PC (A)". On the other hand, if a link is made from the PC (A) to the MFP (B), it is expected that the user will use the cooperative function of "using the function of the PC (A) first and then transferring data from the PC (A) to the MFP (B)". Thus, as a result of changing the display order of the information about the cooperative functions in accordance with the linkage order of the images, the information about the cooperative function that is more likely to be used by the user is preferentially displayed. Furthermore, the order of functions to be used and the order of movement of data are designated without a special operation other than an operation of linking the device images, and the information about the cooperative function that is expected to be used by the user is displayed.

Hereinafter, modification examples of the first exemplary embodiment will be described.

First Modification Example

Hereinafter, a first modification example will be described. In the first modification example, a function of a device assigned to a cooperative function varies according to a position in a device image related to the device. When a specific position in a device image is designated by the user, information about a cooperative function that uses the function corresponding to the specific position is preferentially displayed. Hereinafter, the first modification example will be described in detail.

FIG. 12 illustrates an example of a device function management table according to the first modification example. The data of the device function management table according to the first modification example is stored as the device function information 32 in the server 14. In the device function management table according to the first modification example, for example, a device ID, information representing the name (for example, the type) of a device, information representing a position in an image, information representing the function corresponding to the position (function identification information), and an image ID are associated with each other. A position in an image is a specific position (specific portion) in a device image related to a device, for example, a specific position in the device image schematically representing the device or a specific position in the device image captured by a camera. A different function is associated with each specific position in the image.

Figure 13A:
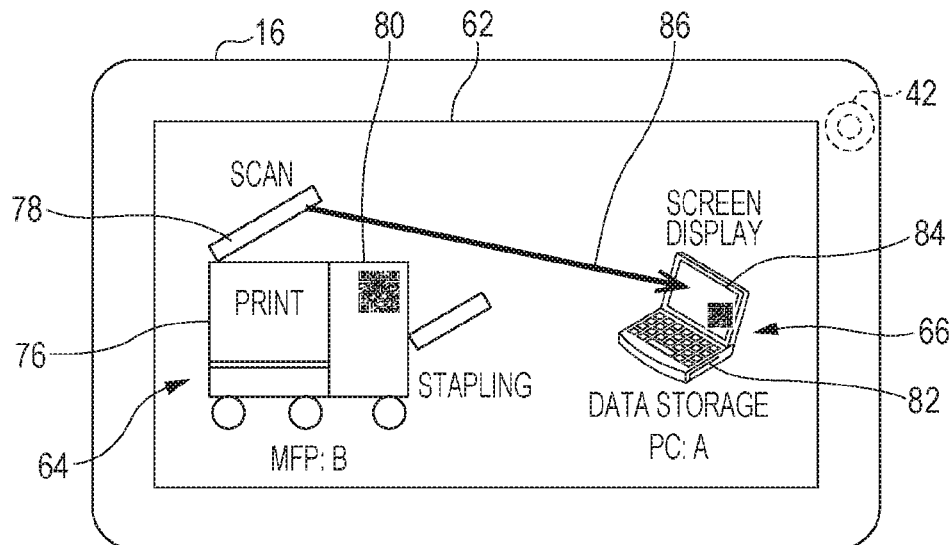
FIGS. 13A and 13B are diagrams illustrating an example of a screen displayed on the terminal apparatus according to the first modification example.
Figure 13B:
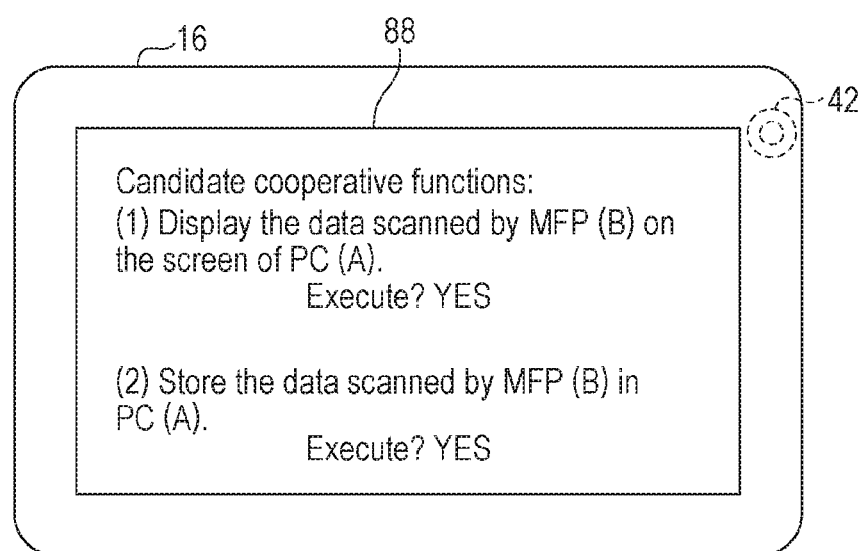

FIGS. 13A and 13B illustrate an example of a screen displayed on the UI unit 46 of the terminal apparatus 16. For example, it is assumed that the image forming apparatus 10 (MFP (B)) and the terminal apparatus 12 (PC (A)) are identified as the target devices that cooperate with each other. As illustrated in FIG. 13A, the device display screen 62 is displayed on the UI unit 46 of the terminal apparatus 16, and the device images 64 and 66 are displayed on the device display screen 62. For example, in the device image 64, a print function is associated with a specific position (partial image 76) corresponding to a body portion of the MFP (B). In the device image 64, a scan function is associated with a specific position (partial image 78) corresponding to a document cover, a document glass, and an automatic document feeder of the MFP (B). In the device image 64, a stapling function is associated with a specific position (partial image 80) corresponding to a post-processor. The stapling function is a function of stapling output sheets. In the device image 66, a data storage function is associated with a specific position (partial image 82) corresponding to a body portion of the PC (A). In the device image 66, a screen display function is associated with a specific position (partial image 84) corresponding to a display of the PC (A). The data storage function is a function of storing data received from another apparatus in the PC (A). The screen display function is a function of displaying data received from another apparatus in the PC (A).

The controller 48 of the terminal apparatus 16 may cause the names of functions associated with specific positions in a device image (for example, print, scan, and so forth) to be displayed on the device display screen 62. Accordingly, the user is provided with information clearly representing the correspondence between specific positions and functions. Of course, the names of functions are not necessarily displayed.

In the first modification example, if positions associated with functions in device images are designated by the user, the functions associated with the designated positions are designated as the target functions that cooperate with each other. The user links, by using an indicator, the specific positions (partial images) associated with the functions in the device images representing the target devices that cooperate with each other. For example, as indicated by an arrow 86, the user touches, by using an operator, the partial image 78 on the device display screen 62 and moves the operator to the partial image 84, thereby linking the partial image 78 to the partial image 84. Accordingly, the MFP (B) related to the device image 64 including the partial image 78 and the PC (A) related to the device image 66 including the partial image 84 are designated as the target devices that cooperate with each other, the scan function corresponding to the partial image 78 and the screen display function corresponding to the partial image 84 are designated, and the linkage order thereof is designated. The order in which the partial images are linked corresponds to the linkage order. In the example illustrated in FIG. 13A, a link is made from the partial image 78 to the partial image 84, that is, from the MFP (B) to the PC (A). The scan function and the screen display function are designated as the functions used for a cooperative function. The information representing the linkage order of the devices and the information representing the specific positions designated in the device images by the user are transmitted from the terminal apparatus 16 to the server 14.

When the target devices that cooperate with each other (for example, the PC (A) and the MFP (B)) are identified, the specifying unit 38 of the server 14 specifies the cooperative functions to be implemented through cooperation between the PC (A) and the MFP (B) in the cooperative function management table illustrated in FIG. 7. Also, the specifying unit 38 specifies the functions associated with the specific positions designated in the device images by the user with reference to the device function management table illustrated in FIG. 12. Also, the specifying unit 38 assigns a higher priority to the cooperative function that uses the functions associated with the positions designated by the user and assigns a lower priority to the cooperative function that does not use the functions, among the cooperative functions to be implemented through cooperation between the PC (A) and the MFP (B).

The information about the cooperative functions specified in the above-described manner and the information representing the order of priority are transmitted from the server 14 to the terminal apparatus 16. The controller 48 of the terminal apparatus 16 causes the UI unit 46 to display the information about the cooperative functions, as the information about candidate cooperative functions, in accordance with the order of priority.

For example, as illustrated in FIG. 13B, the controller 48 of the terminal apparatus 16 causes the display of the UI unit 46 to display a cooperative function display screen 88 and to display the information about candidate cooperative functions on the cooperative function display screen 88. Since the scan function and the screen display function are designated in this order by the user, the information about a scan, transfer, and display function, which is a cooperative function executed through cooperation between the scan function and the screen display function, is displayed with priority over (for example, above) the information about the other cooperative functions. For example, the information about the scan, transfer, and display function is displayed with priority over the information about a scan, transfer, and storage function, which is a cooperative function executed through cooperation between the scan function and the data storage function. The scan, transfer, and display function is a function of transferring the data generated through scanning by the MFP (B) to the PC (A) and displaying the data on the screen of the PC (A). The scan, transfer, and storage function is a function of transferring the data generated through scanning by the MFP (B) to the PC (A) and storing the data in the PC (A). In the example illustrated in FIG. 13B, explanations of the individual cooperative functions are displayed as the information about the individual cooperative functions.

According to the first modification example, in a case where each of the target devices that cooperate with each other has plural functions, functions are individually designated and the information about a cooperative function that uses the designated functions is preferentially displayed. Accordingly, a cooperative function that is expected to be used by the user is preferentially displayed.

Figure 14A:
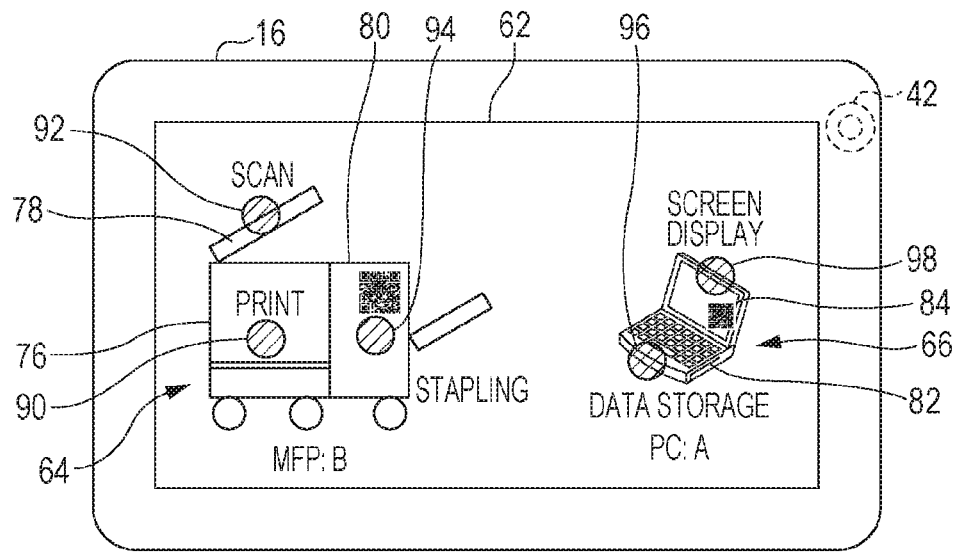
FIGS. 14A and 14B are diagrams illustrating an example of a screen displayed on the terminal apparatus according to the first modification example.
Figure 14B:
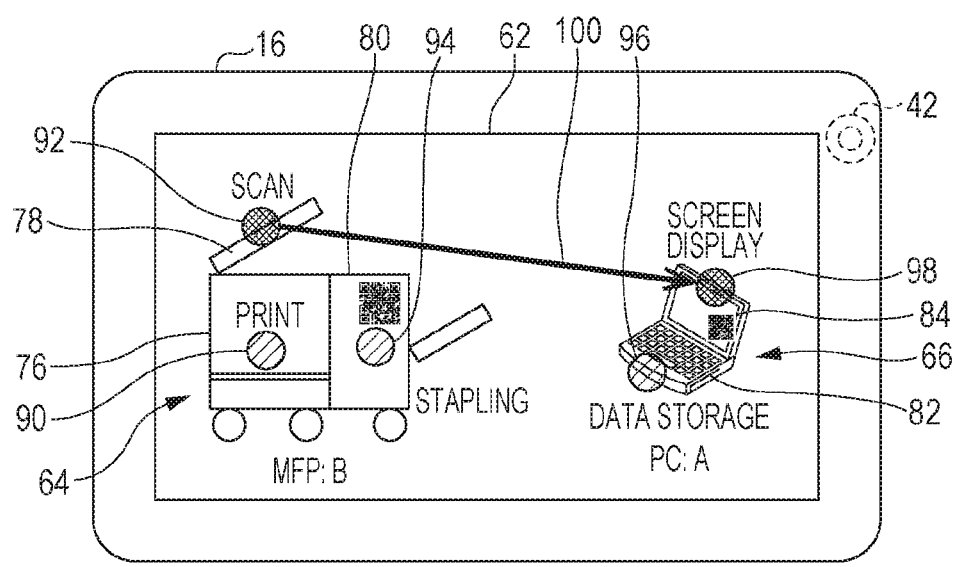

FIGS. 14A and 14B illustrate another example of the first modification example. FIGS. 14A and 14B are diagrams illustrating an example of a screen displayed on the UI unit 46 of the terminal apparatus 16. The controller 48 of the terminal apparatus 16 superimposes identifiable contact region images on specific positions (partial images) to which specific functions are assigned in a device image. In the example illustrated in FIG. 14A, a contact region image 90 is superimposed on the partial image 76, a contact region image 92 is superimposed on the partial image 78, and a contact region image 94 is superimposed on the partial image 80. Also, a contact region image 96 is superimposed on the partial image 82, and a contact region image 98 is superimposed on the partial image 84. Each contact region image is, for example, a semitransparent or opaque image, and has a circular, oval, or rectangular shape. With the contact region images being displayed at the positions to which specific functions are assigned, the positions are highlighted, and thus the user may easily determine a position to which a function is assigned. That is, the user may easily determine the position that will reacts as a function to be used for a cooperative function.

The controller 48 of the terminal apparatus 16 may change the display form (for example, at least one of the color and shape) of a contract region image corresponding to a function to be used for a cooperative function or a contract region image designated by the user so that the contact region image is distinguished from the other contact region images. For example, as illustrated in FIG. 14B, if the partial image 78 is linked to the partial image 84 through an operation indicated by an arrow 100, the contact region image 92 corresponding to the partial image 78 and the contract region image 98 corresponding to the partial image 84 are displayed in a color different from the color of the other contact region images.

Figure 15A:
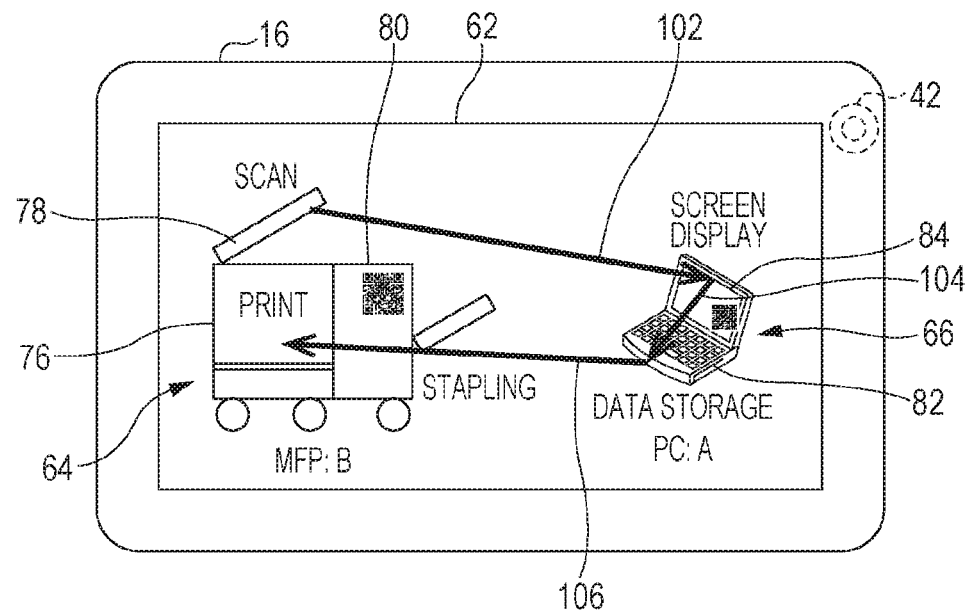
FIGS. 15A and 15B are diagrams illustrating an example of a screen displayed on the terminal apparatus according to the first modification example.
Figure 15B:
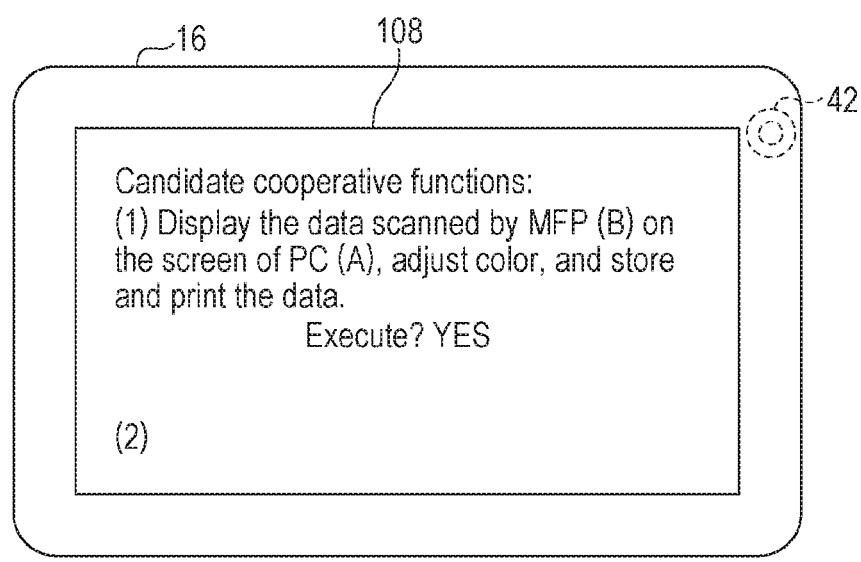

FIGS. 15A and 15B illustrate still another example of the first modification example. FIGS. 15A and 15B are diagrams illustrating an example of a screen displayed on the UI unit 46 of the terminal apparatus 16. In a case where an identified device has plural functions, plural functions of the same device may be designated to designate a cooperative function to be executed through cooperation between the plural functions. For example, as illustrated in FIG. 15A, it is assumed that the user links images in the directions indicated by arrows 102, 104, and 106. In this case, the partial images 78, 84, 82, and 76 are linked in this order. The specifying unit 38 of the server 14 specifies the functions assigned to the partial images 78, 84, 82, and 76 (scan function, screen display function, data storage function, and print function), specifies a cooperative function that uses these functions in the linkage order, and gives a high priority to the cooperative function. Accordingly, the information about the cooperative function is displayed with priority over the information about the other cooperative functions. FIG. 15B illustrates a cooperative function display screen 108, and the information about the cooperative function is preferentially displayed on the cooperative function display screen 108. The cooperative function given priority is, for example, a function of "transferring the data generated through scanning by the MFP (B) to the PC (A), displaying the data on the screen of the PC (A), adjusting color in the PC (A), storing the data in the PC (A) and transferring the data to the MFP (B), and printing the data in the MFP (B)".

Second Modification Example

Hereinafter, a second modification example will be described with reference to FIGS. 16A to 17C. FIGS. 16A to 17C illustrate an example of a screen displayed on the terminal apparatus 16. In the second modification example, if a device image is kept pressed for more than a preset time period, the mode shifts to a plural functions selection mode (the mode for designating plural functions).

Figure 16A:
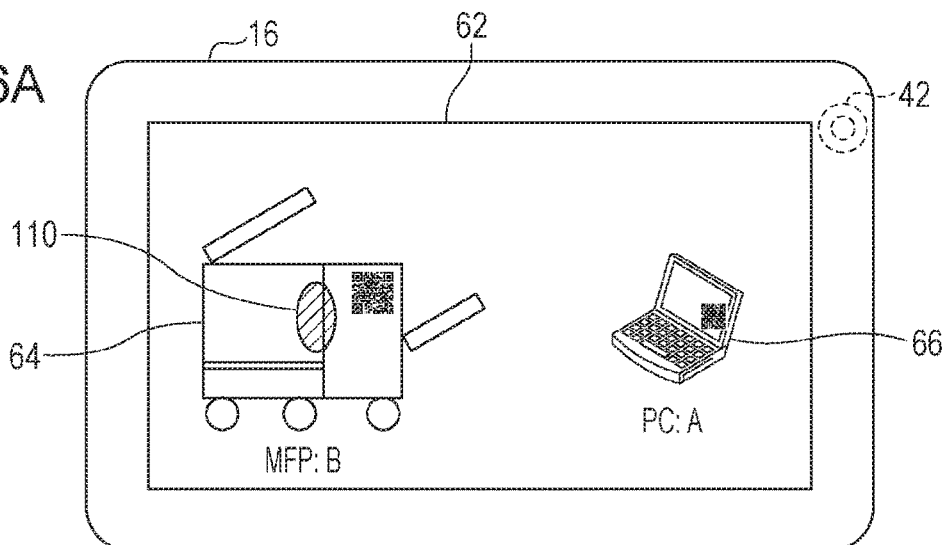
FIGS. 16A to 16C are diagrams illustrating an example of a screen displayed on the terminal apparatus according to a second modification example.
Figure 16B:
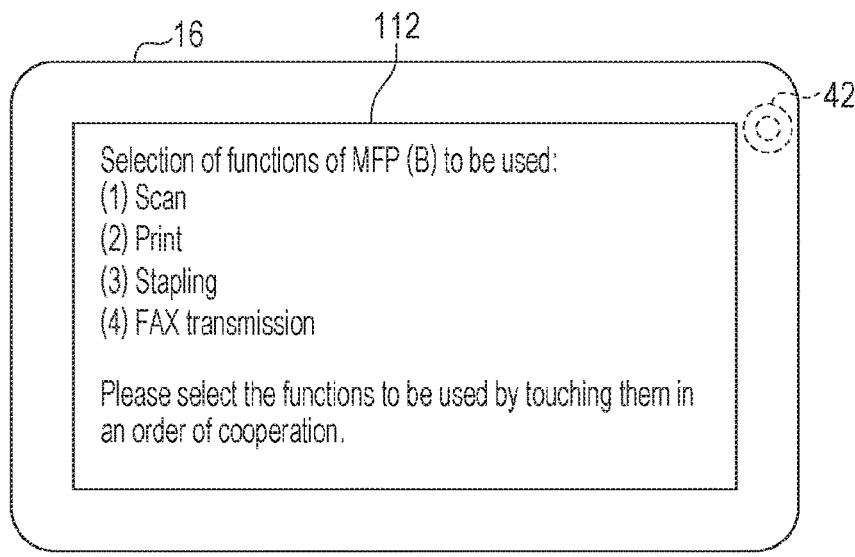

Also in the second modification example, the image forming apparatus 10 (MFP (B)) and the terminal apparatus 12 (PC (A)) are identified as the target devices that cooperate with each other, and the device images 64 and 66 are displayed on the device display screen 62 in the terminal apparatus 16 as illustrated in FIG. 16A. For example, it is assumed that the user continues designating the device image 64 for more than a preset time period by using an operator. That is, it is assumed that the device image 64 is held down. In the example illustrated in FIG. 16A, the portion denoted by reference numeral 110 is held down. In this case, as illustrated in FIG. 16B, a function selection screen 112 is displayed on the UI unit 46 of the terminal apparatus 16, and a list of functions of the MFP (B) is displayed on the function selection screen 112. In the example illustrated in FIG. 16B, the names of the individual functions (scan, print, stapling, and FAX transmission) are displayed. For example, if the device image 64 is designated by the user, the device identification information of the MFP (B) related to the device image 64 is transmitted from the terminal apparatus 16 to the server 14. In the server 14, the functions of the MFP (B) are specified with reference to the device function management table. The information about the functions (for example, function identification information) is transmitted from the server 14 to the terminal apparatus 16 and is displayed on the terminal apparatus 16. Of course, the functions of the MFP (B) may be specified in the terminal apparatus 16. In a case where the user interface of the terminal apparatus 16 is able to detect a contact force of an operation performed by the user in plural stages, the function selection screen 112 may be displayed in response to detection of a larger contact force (for example, detection of a preset contact force).

Figure 16C:
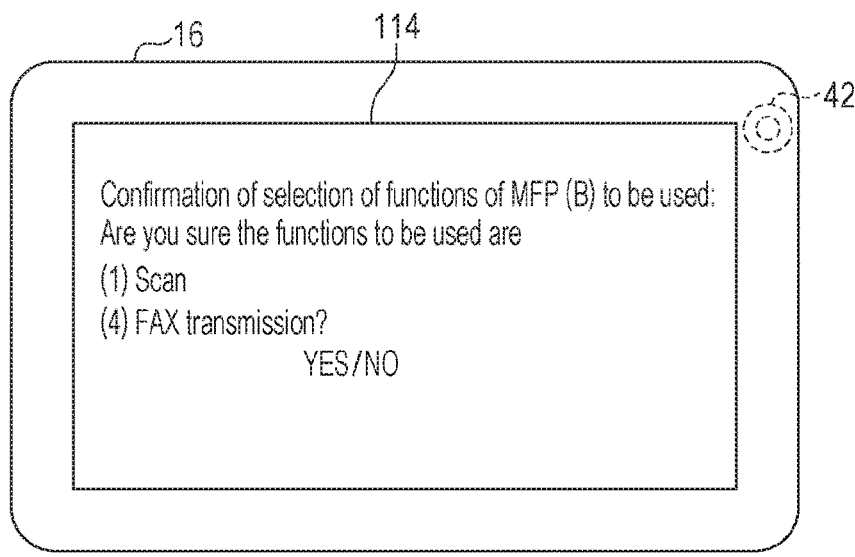
Figure 17A:
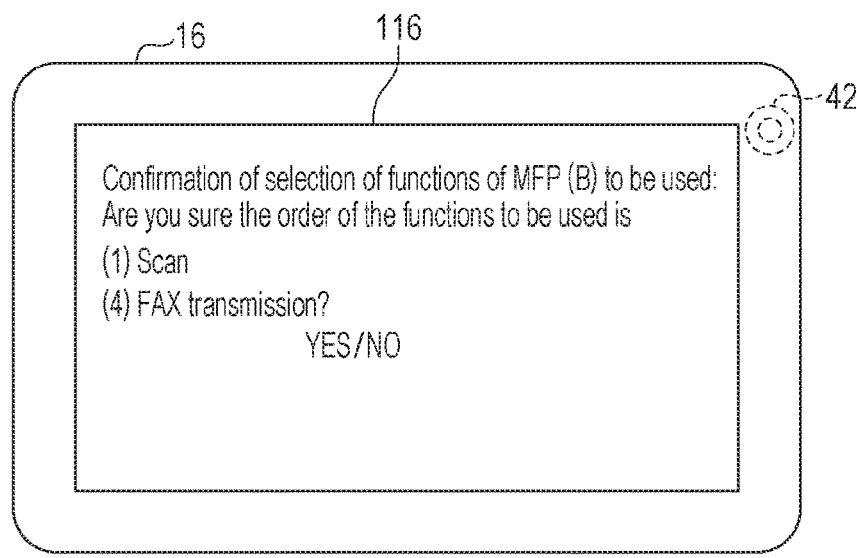
FIGS. 17A to 17C are diagrams illustrating an example of a screen displayed on the terminal apparatus according to the second modification example.

On the function selection screen 112 illustrated in FIG. 16B, plural functions to be used for a cooperative function are selected by the user. For example, it is assumed that (1) scan function and (4) FAX transmission function are selected. In this case, a confirmation screen 114 is displayed on the UI unit 46 of the terminal apparatus 16, as illustrated in FIG. 16C. On the confirmation screen 114, the information representing the functions selected by the user is displayed. If the user designates the order of cooperation (the order of use) on the confirmation screen 114, another confirmation screen 116 is displayed on the UI unit 46 of the terminal apparatus 16, as illustrated in FIG. 17A. In the example illustrated in FIG. 17A, the order of (1) scan function is "1" and the order of (4) FAX transmission function is "2". On the function selection screen 112 illustrated in FIG. 16B, the plural functions to be used for a cooperative function may be selected by the user in accordance with the order of cooperation. In this case, display of the confirmation screen 114 illustrated in FIG. 16C is omitted, and the confirmation screen 116 illustrated in FIG. 17A is displayed on the UI unit 46 of the terminal apparatus 16.

Figure 17B:
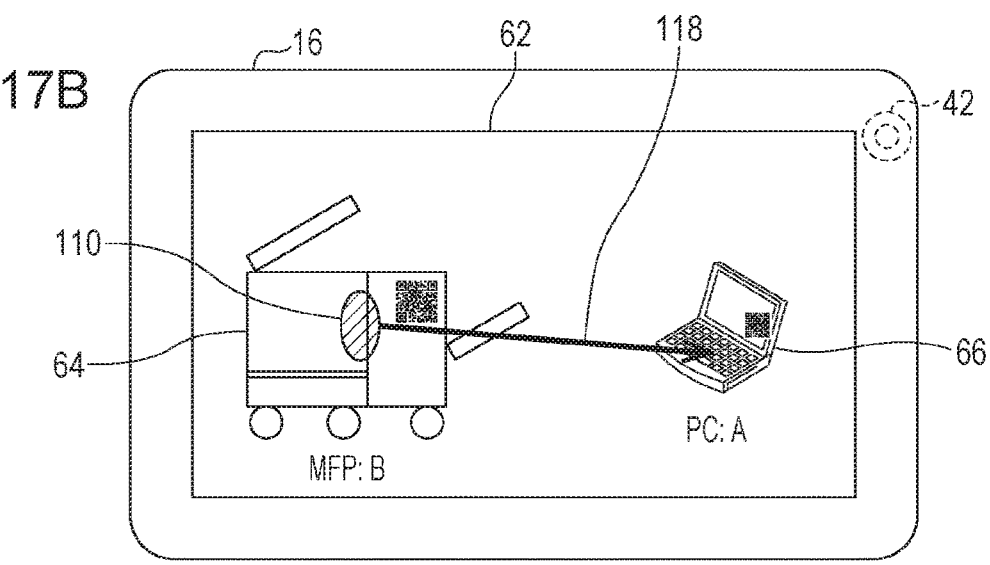
Figure 17C:
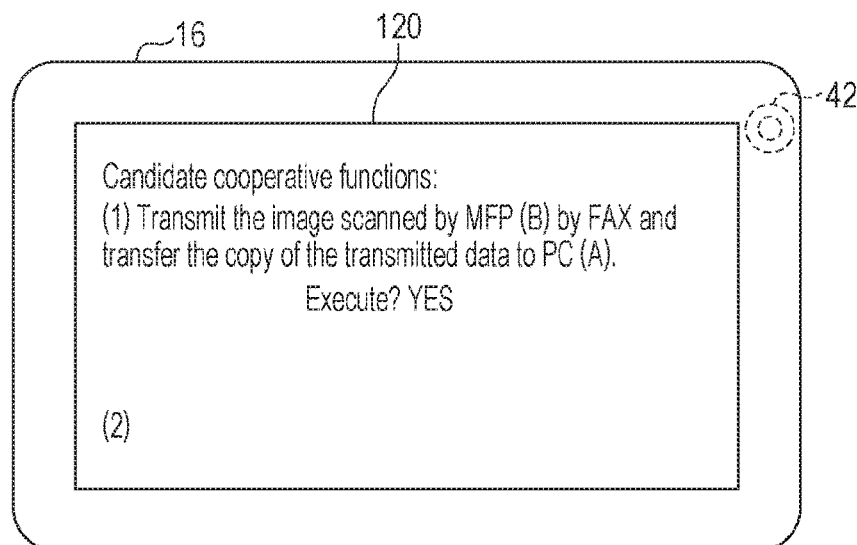

Subsequently, if the user presses a "YES" button on the confirmation screen 116 illustrated in FIG. 17A, the functions of the MFP (B) to be used for a cooperative function are confirmed, and the screen shifts to the device display screen 62, as illustrated in FIG. 17B. On the device display screen 62, the user links the device image 64 to the device image 66, as indicated by an arrow 118. Accordingly, the PC (A) is designated as the device to be used for a cooperative function and the order of cooperation (the order of use) is designated. The specifying unit 38 of the server 14 specifies the cooperative function that uses the individual functions in the order of cooperation and gives a higher priority to the cooperative function. Accordingly, the information about the cooperative function is displayed with priority over the information about the other cooperative functions. The information about the cooperative function is transmitted from the server 14 to the terminal apparatus 16 and is displayed on the terminal apparatus 16. For example, as illustrated in FIG. 17C, a cooperative function display screen 120 is displayed on the UI unit 46 of the terminal apparatus 16, and the information about the cooperative function is displayed on the cooperative function display screen 120. The information about the cooperative function that uses the individual functions in accordance with the order of cooperation is preferentially displayed. The cooperative function given priority is, for example, a function of "transmitting the image generated through scanning by the MFP (B) by FAX and transferring the copy of the transmitted data to PC (A)".

If the user presses a "NO" button on the confirmation screen 116 illustrated in FIG. 17A, the selection of the functions to be used for the cooperative function of the MFP (B) is cancelled, and the screen shifts to the function selection screen 112. A "cancel" button is displayed on the function selection screen 112. If the user presses the "cancel" button, the screen shifts to the device display screen 62.

According to the second modification example, a list of functions of a designated device is displayed, and thus the user may easily recognize the functions of the device.

Figure 18:
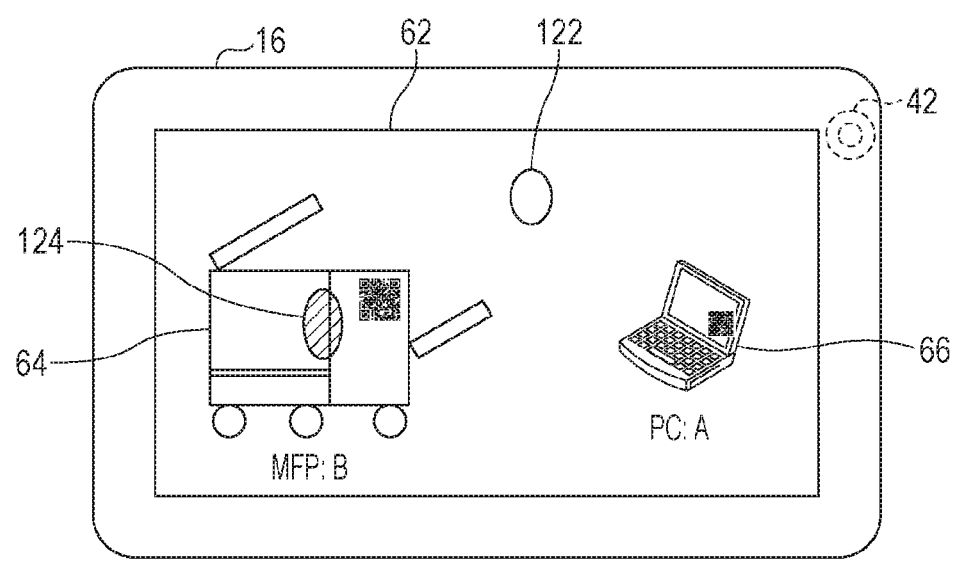
FIG. 18 is a diagram illustrating an example of a screen displayed on the terminal apparatus according to the second modification example.

FIG. 18 illustrates another example of the second modification example. In the second modification example, a button image 122 for selecting plural functions is displayed on the device display screen 62. If the user presses the button image 122 while pressing a device image, the mode shifts to the plural functions selection mode. In the example illustrated in FIG. 18, the button image 122 is pressed while the device image 64 related to the MFP (B) being pressed by the user, as denoted by reference numeral 124. In this case, the screen shifts to the function selection screen 112 illustrated in FIG. 16B. After that, the process described above with reference to FIGS. 16A to 17C is performed.

Third Modification Example

Figure 19A:
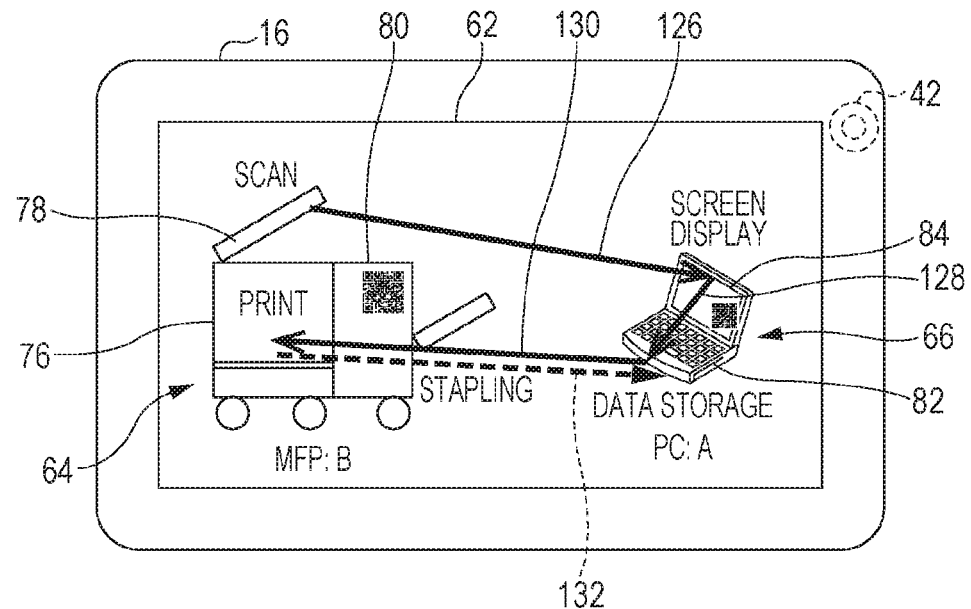
FIGS. 19A and 19B are diagrams illustrating an example of a screen displayed on the terminal apparatus according to a third modification example.
Figure 19B:
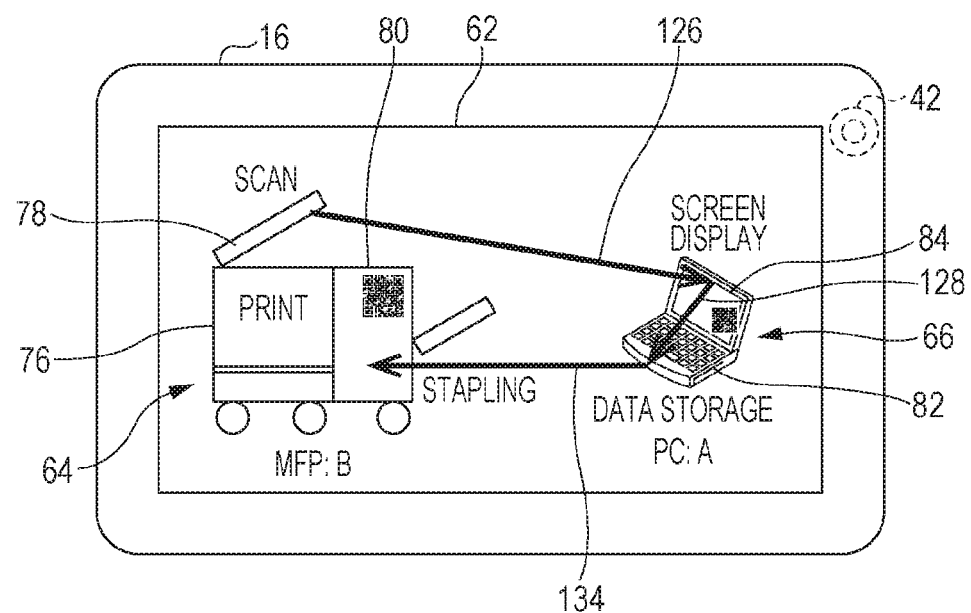

Hereinafter, a third modification example will be described with reference to FIGS. 19A and 19B. FIGS. 19A and 19B illustrate an example of a screen displayed on the UI unit 46 of the terminal apparatus 16.

Also in the third modification example, the image forming apparatus 10 (MFP (B)) and the terminal apparatus 12 (PC (A)) are identified as the target devices that cooperate with each other, and the device images 64 and 66 are displayed on the device display screen 62 in the terminal apparatus 16 as illustrated in FIG. 19A. Also, the partial images 78, 84, 82, and 76 are linked in this order as indicated by arrows 126, 128, and 130. That is, the scan function, the screen display function, the data storage function, and the print function are designated in this order.

In the third modification example, if, in terms of a linkage order, an image immediately before the target image to be cancelled is designated, the function related to the target image to be cancelled is eliminated from a cooperative function. That is, the target function to be cancelled is eliminated from the target functions that cooperate with each other. For example, if, in terms of a linkage order, an image immediately before the target image to be cancelled is designated, the information representing the designation is transmitted from the terminal apparatus 16 to the server 14, and the specifying unit 38 of the server 14 eliminates the function related to the target image to be cancelled from the target functions that cooperate with each other.

With reference to the example illustrated in FIG. 19A, a link is made from the partial image 76 to the partial image 82 as indicated by a broken-line arrow 132. That is, the partial image 82 immediately before the partial image 76 in the linkage order is designated. In this case, the function related to the partial image 76 (print function) is eliminated from the target functions that cooperate with each other.

After that, as illustrated in FIG. 19B, if a link is made from the partial image 82 to the partial image 80 by the user in the direction indicated by an arrow 134, the function related to the partial image 80 (stapling function) is selected as the target function that cooperates with another function, and the cooperative function that uses the function related to the partial image 80 is preferentially selected.

According to the third modification example, the target function to be cancelled is eliminated from the target functions that cooperate with each other, and the cooperative function that uses the target function to be cancelled is cancelled, without a special operation other than an operation of linking images. For example, if a target function that cooperates with another function is designated by mistake, the function designated by mistake is cancelled by designating the image immediately before the image related to the function in the linkage order, without performing other special operations. Accordingly, the target function to be cancelled is eliminated with a simple operation compared to the case of eliminating the function by using a cancel button or the like.

A trail of a cancellation operation (for example, the trail indicated by the arrow 132) may be displayed on the device display screen 62. In this case, the trail of the cancellation operation may be displayed in a form different from the trails of linkage operations (for example, the trails indicated by the arrows 126, 128, and 130), for example, in a different color or with a different type of line.

Alternatively, in the case of cancelling cooperation, the user may designate the device image or partial image related to the target device to be cancelled or may press a cooperation cancellation button on the device display screen 62. In a case where a device that is not the target of cooperation is displayed on the device display screen 62, the user may eliminate the device from the target devices that cooperate with each other by designating the device image related to the device on the device display screen 62. Alternatively, the device may be eliminated from the target devices that cooperate with each other if a preset operation is performed, for example, if a cross mark or the like is attached to the device image related to the target device to be cancelled.

Fourth Modification Example

Figure 20A:
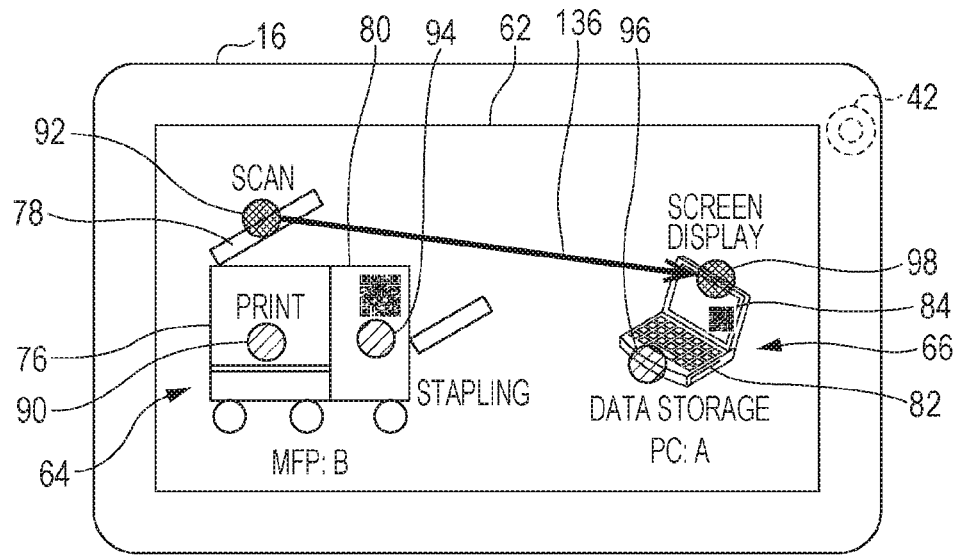
FIGS. 20A and 20B are diagrams illustrating an example of a screen displayed on the terminal apparatus according to a fourth modification example.
Figure 20B:
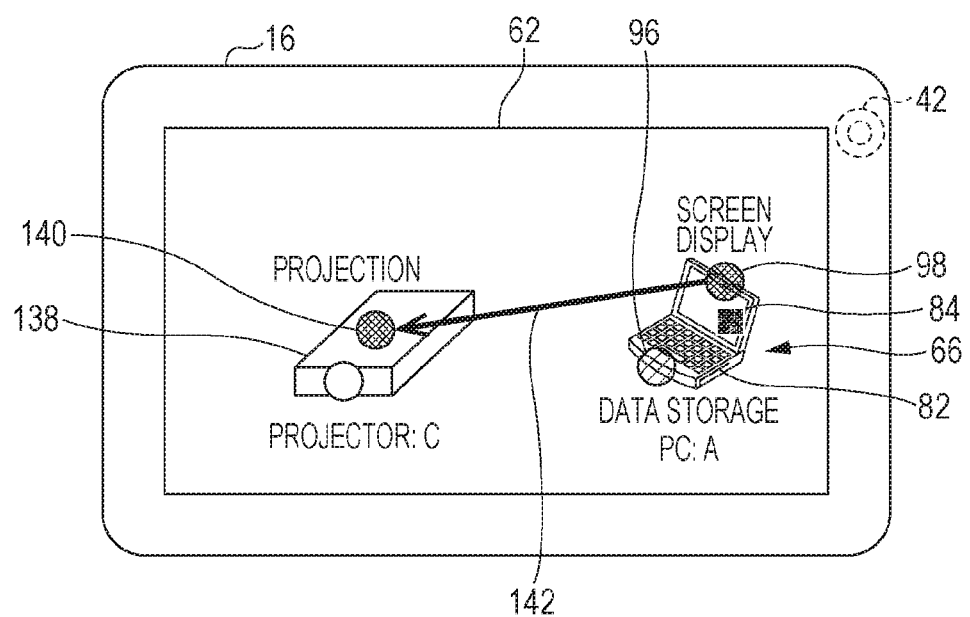

Hereinafter, a fourth modification example will be described with reference to FIGS. 20A and 20B. FIGS. 20A and 20B illustrate an example of a screen displayed on the UI unit 46 of the terminal apparatus 16.

Also in the fourth modification example, the image forming apparatus 10 (MFP (B)) and the terminal apparatus 12 (PC (A)) are identified as the target devices that cooperate with each other, and the device images 64 and 66 are displayed on the device display screen 62 in the terminal apparatus 16 as illustrated in FIG. 20A. Also, the partial images 78 and 84 (contact region images 92 and 98) are linked in this order as indicated by an arrow 136. That is, the scan function and the screen display function are designated in this order.

In the fourth modification example, the controller 48 of the terminal apparatus 16 causes the field of view of the camera 42 to be changed and causes the changed field of view to be displayed on the device display screen 62 while causing a device image representing the device designated last as the target device that cooperates to be displayed on the device display screen 62. In this case, the pieces of identification information of the devices that have been designated as the target devices that cooperate with each other (for example, the MFP (B) and the PC (A)) are stored in the memory of the terminal apparatus 16 or the server 14.

In the example illustrated in FIG. 20A, the terminal apparatus 12 (PC (A)) is the device that is designated last as the target device that cooperates, and thus the device image 66 thereof remains on the device display screen 62. If the user changes the field of view of the camera 42 of the terminal apparatus 16, the controller 48 of the terminal apparatus 16 causes an image captured by the camera 42 to be displayed on the device display screen 62 while causing the device image 66 to be displayed on the device display screen 62. For example, in the case of using a projector (C), which is not within the field of view in the state illustrated in FIG. 20A, as the target device that cooperates, the user changes the orientation of the camera 42 so that the projector (C) is included in the field of view of the camera 42, with the device image 66 being displayed on the device display screen 62 as illustrated in FIG. 20B, and then captures an image of the projector (C). Accordingly, the image of the projector (C) is captured by the camera 42, and a device image 138 related to the projector (C) is displayed on the device display screen 62. The projector (C) is identified and, for example, the name of a function of the projector (C) (for example, "projection") is displayed on the device display screen 62. Also, a contact region image 140 is superimposed on the device image 138 representing the projector (C). As indicated by an arrow 142, if a link is made from the partial image 84 (contact region image 98) to the device image 138 (contact region image 140) by the user, the function of the device related to the device image 138 (for example, a projection function) is selected as the target function that cooperates, and a cooperative function that uses the function related to the device image 138 is preferentially displayed.

According to the fourth modification example, even if an image of plural target devices that cooperate with each other is not captured at one time, individual images of the plural devices may be captured and the plural devices may cooperate with each other. That is, the target devices that cooperate with each other are not necessarily located close to each other. According to the fourth modification example, the images of the plural devices may be separately captured and the plural devices may cooperate with each other even in such a case. Of course, the angle of view of the camera 42 may be changed or the field of view may be increased or decreased. If these operations are insufficient, image capturing may be performed plural times to identify the individual devices.

In the above-described example, a device image related to the device designated last as the target device that cooperates remains on the device display screen 62. Alternatively, a device image designated by the user, a device image related to the device whose image is captured first, or a device image related to a preset basic device may remain on the device display screen 62. Also in this case, images of plural devices may be separately captured and the devices may cooperate with each other.

In the first exemplary embodiment and the first to fourth modification examples described above, a device image representing an identified device, a contact region image, a trail of a linkage operation (for example, a trail of movement), and a trail of a cancellation operation may be displayed three-dimensionally so that they are distinguished from a background image. That is, these images may be displayed as three-dimensional images. For example, a background image may be two-dimensionally displayed, whereas a device image, a contact region image, and a trail of an operation may be three-dimensionally displayed. Accordingly, the visibility of the device image, the contact region image, and the trail of an operation may increase. Alternatively, a device image related to an unidentified device and a background image are not displayed on the device display screen 62, and only a device image related to an identified device may be displayed on the device display screen 62.

Figure 21:
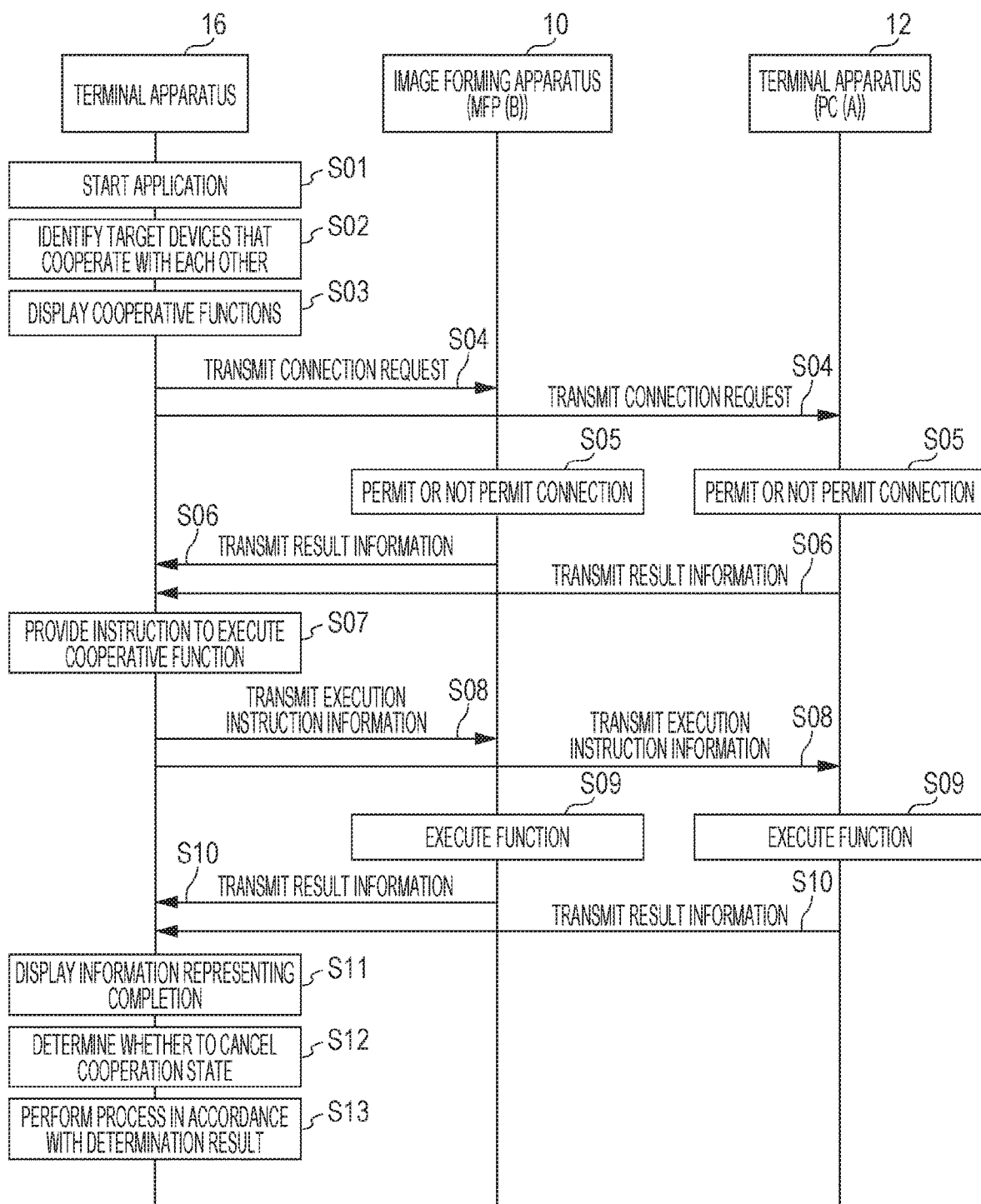
FIG. 21 is a sequence diagram illustrating a connection process performed in the image forming system according to the first exemplary embodiment.

As described above, when images related to target devices are linked to each other and a cooperative function is specified, a connection request is transmitted from the terminal apparatus 16 to the target devices that cooperate with each other, and the terminal apparatus 16 is connected to the target devices. Hereinafter, the connection process will be described with reference to FIG. 21. FIG. 21 is a sequence diagram illustrating the process.

First, the user provides an instruction to start an application (program) for executing a cooperative function by using the terminal apparatus 16. In response to the instruction, the controller 48 of the terminal apparatus 16 starts the application (S01). The application may be stored in the memory 44 of the terminal apparatus 16 in advance or may be downloaded from the server 14 or the like.

Subsequently, the target devices that cooperate with each other are identified by using the marker-based AR technology, the markerless AR technology, or the position information AR technology (S02). Of course, the target devices may be identified by using a technology other than the AR technologies. In the case of using the marker-based AR technology or the markerless AR technology, the user captures an image of the target devices by using the camera 42 of the terminal apparatus 16. For example, in the case of using the image forming apparatus 10 (MFP (B)) and the terminal apparatus 12 (PC (A)) as the target devices, the user captures an image of the image forming apparatus 10 and the terminal apparatus 12 by using the camera 42.

Accordingly, the pieces of device identification information of the image forming apparatus 10 and the terminal apparatus 12 are obtained, and the image forming apparatus 10 and the terminal apparatus 12 are identified as the target devices. In the case of using the position information AR technology, the pieces of position information of the image forming apparatus 10 and the terminal apparatus 12 are obtained, the pieces of device identification information of the image forming apparatus 10 and the terminal apparatus 12 are specified on the basis of the pieces of position information, and the image forming apparatus 10 and the terminal apparatus 12 are identified.

By using the terminal apparatus 16, the user links the plural device images related to the plural target devices that cooperate with each other, and thereby cooperative functions are specified and the order of priority of the cooperative functions is specified. The information about the cooperative functions is displayed on the UI unit 46 of the terminal apparatus 16 in accordance with the order of priority (S03). The process of specifying the cooperative functions and the process of specifying the order of priority may be performed by the server 14 or the terminal apparatus 16.

Subsequently, if the user designates, by using the terminal apparatus 16, the target cooperative function to be executed, the terminal apparatus 16 transmits information representing a connection request to the target devices (for example, the image forming apparatus 10 and the terminal apparatus 12) that execute the cooperative function (S04). For example, if the pieces of address information representing the addresses of the target devices that cooperate with each other are stored in the server 14, the terminal apparatus 16 obtains the pieces of address information from the server 14. If the pieces of address information are included in the pieces of device identification information, the terminal apparatus 16 may obtain the pieces of address information from the pieces of device identification information of the target devices. Alternatively, the pieces of address information of the target devices may be stored in the terminal apparatus 16. Of course, the terminal apparatus 16 may obtain the pieces of address information of the target devices by using another method. By using the pieces of address information of the target devices (for example, the image forming apparatus 10 and the terminal apparatus 12), the terminal apparatus 16 transmits information representing a connection request to the target devices (for example, the image forming apparatus 10 and the terminal apparatus 12).

The image forming apparatus 10 and the terminal apparatus 12 that have received the information representing a connection request permit or do not permit the connection to the terminal apparatus 16 (S05). For example, if the image forming apparatus 10 and the terminal apparatus 12 are devices that are not permitted to make a connection or if the number of devices to which a connection is requested exceeds an upper limit, the connection is not permitted. If the connection from the terminal apparatus 16 is permitted, an operation of changing setting information unique to the image forming apparatus 10 and the terminal apparatus 12 may be prohibited so that the setting information is not changed. For example, change of color parameters or setting time to shift to a power saving mode of the image forming apparatus 10 may be prohibited. Accordingly, the security for the target devices that cooperate with each other increases. Alternatively, in the case of causing devices to cooperate with each other, change of setting information may be limited compared to the case of using each device alone without cooperation with another device. For example, change of fewer setting items may be permitted than in the case of using the device alone. Alternatively, viewing of personal information of other users, such as an operation history, may be prohibited. Accordingly, the security for personal information of users may increase.

Result information representing permission or non-permission of connection is transmitted from the image forming apparatus 10 and the terminal apparatus 12 to the terminal apparatus 16 (S06). If the connection to the image forming apparatus 10 and the terminal apparatus 12 is permitted, communication is established between the terminal apparatus 16 and each of the image forming apparatus 10 and the terminal apparatus 12.

Subsequently, the user provides an instruction to execute the cooperative function by using the terminal apparatus 16 (S07). In response to the instruction, execution instruction information representing the instruction to execute the cooperative function is transmitted from the terminal apparatus 16 to the image forming apparatus 10 and the terminal apparatus 12 (S08). The execution instruction information transmitted to the image forming apparatus 10 includes information representing the process to be executed in the image forming apparatus 10 (for example, job information), and the execution instruction information transmitted to the terminal apparatus 12 includes information representing the process to be executed in the terminal apparatus 12 (for example, job information).

In response to the execution instruction information, the image forming apparatus 10 and the terminal apparatus 12 execute the individual functions (S09). For example, if the cooperative function includes a process of transmitting/receiving data between the image forming apparatus 10 and the terminal apparatus 12, as in the scan and transfer function of transferring scan data from the image forming apparatus 10 (MFP (B)) to the terminal apparatus 12 (PC (A)), communication is established between the image forming apparatus 10 and the terminal apparatus 12.

In this case, for example, the execution instruction information transmitted to the image forming apparatus 10 includes the address information of the terminal apparatus 12, and the execution instruction information transmitted to the terminal apparatus 12 includes the address information of the image forming apparatus 10. The communication is established between the image forming apparatus 10 and the terminal apparatus 12 by using these pieces of address information.

After the execution of the cooperative function is finished, the information indicating that the execution of the cooperative function is completed is transmitted from the image forming apparatus 10 and the terminal apparatus 12 to the terminal apparatus 16 (S10). The information indicating that the execution of the cooperative function is completed is displayed on the UI unit 46 of the terminal apparatus 16 (S11). If the information indicating that the execution of the cooperative function is completed is not displayed even when a preset time period elapses from the time point at which the execution instruction is provided, the controller 48 of the terminal apparatus 16 may cause the UI unit 46 to display information representing an error, and may transmit execution instruction information or information representing a connection request to the image forming apparatus 10 and the terminal apparatus 12 again.

Subsequently, the user determines whether or not to cancel the cooperation state of the image forming apparatus 10 and the terminal apparatus 12 (S12), and a process is performed in accordance with the determination result (S13). In the case of cancelling the cooperation state, the user provides a cancellation instruction by using the terminal apparatus 16. Accordingly, the communication between the terminal apparatus 16 and each of the image forming apparatus 10 and the terminal apparatus 12 is stopped. Also, the communication between the image forming apparatus 10 and the terminal apparatus 12 is stopped. In the case of not cancelling the cooperation state, an execution instruction may be continuously provided.

Furthermore, the number of target devices that cooperate with each other may be increased. For example, the device identification information of the third device may be obtained, and a cooperative function to be executed through cooperation among the three devices including the image forming apparatus 10 and the terminal apparatus 12 may be specified. The information indicating that the image forming apparatus 10 and the terminal apparatus 12 have already been identified as the target devices that cooperate with each other is stored in the server 14 or the terminal apparatus 16.

The pieces of device identification information representing the target devices that cooperate with each other and the cooperative function identification information representing an executed cooperative function may be stored in the terminal apparatus 16 or the server 14. For example, the user account information (user identification information) of the user who uses the terminal apparatus 16 may be obtained, and history information representing the correspondence among the user account information, the pieces of device identification information representing the target devices that cooperate with each other, and the cooperative function identification information representing the executed cooperative function may be created and stored in the terminal apparatus 16 or the server 14. The history information may be created by the terminal apparatus 16 or the server 14. With reference to the history information, the cooperative function that has been executed and the devices used for the cooperative function are specified.

The target devices that cooperate with each other (for example, the image forming apparatus 10 and the terminal apparatus 12) may store, as history information, the user account information of the user who has requested connection and the terminal identification information representing the terminal apparatus 16 that has requested connection. With reference to the history information, the user who has used the devices is specified. The user may be specified by using the history information in the case of, for example, specifying the user who was using a device when the device was broken, or performing a charging process for consumables or the like. The history information may be stored in the server 14 or the terminal apparatus 16 or may be stored in another apparatus.

The user account information is stored, for example, in the memory 44 of the terminal apparatus 16 in advance. The controller 48 of the terminal apparatus 16 functions as an example of a user identifying unit, reads the user account information of the user from the memory 44, and identifies the user who uses the terminal apparatus 16. If the pieces of user account information of plural users are stored in the memory 44, the user designates his/her user account information by using the terminal apparatus 16. Accordingly, the user account information of the user is read and the user is identified. Alternatively, the controller 48 of the terminal apparatus 16 may identify the user by reading the user account information of the user who is logged in to the terminal apparatus 16. Alternatively, if only one piece of user account information is stored in the same terminal apparatus 16, the controller 48 of the terminal apparatus 16 may identify the user by reading the one piece of user account information. If a user account is not set and if user account information is not created, initial setting is performed and thereby user account information is created.

Usage histories of cooperative functions may be managed for individual users, and the information representing the cooperative functions previously used by the user represented by read user account information may be displayed on the UI unit 46 of the terminal apparatus 16. The information representing the usage history may be stored in the terminal apparatus 16 or the server 14. Also, the information representing a cooperative function that is used at a preset frequency or more may be displayed. With such a shortcut function being provided, a user operation regarding a cooperative function may be reduced.

Second Exemplary Embodiment

Figures 22, 23:
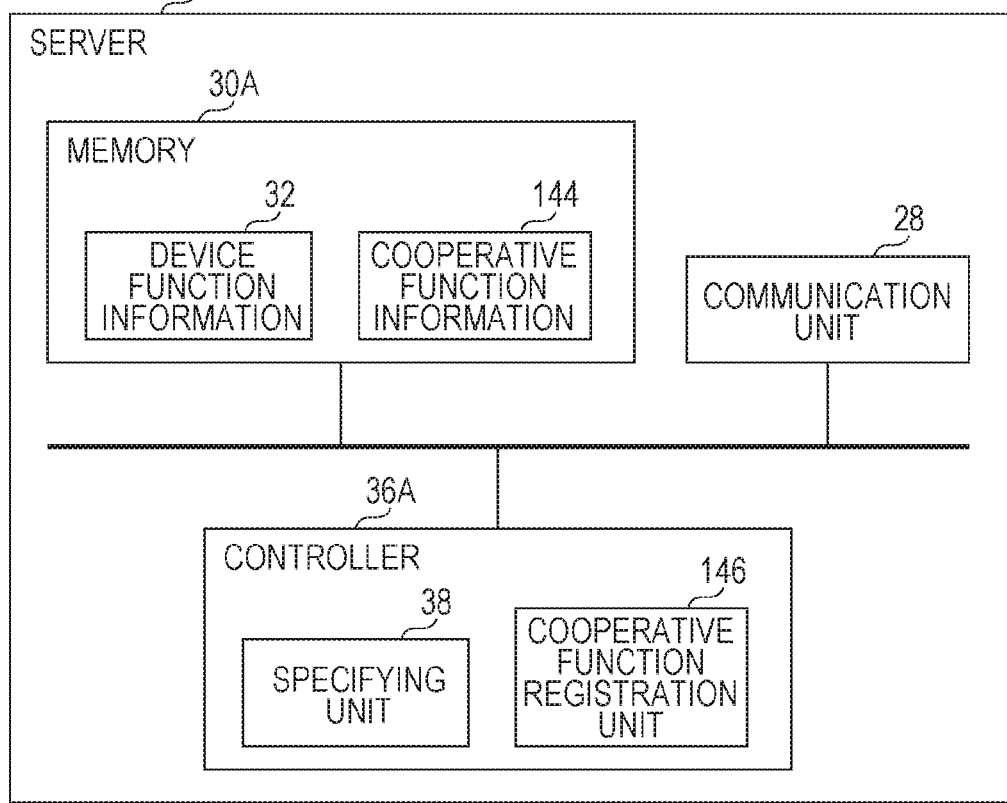
FIG. 22 is a block diagram illustrating a server according to a second exemplary embodiment.
FIG. 23 is a diagram illustrating an example of a cooperative function management table.

Hereinafter, an image forming system serving as an information processing system according to a second exemplary embodiment of the present invention will be described. FIG. 22 illustrates a server 14A according to the second exemplary embodiment. The image forming system according to the second exemplary embodiment includes the server 14A instead of the server 14 according to the first exemplary embodiment. Except for the server 14A, the configuration of the image forming system according to the second exemplary embodiment is the same as that of the image forming system according to the first exemplary embodiment illustrated in FIG. 1.

The server 14A manages cooperative functions, each being executed through cooperation between plural functions, like the server 14 according to the first exemplary embodiment. Hereinafter, the configuration of the server 14A will be described in detail with reference to FIG. 22.

The server 14A includes a communication unit 28, a memory 30A, and a controller 36A. The communication unit 28 has the same configuration as that of the communication unit 28 according to the first exemplary embodiment.

The memory 30A is a storage apparatus such as a hard disk or an SSD. The memory 30A stores, for example, device function information 32, cooperative function information 144, various pieces of data, various programs, pieces of device address information representing the addresses of individual devices, and so forth. Of course, these pieces of information and data may be stored in different storage apparatuses or in one storage apparatus. The device function information 32 and the cooperative function information 144 stored in the memory 30A may be provided to the terminal apparatus 16 periodically or at designated timing, and accordingly the information stored in the terminal apparatus 16 may be updated.

The device function information 32 is the same information as the device function information 32 according to the first exemplary embodiment.

The cooperative function information 144 is information representing a cooperative function to be executed through cooperation between plural functions, and is, for example, information representing the correspondence between information representing a combination of pieces of function identification information for identifying functions that cooperate with each other to execute the cooperative function and cooperative function identification information for identifying the cooperative function. In a case where plural devices cooperate with each other, the cooperative function information 144 is information representing a cooperative function to be executed through cooperation between plural functions of the plural devices, and is information representing the correspondence between information representing a combination of pieces of device identification information for identifying the devices that cooperate with each other to execute the cooperative function and cooperative function identification information.

The controller 36A controls the operations of the individual units of the server 14A. The controller 36A includes a specifying unit 38 and a cooperative function registration unit 146.

The specifying unit 38 identifies a device on the basis of device identification information and specifies a function of the device, like the specifying unit 38 according to the first exemplary embodiment. Also, the specifying unit 38 specifies a cooperative function to be executed through cooperation between functions of target devices that cooperate with each other. Also in the second exemplary embodiment, device identification information is obtained and a device is identified by using the AR technologies. Of course, device identification information may be obtained and a device may be identified by using a technology other than the AR technologies.

In the second exemplary embodiment, device images related to the target devices that cooperate with each other are displayed on the UI unit 46 of the terminal apparatus 16, a cooperative function is specified by superimposing the device images on one another, and the information about the cooperative function is displayed on the UI unit 46 of the terminal apparatus 16.

The cooperative function registration unit 146 has a function of registering a cooperative function. For example, the cooperative function registration unit 146 associates registration information of a target cooperative function to be registered and an image to be displayed for executing the cooperative function (for example, a shortcut image) with each other. The image is, for example, an image generated by superimposing device images on one another or an image schematically representing the target devices of superimposing.

Hereinafter, the image forming system according to the second exemplary embodiment will be described in detail.

First, the cooperative function information 144 will be described in detail with reference to FIG. 23. FIG. 23 illustrates an example of a cooperative function management table, which is the cooperative function information 144. In the cooperative function management table, for example, information representing a combination of device IDs, information representing the names (for example, the types) of the target devices that cooperate with each other, and information representing a cooperative function (cooperative function identification information) are associated with each other. Unlike the cooperative function management table according to the first exemplary embodiment illustrated in FIG. 7, the cooperative function management table according to the second exemplary embodiment does not include information representing a linkage order and information representing an order of priority.

Hereinafter, an operation for specifying a cooperative function will be described in detail with reference to FIGS. 24A to 25B. FIGS. 24A to 25B illustrate an example of a screen displayed on the UI unit 46 of the terminal apparatus 16.

Figure 24A:
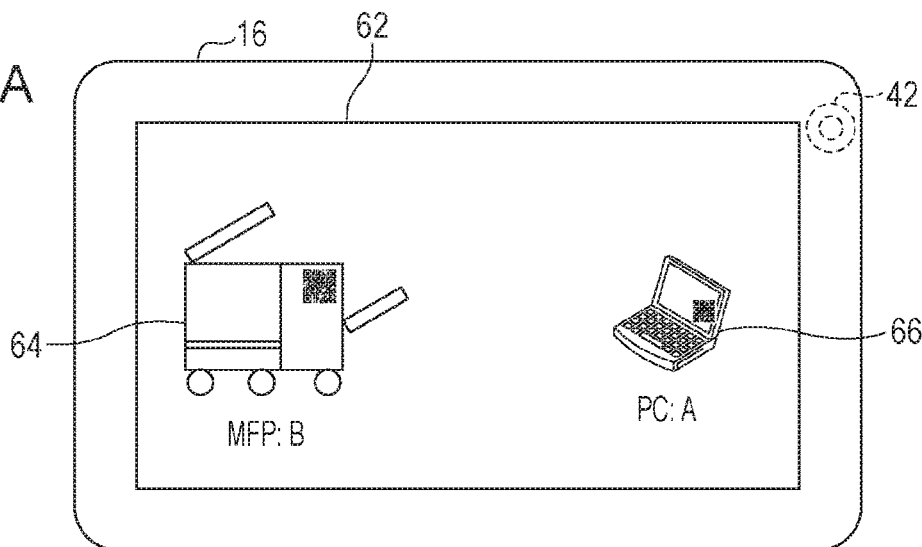
FIGS. 24A to 24C are diagrams illustrating an example of a screen displayed on the terminal apparatus according to the second exemplary embodiment.
Figure 24B:
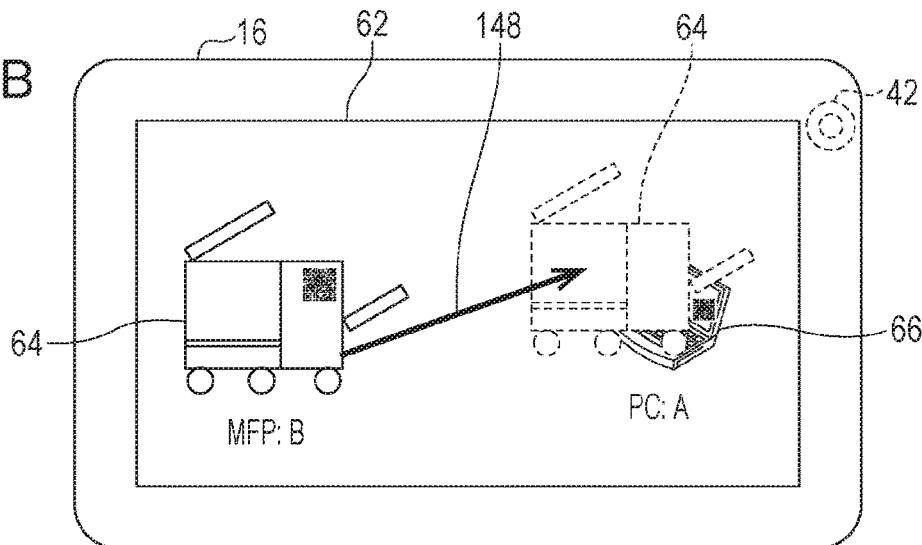

For example, as in the first exemplary embodiment, it is assumed that the image forming apparatus 10 (MFP (B)) and the terminal apparatus 12 (PC (A)) are identified as the target devices that cooperate with each other by using the AR technologies or the like. As illustrated in FIG. 24A, the device display screen 62 is displayed on the UI unit 46 of the terminal apparatus 16, and the device images 64 and 66 related to the identified devices (the image forming apparatus 10 and the terminal apparatus 12) are displayed on the device display screen 62. In this state, the user superimposes the device image related to one of the target devices on the device image related to the other target device by using an indicator (for example, a user's finger, a pen, or a stylus). For example, as illustrated in FIG. 24B, the user designates the device image 64 by using an operator and superimposes the device image 64 on the device image 66 as indicated by an arrow 148. For example, the user superimposes the device images on one another by performing a drag-and-drop operation. Specifically, the user drags the device image 64 and drops it at the position where the device image 64 is superimposed on the device image 66. The drag-and-drop operation is a technique according to the related art. Alternatively, the device images to be superimposed on one another (the images related to the target devices that cooperate with each other) may be designated in accordance with a voice instruction provided by the user. For example, the device images 64 and 66 may be designated as the target device images and may be superimposed on one another in accordance with a voice instruction provided by the user.

As a result of superimposing the device images 64 and 66 on one another, the image forming apparatus 10 (MFP (B)) related to the device image 64 and the terminal apparatus 12 (PC (A)) related to the device image 66 are designated as the target devices that cooperate with each other. In the example illustrated in FIG. 24B, the device image 64 is superimposed on the device image 66. Alternatively, the device image 66 may be superimposed on the device image 64.

The controller 48 of the terminal apparatus 16 may cause a device image that is being dragged to be displayed on the UI unit 46 in an identifiable manner. For example, a device image that is being dragged may be displayed translucently or in a specific color.

Figure 24C:
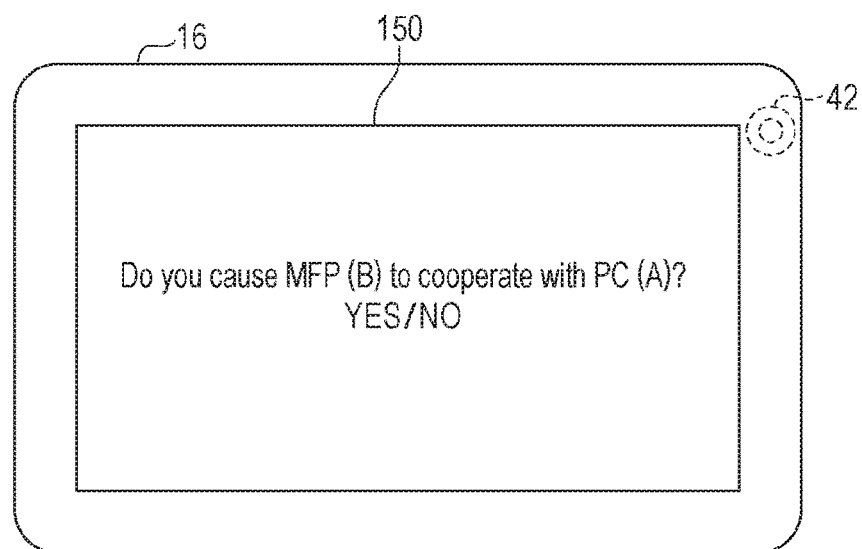

When the device image 64 is superimposed on the device image 66, a confirmation screen 150 is displayed on the UI unit 46 of the terminal apparatus 16 as illustrated in FIG. 24C. The confirmation screen 150 is a screen for confirming whether or not to cause the designated devices to cooperate with each other. If a cooperation instruction is provided by the user on the confirmation screen 150 (for example, if a "YES" button is pressed by the user), information about cooperative functions is displayed on the UI unit 46 of the terminal apparatus 16. Specifically, if the target devices that cooperate with each other (for example, the image forming apparatus 10 and the terminal apparatus 12) are designated and a cooperation instruction is provided, the specifying unit 38 of the server 14A specifies the cooperative functions associated with the combination of the PC (A) and the MFP (B) in the cooperative function management table (cooperative function information 144) illustrated in FIG. 23. Accordingly, the cooperative functions to be executed through cooperation between the PC (A) and the MFP (B) are specified. The information about the cooperative functions specified in this manner is transmitted from the server 14 to the terminal apparatus 16 and is displayed as the information about candidate cooperative functions on the UI unit 46 of the terminal apparatus 16.

Figure 25A:
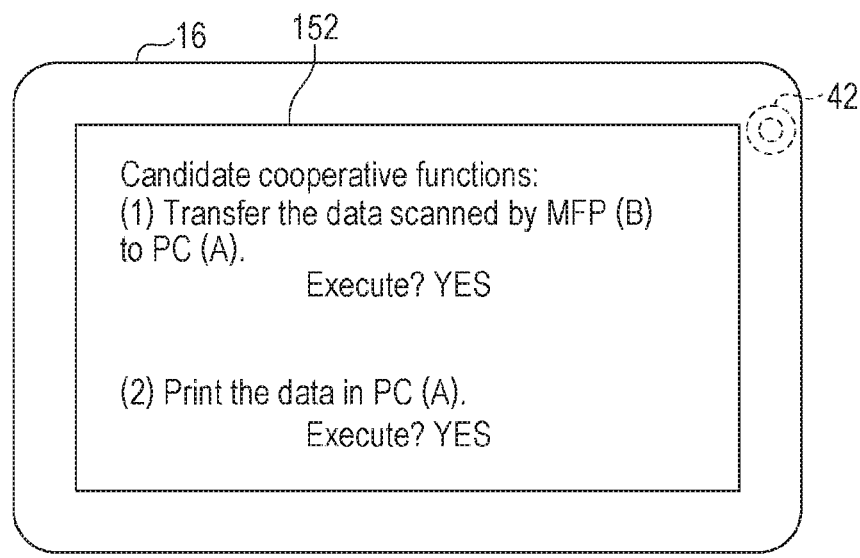
FIGS. 25A and 25B are diagrams illustrating an example of a screen displayed on the terminal apparatus according to the second exemplary embodiment.

For example, as illustrated in FIG. 25A, the controller 48 of the terminal apparatus 16 causes the UI unit 46 to display a cooperative function display screen 152 and to display the information about the candidate cooperative functions on the cooperative function display screen 152. With the PC (A) and the MFP (B) being caused to cooperate with each other, for example, a scan and transfer function and a print function are implemented. Thus, the information about the scan and transfer function and the information about the print function are displayed on the cooperative function display screen 152.

Figure 25B:
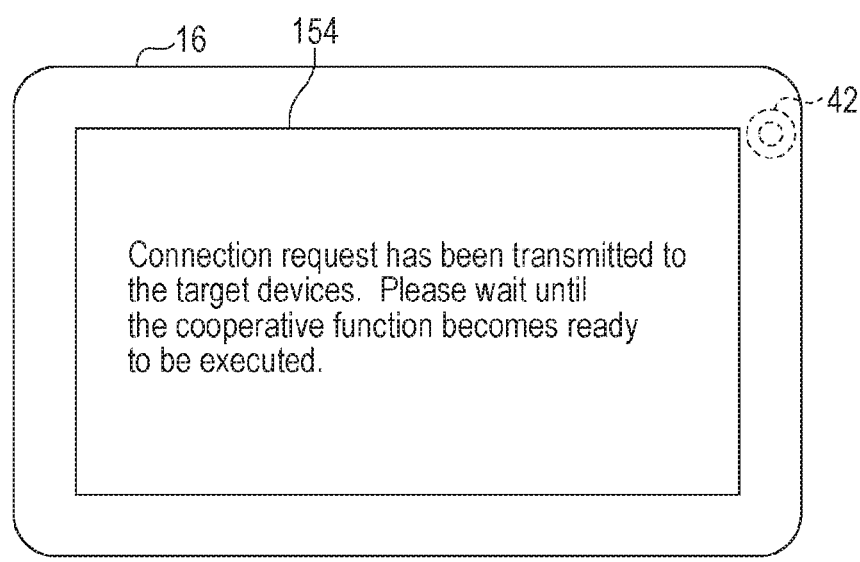

If a cooperative function is designated by the user and an execution instruction is provided by the user, a connection request is transmitted from the terminal apparatus 16 to the target devices that cooperate with each other. As illustrated in FIG. 25B, a waiting screen 154 is displayed on the UI unit 46 of the terminal apparatus 16 while the connection request is being processed. When the connection between the terminal apparatus 16 and the target devices is successfully established, the designated cooperative function is executed.

As described above, according to the second exemplary embodiment, device images related to devices are superimposed on one another, and thereby cooperative functions that use the functions of the devices are specified. Thus, the functions may be caused to cooperate with each other without a special operation other than an image operation, and the functions may be caused to cooperate with each other with a simple operation.

Hereinafter, modification examples of the second exemplary embodiment will be described.

Fifth Modification Example

Figure 26A:
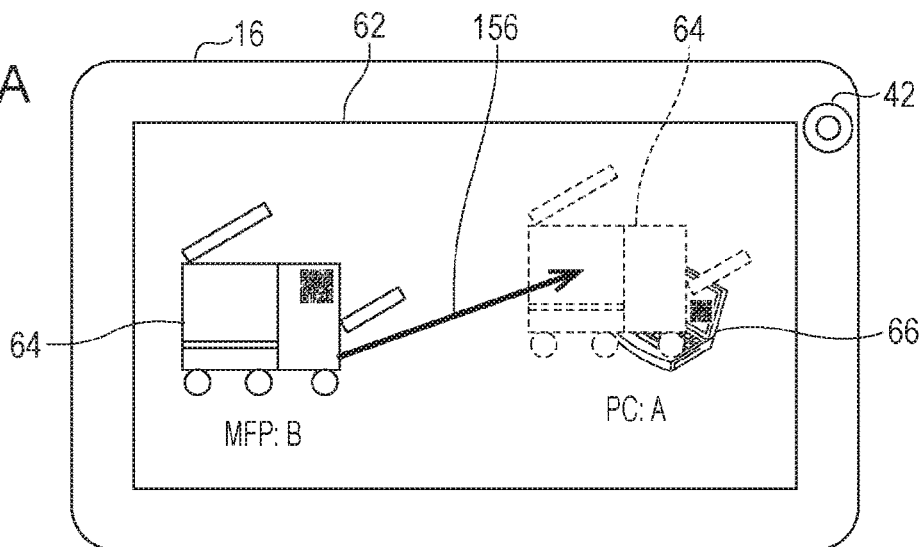
FIGS. 26A to 26C are diagrams illustrating an example of a screen displayed on the terminal apparatus according to a fifth modification example.

Hereinafter, a fifth modification example will be described with reference to FIGS. 26A to 27. FIGS. 26A to 27 illustrate an example of a screen displayed on the UI unit 46 of the terminal apparatus 16. In the fifth modification example, plural device images are superimposed on one another and then a new image representing the superimposed state is generated and displayed. Hereinafter, the fifth modification example will be described in detail.

Also in the fifth modification example, it is assumed that the image forming apparatus 10 (MFP (B)) and the terminal apparatus 12 (PC (A)) are identified as the target devices that cooperate with each other, and that the device images 64 and 66 are displayed on the device display screen 62 in the terminal apparatus 16 as illustrated in FIG. 26A. For example, it is assumed that the user superimposes the device image 64 on the device image 66 by using an operator as indicated by an arrow 156. As a result of superimposing the device images 64 and 66 on one another, the image forming apparatus 10 (MFP (B)) related to the device image 64 and the terminal apparatus 12 (PC (A)) related to the device image 66 are designated as the target devices that cooperate with each other.

Figure 26B:
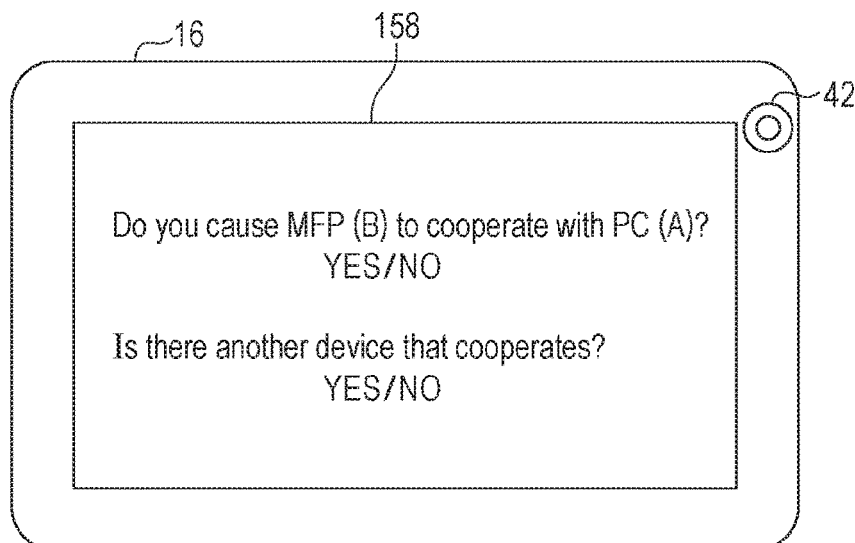
Figure 26C:
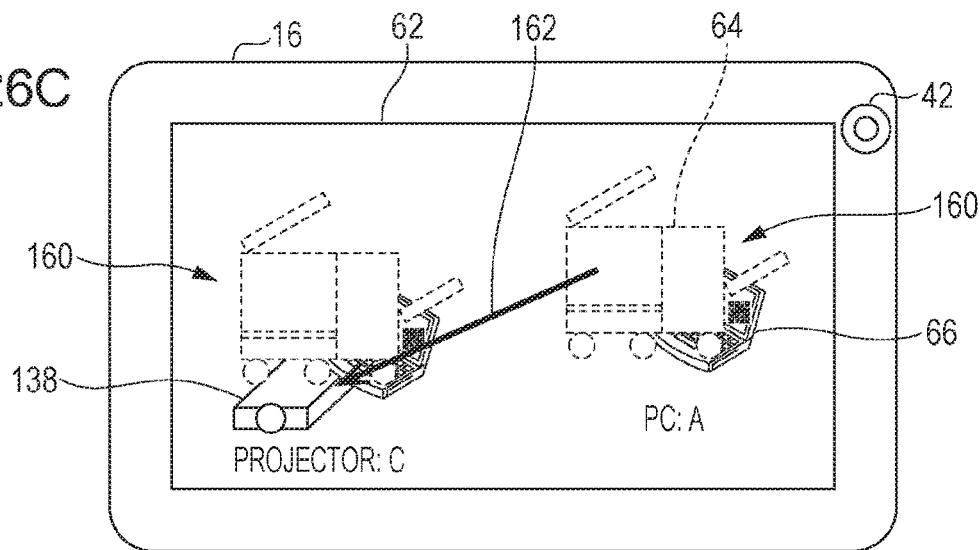
Figure 27:
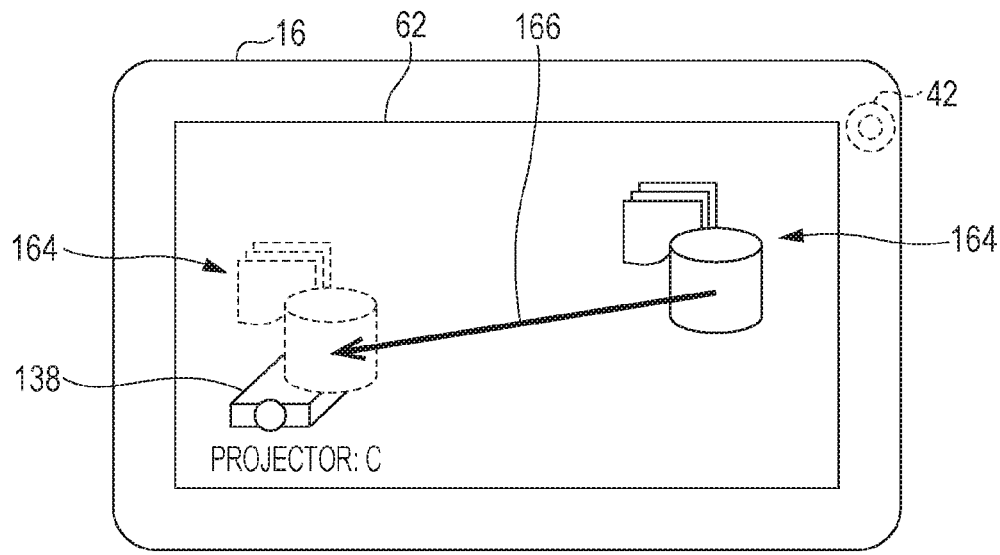
FIG. 27 is a diagram illustrating an example of a screen displayed on the terminal apparatus according to the fifth modification example.

When the device image 64 is superimposed on the device image 66, a confirmation screen 158 is displayed on the UI unit 46 of the terminal apparatus 16 as illustrated in FIG. 26B. The confirmation screen 158 is a screen for confirming whether or not to cause the designated devices to cooperate with each other and is a screen for confirming whether or not there is another device that is to be caused to cooperate. If an instruction to cause the MFP (B) to cooperate with the PC (A) is provided by the user (for example, if a "YES" button to cause the MFP (B) to cooperate with the PC (A) is pressed by the user), the MFP (B) is caused to cooperate with the PC (A). If there is another device that is to be caused to cooperate (for example, if a "YES" button to cause another device to cooperate is pressed by the user), the device display screen 62 is displayed as illustrated in FIG. 26C. On the device display screen 62, a new device image 160, which is generated by grouping the superimposed device images 64 and 66, is displayed. The new device image 160 may be generated by, for example, the controller 48 of the terminal apparatus 16 or the controller 36A of the server 14A. The device image 160 is an image representing the state in which the device image 64 is superimposed on the device image 66.

In the fifth modification example, the controller 48 of the terminal apparatus 16 causes the newly generated device image 160 to remain on the device display screen 62. If the user changes the field of the view of the camera 42 of the terminal apparatus 16, the controller 48 of the terminal apparatus 16 causes an image captured by the camera 42 to be displayed on the device display screen 62, with the device image 160 being displayed on the device display screen 62. In this case, the pieces of identification information of the devices that have already been designated as the target devices that cooperate with each other (for example, the MFP (B) and the PC (A)) are stored in the memory of the terminal apparatus 16 or the server 14A.

For example, in the case of using the projector (C), which is not within the field of view in the state illustrated in FIG. 26A, as a target device that cooperates, the user changes the orientation of the camera 42 so that the projector (C) is included in the field of view of the camera 42 with the device image 160 being displayed on the device display screen 62 as illustrated in FIG. 26C, and then captures an image of the projector (C). Accordingly, the image of the projector (C) is captured by the camera 42, the device image 138 related to the projector (C) is displayed on the device display screen 62, and the projector (C) is identified. As indicated by an arrow 162, if the user superimposes the new device image 160 on the device image 138, the device related to the device image 138 is selected as the target device that cooperates. If there is no more device that is to be caused to cooperate, a cooperative function to be executed through cooperation between the target devices that have already been designated is specified by the server 14, and the information about the cooperative function is transmitted from the server 14 to the terminal apparatus 16 and is displayed on the UI unit 46 of the terminal apparatus 16. For example, if a "NO" button to provide an instruction indicating that there is no device that is to be caused to cooperate is pressed by the user on the confirmation screen 158 illustrated in FIG. 26B, the information about the cooperative function is displayed on the UI unit 46 of the terminal apparatus 16.

As described above, according to the fifth modification example, a new device image generated by superimposing device images on one another is superimposed on a device image related to another candidate device that cooperates, and accordingly the number of devices that cooperate with each other is increased. The new device image represents a state in which the device images related to the target devices that cooperate with each other are superimposed on one another. Thus, as a result of displaying the new device image, the devices that have been designated as the target devices that cooperate with each other may be easily identified from a visual point of view.

The display of the confirmation screen 158 may be omitted. In this case, if an instruction to display a cooperative function is provided by the user after the device images are superimposed on one another, the information about the cooperative function to be executed by the target devices that have been designated through the superimposing and that cooperate with each other is displayed on the UI unit 46 of the terminal apparatus 16.

In the fifth modification example, a new device image is generated by grouping device images that are superimposed on one another. Alternatively, the device images that are superimposed on one another may be replaced with another image and the image may be displayed on the device display screen 62. For example, as illustrated in FIG. 27, a new device image 164 is displayed on the device display screen 62 instead of the device image 160 generated through grouping, and the new device image 164 is operated as indicated by an arrow 166. The device image 164 is an image schematically representing the MFP (B) and the PC (A), an image representing a function of the MFP (B) and a function of the PC (A), or the like. The device image 164 may be generated by the controller 48 of the terminal apparatus 16 or the controller 36A of the server 14A. As a result of displaying an image representing functions as a new device image, the functions designated as the target functions that cooperate with each other may be easily identified from a visual point of view.

Figure 28:
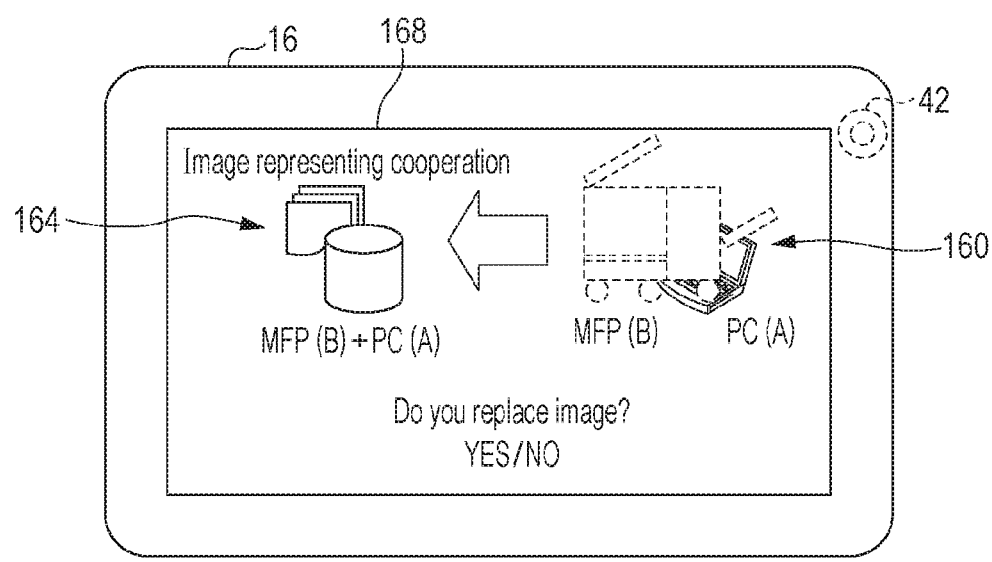
FIG. 28 is a diagram illustrating an example of a screen displayed on the terminal apparatus according to the fifth modification example.

In the example illustrated in FIG. 27, the device image 160 is automatically replaced with the new device image 164. At the time of the replacement, a confirmation screen may be displayed on the UI unit 46 of the terminal apparatus 16. FIG. 28 illustrates an example of the confirmation screen. After plural device images are superimposed on one another, a confirmation screen 168 is displayed on the UI unit 46 of the terminal apparatus 16. On the confirmation screen 168, the device image 160 generated by grouping the plural device images and the schematic device image 164 are displayed. If an instruction to replace the image is provided by the user (for example, if a "YES" button is pressed by the user), the device image 160 is replaced by the schematic device image 164, and the schematic device image 164 is displayed on the device display screen 62 as illustrated in FIG. 27.

Sixth Modification Example

Hereinafter, a sixth modification example will be described with reference to FIGS. 29A to 31C. FIGS. 29A to 31C illustrate an example of a screen displayed on the UI unit 46 of the terminal apparatus 16. In the sixth modification example, a device image generated at the last cooperation is used as an image for a shortcut button when a cooperative function is executed next time. Hereinafter, the sixth modification example will be described in detail.

In the sixth modification example, as in the fifth modification example, it is assumed that the device images 64 and 66 are superimposed on one another, that the image forming apparatus 10 (MFP (B)) and the terminal apparatus 12 (PC (A)) are identified as the target devices that cooperate with each other, and that the new device image 160 is generated by grouping the device images 64 and 66.

Figure 29A:
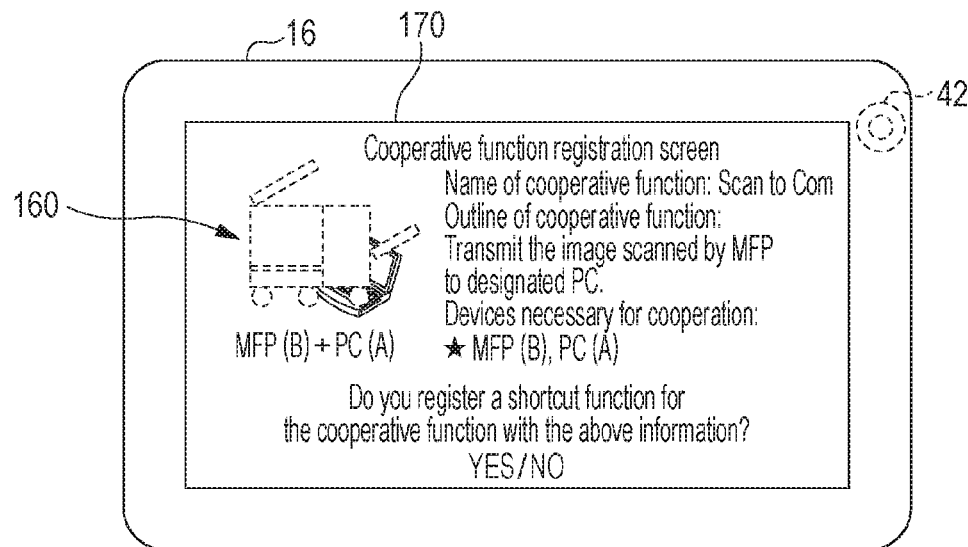
FIGS. 29A and 29B are diagrams illustrating an example of a screen displayed on the terminal apparatus according to a sixth modification example.

If the user provides an instruction to register the new device image 160 as an image for a shortcut button by using the terminal apparatus 16, a cooperative function registration screen 170 is displayed on the UI unit 46 of the terminal apparatus 16 as illustrated in FIG. 29A. On the cooperative function registration screen 170, the new device image 160 is displayed, and also registration information of a cooperative function to be executed through cooperation between the MFP (B) and the PC (A) is displayed. For example, the name of the cooperative function, the outline of the cooperative function, and the information representing the devices that are necessary for cooperation are displayed as the registration information. The user may edit the registration information (for example, the name or outline of the cooperative function) by using the terminal apparatus 16.

Figure 29B:
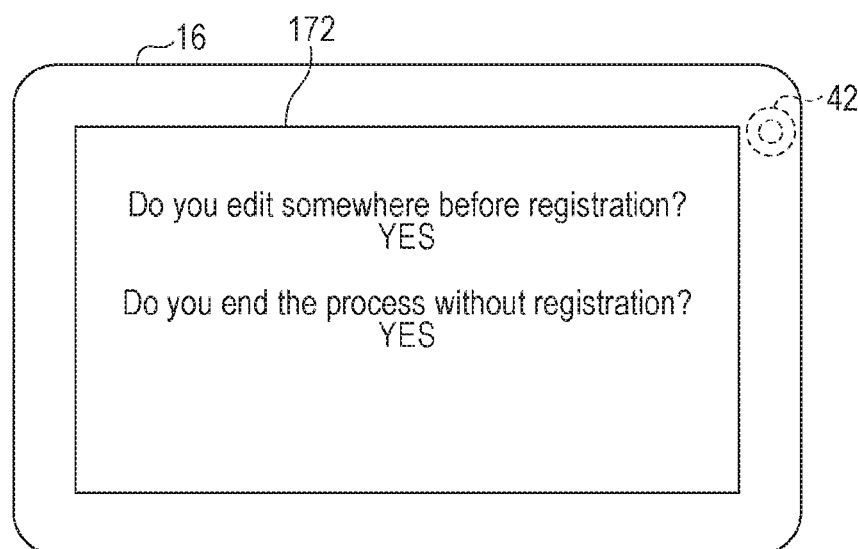

If an instruction not to register the shortcut function for the cooperative function is provided by the user on the cooperative function registration screen 170 (for example, if a "NO" button is pressed by the user), a confirmation screen 172 is displayed on the UI unit 46 of the terminal apparatus 16 as illustrated in FIG. 29B. If an end instruction is provided by the user on the confirmation screen 172 (for example, if a "YES" button for end of registration is pressed by the user), the cooperative function registration process ends. If a partial edit instruction is provided by the user (for example, if a "YES" button for partial edit is pressed by the user), the screen shifts to the cooperative function registration screen 170.

Figure 30A:
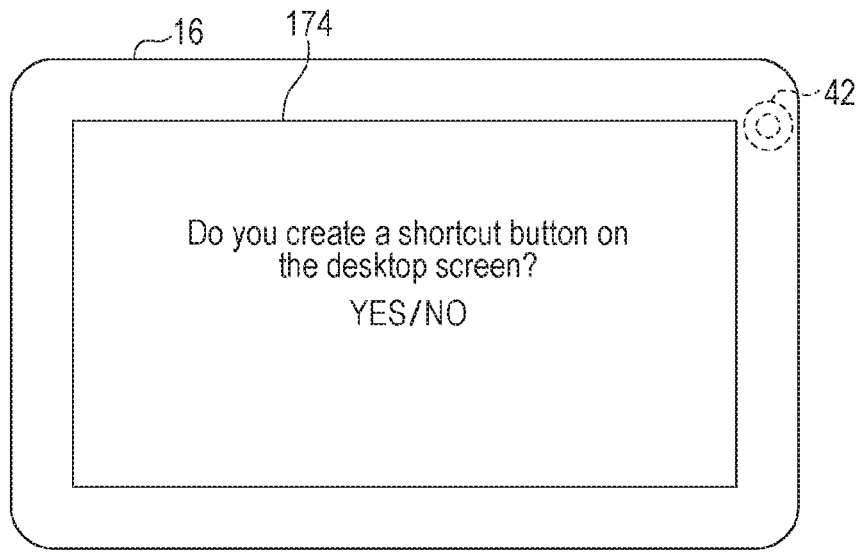
FIGS. 30A and 30B are diagrams illustrating an example of a screen displayed on the terminal apparatus according to the sixth modification example.
Figure 30B:
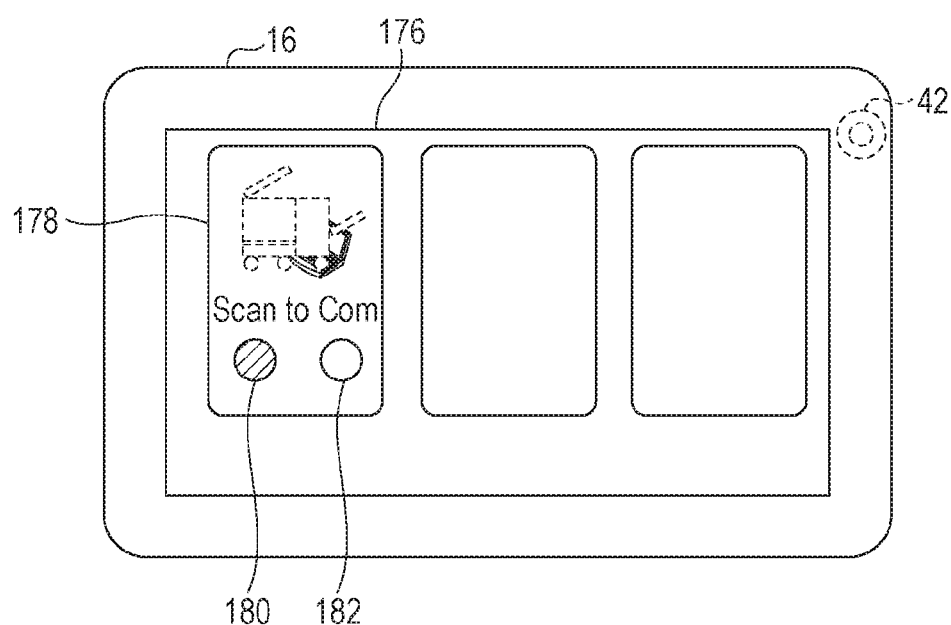

On the other hand, if an instruction to register the shortcut function for the cooperative function is provided by the user on the cooperative function registration screen 170 (for example, if a "YES" button is pressed by the user), a confirmation screen 174 is displayed on the UI unit 46 of the terminal apparatus 16 as illustrated in FIG. 30A. If an instruction to create a shortcut button is provided by the user on the confirmation screen 174 (for example, if a "YES" button is pressed by the user), an image representing a shortcut button for executing the cooperative function (shortcut button image) is generated. The shortcut button image may be created by the terminal apparatus 16 or the server 14A. For example, as illustrated in FIG. 30B, a shortcut button image 178 is displayed on a screen 176 (for example, a desktop screen) of the UI unit 46 of the terminal apparatus 16. The shortcut button image 178 includes the device image 160. For example, the cooperative function registration unit 146 of the server 14A associates the registration information of the target cooperative function with the shortcut button image 178. Of course, the association may be performed by the terminal apparatus 16. If plural shortcut button images are generated and registered, a list of the shortcut button images is displayed on the screen 176. The registration information of the cooperative function and the shortcut button image are stored in, for example, the terminal apparatus 16. Alternatively, the registration information of the cooperative function and the shortcut button image may be stored in the server 14A in association with user account information. In this case, if the user account information is transmitted from the terminal apparatus 16 to the server 14A, the information associated with the user account information (the registration information of the cooperative function and the shortcut button image) is transmitted from the server 14A to the terminal apparatus 16 and is displayed on the terminal apparatus 16.

The shortcut button image 178 includes status images 180 and 182. Each status image is an image representing the status of the target device that cooperates, that is, an image representing whether or not the target image is in the state of being able to execute the cooperative function. For example, the status image 180 is an image representing the status of the image forming apparatus 10 (MFP (B)), and the status image 182 is an image representing the status of the terminal apparatus 12 (PC (A)). If the target device that cooperates is in the state of being able to execute the cooperative function, the status image is displayed in a specific color representing the state (for example, green or blue). If the target device that cooperates is in the state of being unable to execute the cooperative function, the status image is displayed in a specific color representing the state (for example, white or red). In the example illustrated in FIG. 30B, the status image 180 is displayed in green and the status image 182 is displayed in white. Thus, the image forming apparatus 10 (MFP (B)) is in the state of being able to execute the cooperative function whereas the terminal apparatus 12 (PC (A)) is in the state of being unable to execute the cooperative function. Of course, the statuses of the target devices that cooperate with each other may be represented by information other than colors. For example, a status image having a shape corresponding to a status may be displayed, or a character string representing a status may be displayed.

The state of being able to execute the cooperative function is, for example, a state where the device is not being used by another user or the device is not broken. The state of being unable to execute the cooperative function is, for example, a state where the device is being used by another user or the device is broken. For example, the terminal apparatus 16 obtains information representing the status of the target device from the target device and displays the status image in a specific color on the basis of the information. Alternatively, the server 14A may obtain information representing the status of the target device from the target device, and the terminal apparatus 16 may obtain the information from the server 14A.

As described above, the cooperative function and the shortcut button image are managed in association with each other. Accordingly, an operation for executing the cooperative function next time may be reduced.

Figure 31A:
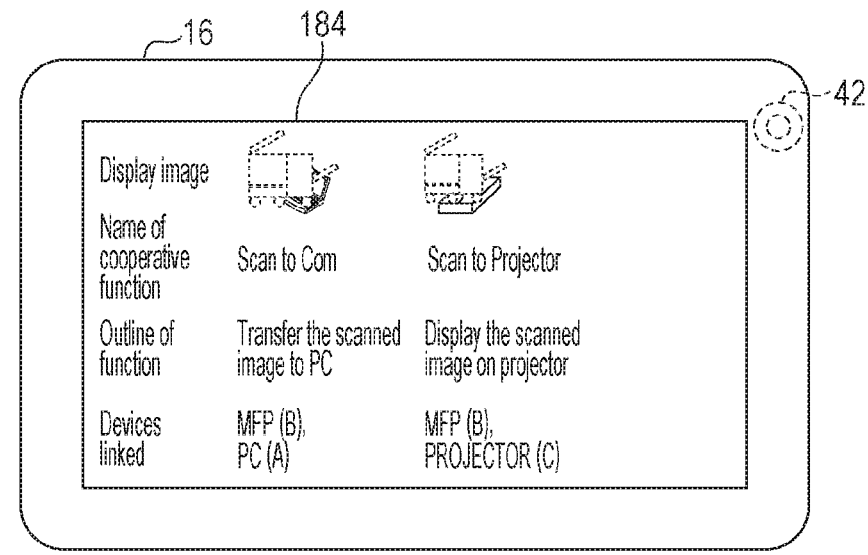
FIGS. 31A to 31C are diagrams illustrating an example of a screen displayed on the terminal apparatus according to the sixth modification example.
Figure 31B:
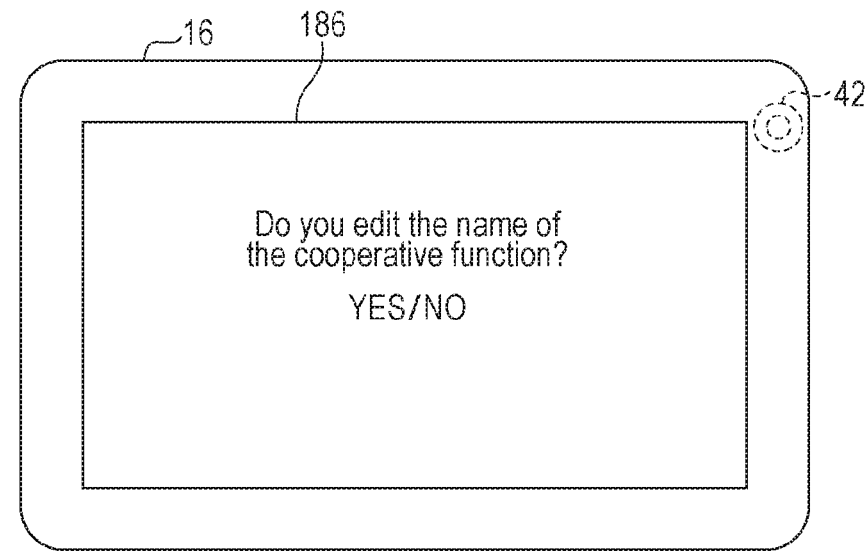
Figure 31C:
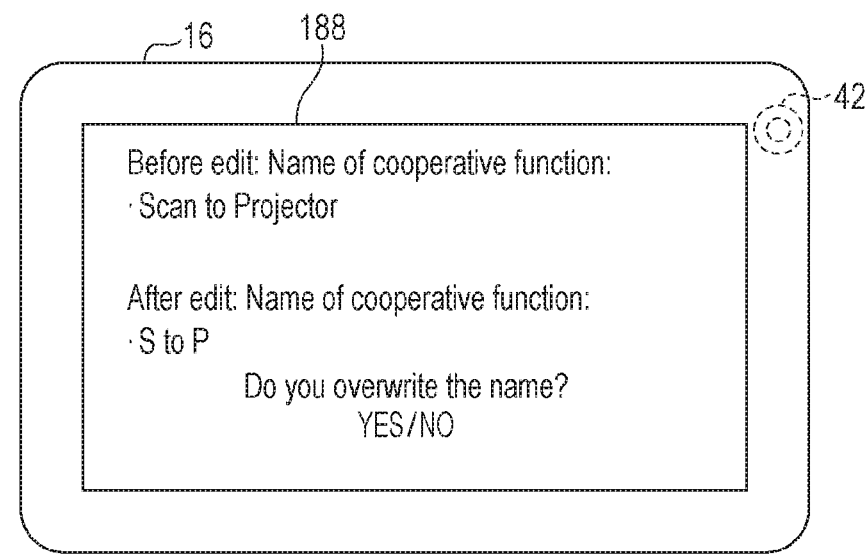

FIGS. 31A to 31C illustrate an example of a view and edit screen for cooperative functions. If the user provides an instruction to view the registration information about cooperative functions by using the terminal apparatus 16, a view and edit screen 184 is displayed on the UI unit 46 of the terminal apparatus 16 as illustrated in FIG. 31A. On the view and edit screen 184, shortcut images as display images, the registration information of cooperative functions (for example, the names of cooperative functions, the outlines of cooperative functions, and the names of devices to be linked), and so forth are displayed. For example, if the user designates an item about the cooperative function to be edited (for example, a display image, the name of the cooperative function, the outline of the cooperative function, or the names of devices to be linked) on the view and edit screen 184, a confirmation screen 186 is displayed on the UI unit 46 of the terminal apparatus 16 as illustrated in FIG. 31B. For example, if the name of a cooperative function is designated by the user, the confirmation screen 186 for confirming whether to edit the name of the cooperative function is displayed. If a "YES" button is pressed by the user on the confirmation screen 186, an edit screen 188 is displayed on the UI unit 46 of the terminal apparatus 16 as illustrated in FIG. 31C. On the edit screen 188, the name of the cooperative function is edited by the user, and then the name before edit and the name after edit are displayed on the edit screen 188. If an instruction to reflect the edit is provided by the user (for example, if a "YES" button is pressed by the user), the edit is reflected. For example, the name after edit is displayed on the desktop screen of the UI unit 46 of the terminal apparatus 16 together with the shortcut image. The items other than the name of the cooperative function may be edited in a similar manner.

Seventh Modification Example

Figure 32A:
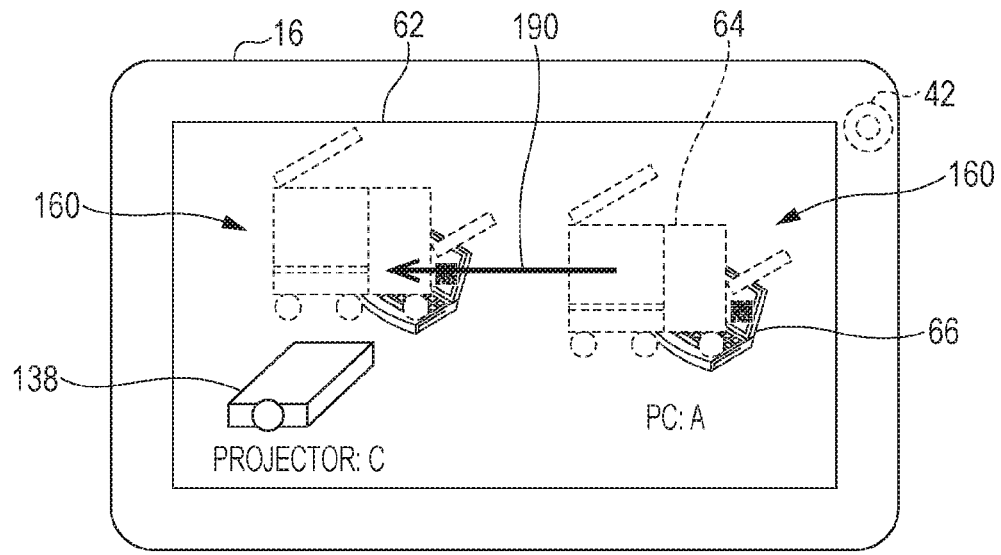
FIGS. 32A and 32B are diagrams illustrating an example of a screen displayed on the terminal apparatus according to a seventh modification example.
Figure 32B:
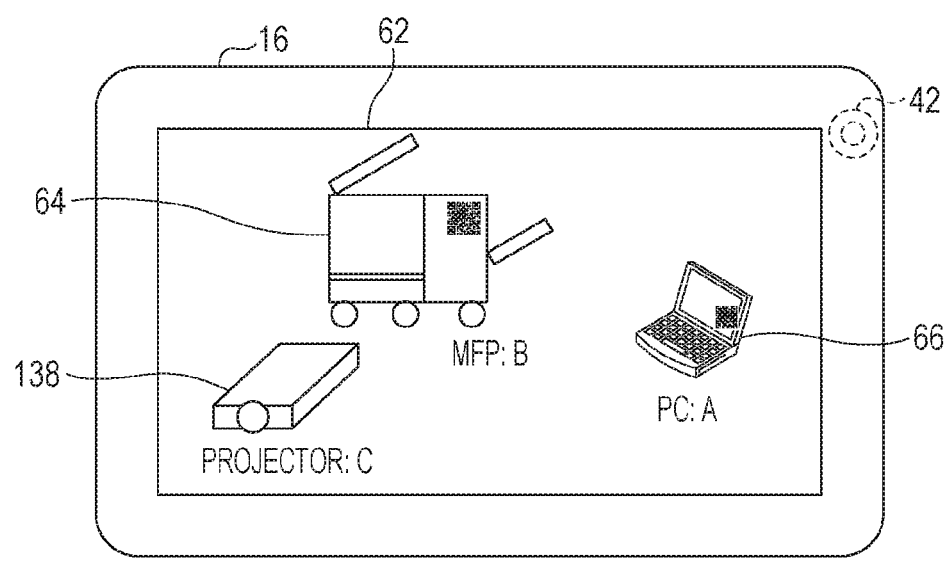

Hereinafter, a seventh modification example will be described with reference to FIGS. 32A and 32B. FIGS. 32A and 32B illustrate an example of a screen displayed on the UI unit 46 of the terminal apparatus 16. In the seventh modification example, after the target device images superimposed on one another are selected, a cooperative function is cancelled if the selection is cancelled in a region where the device images are not displayed on the device display screen 62.

For example, it is assumed that, as illustrated in FIG. 32A, the device image 64 is superimposed on the device image 66 and thereby the new device image 160 is generated and displayed. In this case, if the user selects the device image 160 and then cancels the selection of the device image 160 in a region where no device images are displayed on the device display screen 62 as indicated by an arrow 190, the cooperative function to be executed through cooperation between the MFP (B) and the PC (A) is cancelled. That is, as a result of dragging the device image 160 to a region where no device images are displayed and dropping the device image 160 in the region, the cooperative function is cancelled and the state shifts to the state before the devices cooperate with each other. For example, information representing the drag-and-drop operation is transmitted from the terminal apparatus 16 to the server 14A, and the specifying unit 38 of the server 14A cancels the cooperative function. Of course, the terminal apparatus 16 may cancel the cooperative function.

FIG. 32B illustrates the device display screen 62 after the cooperative function is cancelled. In a state where the devices do not cooperate with each other, the device images 64, 66, and 138 are separately displayed without being superimposed on one another.

As described above, according to the seventh modification example, as a result of cancelling the selection of device images superimposed on one another, the corresponding cooperative function is cancelled without performing another special operation. Thus, the cooperative function may be easily cancelled compared to a case where a special operation other than cancellation of selection is necessary to cancel the cooperative function.

Alternatively, in the case of cancelling the cooperation, the user may designate device images related to the target devices on the device display screen 62 or may press a cooperation cancellation button. If a device other than the target devices that cooperate with each other is displayed on the device display screen 62, the user may designate the device image related to the device on the device display screen 62 to eliminate the device from the target devices that cooperate with each other. If a preset operation of attaching a cross mark or the like to a device image related to the target device of cancellation is performed, the device may be eliminated from the target devices that cooperate with each other.

Eighth Modification Example

Figure 33A:
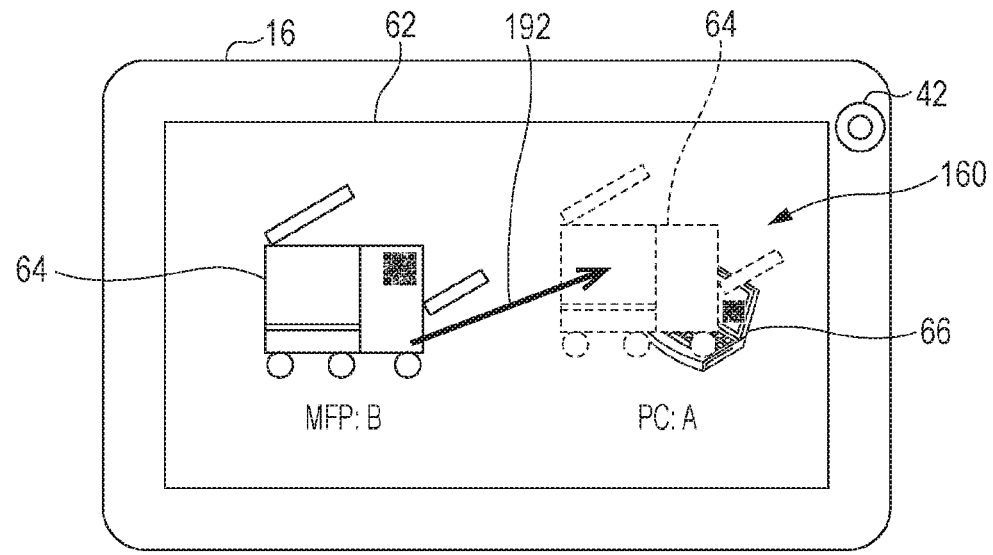
FIGS. 33A and 33B are diagrams illustrating an example of a screen displayed on the terminal apparatus according to an eighth modification example.
Figure 33B:
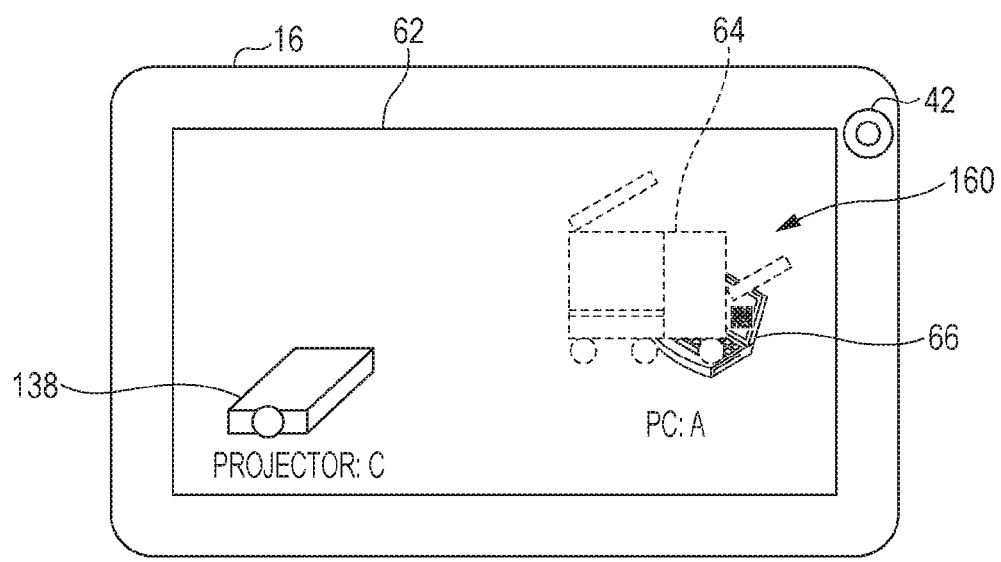

Hereinafter, an eighth modification example will be described with reference to FIGS. 33A and 33B. FIGS. 33A and 33B illustrate an example of a screen displayed on the UI unit 46 of the terminal apparatus 16.

Also in the eighth modification example, the image forming apparatus 10 (MFP (B)) and the terminal apparatus 12 (PC (A)) are identified as the target devices that cooperate with each other, and the device images 64 and 66 are displayed on the device display screen 62 in the terminal apparatus 16 as illustrated in FIG. 33A. As indicated by an arrow 192, the device image 64 is superimposed on the device image 66, and accordingly the new device image 160 is generated and displayed. The image forming apparatus 10 (MFP (B)) and the terminal apparatus 12 (PC (A)) are designated as the target devices that cooperate with each other.

In the eighth modification example, the controller 48 of the terminal apparatus 16 causes the field of view of the camera 42 to be changed and causes the changed field of view to be displayed on the device display screen 62 while causing a device image generated last through superimposing to be displayed on the device display screen 62. In this case, the pieces of identification information of the devices that cooperate with each other (the devices related to the device images superimposed on one another) are stored in the terminal apparatus 16 or the server 14A.

In the example illustrated in FIG. 33A, the new device image 160 generated by superimposing the device image 64 on the device image 66 is displayed, and thus the device image 160 remains displayed on the device display screen 62. For example, in the case of using the projector (C), which is not within the field of view in the state illustrated in FIG. 33A, the user changes the orientation of the camera 42 so that the projector (C) is included in the field of view of the camera 42, with the device image 160 being displayed on the device display screen 62 as illustrated in FIG. 33B, and then captures an image of the projector (C). Accordingly, the image of the projector (C) is captured by the camera 42, and the device image 138 related to the projector (C) is displayed on the device display screen 62. As a result of superimposing the device image 160 on the device image 138, the projector (C) is designated as the target device that cooperates.

According to the eight modification example, even if an image of plural target devices that cooperate with each other is not captured at one time, images of the plural devices may be separately captured and the plural devices may cooperate with each other.

In the above-described example, a device image generated last through superimposing remains displayed on the device display screen 62. Alternatively, a device image designated by the user, a device image related to the device whose image is captured first, or a device image related to a preset basic device may remain displayed on the device display screen 62. Also in this case, images of the plural devices may be separately captured and the plural devices may cooperate with each other.

Ninth Modification Example

Hereinafter, a ninth modification example will be described. In the ninth modification example, the process according to the first exemplary embodiment is applied. That is, an order of priority in which information about cooperative functions is displayed is determined in accordance with an order in which device images are superimposed on one another. For example, as illustrated in FIG. 24B, if the device image 64 is selected and is superimposed on the device image 66, a link is made from the device image 64 to the device image 66. Accordingly, the image forming apparatus 10 (MFP (B)) related to the device image 64 and the terminal apparatus 12 (PC (A)) related to the device image 66 are designated as the target devices that cooperate with each other, and also the linkage order thereof is designated. The order in which the device images are superimposed on one another corresponds to the linkage order. In the example illustrated in FIG. 24B, a link is made from the image forming apparatus 10 (MFP (B)) to the terminal apparatus 12 (PC (A)).

In the ninth modification example, the server 14A stores the cooperative function information 34 according to the first exemplary embodiment (the cooperative function management table illustrated in FIG. 7). As described above, when the target devices that cooperate with each other (for example, the image forming apparatus 10 and the terminal apparatus 12) are designated, the specifying unit 38 of the server 14A specifies the cooperative functions associated with the combination of the PC (A) and the MFP (B) in the cooperative function management table illustrated in FIG. 7 (cooperative function information 34). Accordingly, the cooperative functions to be implemented through cooperation between the PC (A) and the MFP (B) are specified.

Furthermore, when the user designates the linkage order of the devices, the specifying unit 38 specifies the order of priority associated with the linkage order in the cooperative function management table.

The information about the cooperative functions and the information representing the order of priority specified in the above-described manner are transmitted from the server 14A to the terminal apparatus 16. The controller 48 of the terminal apparatus 16 causes the UI unit 46 to display the information about the cooperative functions as the information about candidate cooperative functions in accordance with the order of priority.

As described above, according to the ninth modification example, cooperative functions that use functions of devices are specified by superimposing device images on one another. Also, the display order of the information about the cooperative functions is changed by changing the order in which the device images are superimposed on one another, that is, the order in which the devices are linked to each other. Thus, the information about the cooperative function that is expected to be used by the user is preferentially displayed without a special operation other than the operation of superimposing device images on one another.

Tenth Modification Example

Figure 34A:
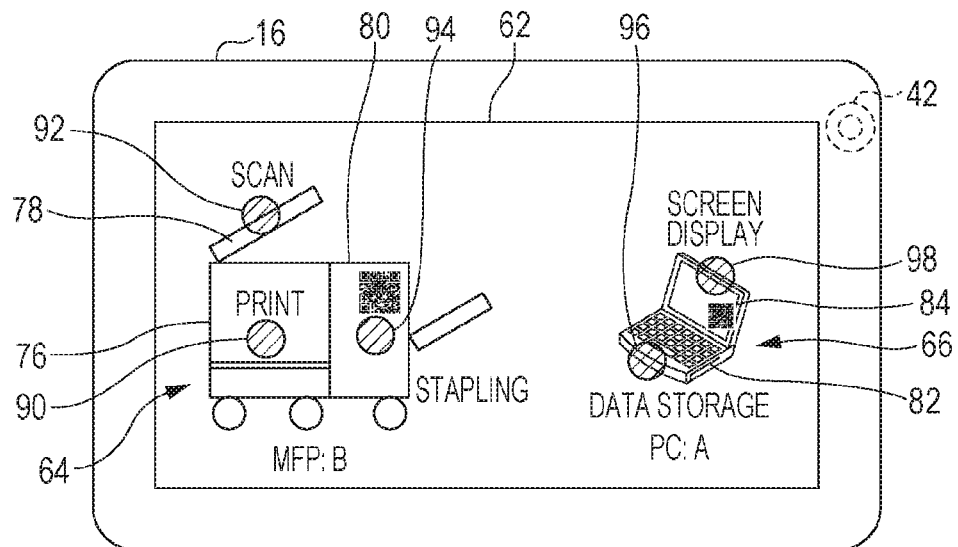
FIGS. 34A and 34B are diagrams illustrating an example of a screen displayed on the terminal apparatus according to a tenth modification example.
Figure 34B:
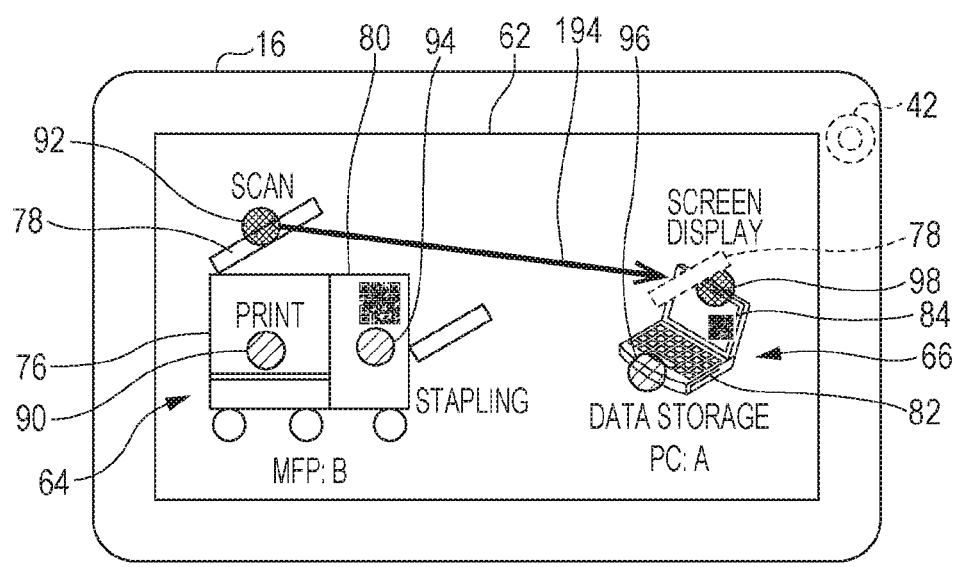

Hereinafter, a tenth modification example will be described with reference to FIGS. 34A and 34B. FIGS. 34A and 34B illustrate an example of a screen displayed on the UI unit 46 of the terminal apparatus 16.

In the tenth modification example, as in the first modification example of the first exemplary embodiment, the function of a device assigned to a cooperative function varies according to a position in a device image related to the device. With a specific partial image in a device image being superimposed on a specific partial image in another device image, a cooperative function that uses the functions related to the specific partial images is specified. Hereinafter, the tenth modification example will be described in detail.

Also in the tenth modification example, it is assumed that the image forming apparatus 10 (MFP (B)) and the terminal apparatus 12 (PC (A)) are identified. As illustrated in FIG. 34A, the device display screen 62 is displayed on the UI unit 46 of the terminal apparatus 16, and the device images 64 and 66 are displayed on the device display screen 62. As in the first modification example of the first exemplary embodiment, a print function is associated with the partial image 76 in the device image 64, a scan function is associated with the partial image 78 in the device image 64, and a stapling function is associated with the partial image 80 in the device image 64. Also, a data storage function is associated with the partial image 82 in the device image 66, and a screen display function is associated with the partial image 84 in the device image 66. In the tenth modification example, each partial image is displayed as an image that is able to be moved separately from another partial image.

As in the first modification example of the first exemplary embodiment, the names of individual functions (for example, print, scan, and so forth) may be displayed on the device display screen 62, and the contact region images 90 to 98 may be displayed on the device display screen 62. In this case, the color of the contact region image corresponding to a partial image designated by the user or the color of the contact region image corresponding to a superimposed partial image may be changed. Of course, the names of the functions and the contact region images are not necessarily displayed.

In the tenth modification example, if a partial image is designated by the user and if the partial image is superimposed on another partial image, cooperative functions that use the functions related to the superimposed partial images are specified, and the information about the cooperative functions is displayed on the UI unit 46 of the terminal apparatus 16. This specification process may be performed by the specifying unit 38 of the server 14A or the terminal apparatus 16.

For example, as indicated by an arrow 194 in FIG. 34B, if the user drags the partial image 78 and drops it on the partial image 84 by using an operator, the MFP (B) related to the device image 64 including the partial image 78 and the PC (A) related to the device image 66 including the partial image 84 are designated as the target devices that cooperate with each other, and also the scan function corresponding to the partial image 78 and the screen display function corresponding to the partial image 84 are designated as the target functions that cooperate with each other.

In the server 14A, the functions corresponding to the individual partial images are managed. For example, identification information for identifying a partial image, function identification information representing a function associated with the partial image, and cooperative function identification information representing a cooperative function executed through cooperation between functions are stored in the server 14A in association with each other. If a partial image is selected on the device display screen 62 and is superimposed on another partial image, the pieces of identification information representing the partial images superimposed on one another are transmitted from the terminal apparatus 16 to the server 14A. In the example illustrated in FIG. 34B, the pieces of identification information representing the partial images 78 and 84 are transmitted from the terminal apparatus 16 to the server 14A. The specifying unit 38 of the server 14A specifies the functions corresponding to the partial images 78 and 84 on the basis of the pieces of identification information and specifies a cooperative function that uses the functions. The information about the cooperative function is transmitted from the server 14A to the terminal apparatus 16 and is displayed on the terminal apparatus 16.

As described above, according to the tenth modification example, in a case where each of the target devices that cooperate with each other has plural functions, a function is selected in each of the target devices, and information about a cooperative function that uses the designated functions is preferentially displayed. Accordingly, the cooperative function expected to be used by the user is preferentially displayed.

Also in the tenth modification example, as in the first exemplary embodiment, the order of priority in which cooperative functions are displayed may be changed in accordance with the order in which partial images are superimposed on one another. In this case, the information about a cooperative function that uses the functions related to the superimposed partial images is preferentially displayed.

Eleventh Modification Example

Hereinafter, an eleventh modification example will be described. In the eleventh modification example, as in the tenth modification example, the function of a device assigned to a cooperative function varies according to a position in a device image related to the device. However, unlike in the tenth modification example, a partial image is not movable separately from another partial image. In the eleventh modification example, as in the example illustrated in FIG. 24B, the entire device image is moved and superimposed on another device image by the user. At this time, a cooperative function is changed in accordance with the superimposed position. This will be described by using a specific example with reference to FIG. 34A. For example, it is assumed that the entire device image 64 related to the MFP (B) is operated by the user and is superimposed on the device image 66 related to the PC (A). In this case, if the partial image 78 (the partial image related to the scan function) in the device image 64 is superimposed on the partial image 84 (the partial image related to the screen display function) in the device image 66, information about a cooperative function that uses the scan function and the screen display function is preferentially displayed.

Also in the second exemplary embodiment and the fifth to eleventh modification examples described above, as in the first exemplary embodiment, the target devices that cooperate with each other are connected to each other in accordance with the sequence illustrated in FIG. 21.

Furthermore, in the second exemplary embodiment and the fifth to eleventh modification examples described above, device images related to identified devices and device images superimposed on one another may be three-dimensionally displayed so as to be distinguished from a background image. That is, these images may be displayed as three-dimensional images. For example, the background image is two-dimensionally displayed and the device images are three-dimensionally displayed. Accordingly, the visibility of the device images may increase. Furthermore, the color of a device image designated by the user may be changed or the designated device image may be blinked so that the designated device image is distinguished from the other device images.

In the first and second exemplary embodiments and the first to eleventh modification examples described above, a cooperative function is implemented by identifying hardware units such as devices. Alternatively, functions of software units (application programs) may be caused to cooperate with each other by identifying the software units. For example, cooperative functions may be specified by linking or superimposing images such as icons (corresponding to an example of images related to functions) regarding functions displayed on a home screen of a smartphone or a desktop screen of a personal computer, and the information about the cooperative functions may be displayed. In this case, the order of priority in which the cooperative functions are displayed may be changed in accordance with the order in which the images are linked or superimposed.

According to the first and second exemplary embodiments and the first to eleventh modification examples described above, cooperative functions that use the functions of the target devices that cooperate with each other are specified by applying the AR technologies, and information about the cooperative functions is displayed. Accordingly, even if the user does not know which cooperative function may be executed by the target devices that cooperate with each other from the appearances of the devices, the user is provided with information about the cooperative function. Also, a function that is not executable by a single device becomes available by causing devices to cooperate with each other, which may be convenient. Furthermore, a cooperative function becomes available only by identifying the target devices that cooperate with each other by applying the AR technologies. Thus, the cooperative function becomes available through a simple operation compared to a case where the user manually performs settings for executing the cooperative function, and the effort of the user may be reduced.

In an environment in which plural devices are used by plural users, information about cooperative functions is displayed on the terminal apparatus 16 of each user. For example, even if a user interface such as a touch screen is removed from a device, the terminal apparatus 16 functions as a user interface, and information about the cooperative functions is displayed on the terminal apparatus 16 of each user. In another case, for example, if the user temporarily uses plural devices on the go, a user interface suitable for the user, that is, a user interface that displays information about cooperative functions that use the functions of the target devices that are designated by the user and that cooperate with each other is displayed.

In an operation of executing a cooperative function in the first and second exemplary embodiments and the first to eleventh modification examples described above, if devices have already been identified by capturing images of the devices in advance or by receiving device identification information and images of the devices obtained through identification by another user, the device identification information and the images of the devices may be stored in the memory of the server 14 or the terminal apparatus 16, the device identification information and the images of the devices may be read from the memory by activating an edit screen for executing the cooperative function, the images of the devices may be linked to each other or superimposed on one another, and thereby the cooperative function may be executed. Now, a specific example will be described with reference to FIG. 35. FIG. 35 illustrates an edit screen 196 that is displayed on the terminal apparatus 16. On the edit screen 196, for example, the device image 66 related to the PC (A), the device image 64 related to the MFP (B), the device image 138 related to the projector (C), and a device image 198 related to a camera (D) are displayed. These images are images that have previously been obtained and are stored in the memory of the server 14 or the terminal apparatus 16, as described above. These images are read from the memory and displayed on the edit screen 196 when a cooperative function is to be executed. The cooperative function is executed by linking or superimposing images on the edit screen 196, as described above. With such a process being performed, it is not necessary to capture the images of the devices that have previously been identified every time a cooperative function is to be executed, and the cooperative function may be efficiently executed.

Furthermore, only the images of devices captured by the camera are displayed, and thus the visibility of the devices to be operated may increase.

Each of the image forming apparatus 10, the terminal apparatuses 12 and 16, and the servers 14 and 14A is implemented through cooperation between hardware resources and software resources, for example. Specifically, each of the image forming apparatus 10, the terminal apparatuses 12 and 16, and the servers 14 and 14A includes one or plural processors, such as a central processing unit (CPU), which are not illustrated. The one or plural processors read and execute a program stored in a storage apparatus (not illustrated), and thereby the functions of the individual units of the image forming apparatus 10, the terminal apparatuses 12 and 16, and the servers 14 and 14A are implemented. The program is stored in the storage apparatus through a recording medium, such as a compact disc (CD) or a digital versatile disc (DVD), or through a communication path, such as a network. Alternatively, the individual units of the image forming apparatus 10, the terminal apparatuses 12 and 16, and the servers 14 and 14A may be implemented by hardware resources such as a processor or an electronic circuit. An apparatus such as a memory may be used for the implementation. Alternatively, the individual units of the image forming apparatus 10, the terminal apparatuses 12 and 16, and the servers 14 and 14A may be implemented by a digital signal processor (DSP) or a field programmable gate array (FPGA).

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to:
receive image data;
cause a display to display the received image data; and
move, in response to a user instruction, a portion of the image data from a first place to a second place on the display, the portion of the image data being a partial region of an entire region of the image data,
wherein while the portion of the image data is being moved from the first place to the second place, the portion of the image data is displayed at the first place.

2. The information processing apparatus of claim 1, wherein the portion of the image data corresponds to a function.

3. The information processing apparatus of claim 1, wherein the processor is configured to receive the image data from a camera of the information processing apparatus as the camera captures an image.

4. The information processing apparatus of claim 1, wherein the image data comprises a video.

5. The information processing apparatus of claim 1, wherein the processor is configured to cause the display to display a trace of the movement of the portion of the image data from the first place to the second place while moving the portion of the image data from the first place to the second place.

6. An information processing apparatus comprising:
a processor configured to:
recognize a target from image data;
cause a display to display an indicative image indicating (i) the recognized target or (ii) a portion of the recognized target;
move, in response to a user instruction, the indicative image from a first place to a second place on the display,
wherein while the indicative image is being moved from the first place to the second place, the indicative image is displayed at the first place.

7. The information processing apparatus of claim 6,
wherein the processor is configured to receive the image data from a camera of the information processing apparatus as the camera captures an image.

8. The information processing apparatus of claim 7,
wherein the target comprises a device.

9. The information processing apparatus of claim 7,
wherein the indicative image indicates the recognized target, and
wherein the indicative image is associated with a function of the recognized target.

10. The information processing apparatus of claim 7,
wherein the indicative image indicates the portion of the recognized target, and
wherein the indicative image is associated with a function of the portion of the recognized target.

11. The information processing apparatus of claim 6,
wherein the target comprises a device.

12. The information processing apparatus of claim 11,
wherein the indicative image indicates the recognized target, and
wherein the indicative image is associated with a function of the recognized target.

13. The information processing apparatus of claim 11,
wherein the indicative image indicates the portion of the recognized target, and
wherein the indicative image is associated with a function of the portion of the recognized target.

14. The information processing apparatus of claim 13,
wherein the indicative image includes a plurality of indicative images, each indicative image indicating a respective portion of a plurality of portions of the recognized target, and
wherein each indicative image of the plurality of indicative images is associated with a function of the respective portion.

15. The information processing apparatus of claim 6,
wherein the indicative image indicates the recognized target, and
wherein the indicative image is associated with a function of the recognized target.

16. The information processing apparatus of claim 6,
wherein the indicative image indicates the portion of the recognized target, and
wherein the indicative image is associated with a function of the portion of the recognized target.

17. The information processing apparatus of claim 16,
wherein the indicative image includes a plurality of indicative images, each indicative image indicating a respective portion of a plurality of portions of the recognized target, and
wherein each indicative image of the plurality of indicative images is associated with a function of the respective portion.

18. The information processing apparatus of claim 6,
wherein the image data comprises a video.

19. The information processing apparatus of claim 6,
wherein the processor is configured to cause the display to display a trace of the movement of the indicative image from the first place to the second place while moving the indicative image from the first place to the second place.

20. A non-transitory computer readable medium storing a program that causes a computer to execute information processing, the information processing comprising:
receiving image data;
causing a display to display the received image data; and
moving, in response to a user instruction, a portion of the image data from a first place to a second place on the display, the portion of the image data being a partial region of an entire region of the image data,
wherein while the portion of the image data is being moved from the first place to the second place, the portion of the image data is displayed at the first place.

* * * * *